United States Patent
Nomura et al.

(10) Patent No.: US 10,885,374 B2
(45) Date of Patent: Jan. 5, 2021

(54) ARTICLE MANAGEMENT SYSTEM, INFORMATION PROCESSING APPARATUS, AND CONTROL METHOD AND CONTROL PROGRAM OF INFORMATION PROCESSING APPARATUS

(71) Applicant: NEC Corporation, Tokyo (JP)

(72) Inventors: Toshiyuki Nomura, Tokyo (JP); Kota Iwamoto, Tokyo (JP); Kyota Higa, Tokyo (JP); Keishi Ohashi, Tokyo (JP); Wataru Hattori, Tokyo (JP)

(73) Assignee: NEC Coporation, Tokyo (JP)

( * ) Notice: Subject to any disclaimer, the term of this patent is extended or adjusted under 35 U.S.C. 154(b) by 0 days.

(21) Appl. No.: 16/560,352

(22) Filed: Sep. 4, 2019

(65) Prior Publication Data

US 2019/0392244 A1 Dec. 26, 2019

Related U.S. Application Data

(63) Continuation of application No. 14/772,524, filed as application No. PCT/JP2014/053637 on Feb. 17, 2014, now Pat. No. 10,438,084.

(30) Foreign Application Priority Data

Mar. 4, 2013 (JP) .................................. 2013-042442

(51) Int. Cl.
*G06K 9/46* (2006.01)
*G06K 7/10* (2006.01)
(Continued)

(52) U.S. Cl.
CPC ........... *G06K 9/46* (2013.01); *G06K 7/10366* (2013.01); *G06K 9/00771* (2013.01);
(Continued)

(58) Field of Classification Search
CPC ........... G06K 9/00315; G06K 9/00281; G06K 9/00335; G06K 9/00248; G06K 9/00221;
(Continued)

(56) References Cited

U.S. PATENT DOCUMENTS 7,084,769 B2    8/2006  Bauer et al.
7,516,890 B1 *  4/2009  Spremo ................ G06Q 10/087
                                                    235/385

(Continued)

FOREIGN PATENT DOCUMENTS

CN          1205488 A        1/1999
CN        102184405 A        9/2011
(Continued)

OTHER PUBLICATIONS

Chinese Office Action dated Feb. 20, 2017, by the State Intellectual Property Office of the People's Republic of China in counterpart Chinese Patent Application No. 201480012238.4.
(Continued)

*Primary Examiner* — Kim Y Vu
*Assistant Examiner* — Michael J Vanchy, Jr.
(74) *Attorney, Agent, or Firm* — Wilmer Cutler Pickering Hale and Dorr LLP

(57) ABSTRACT

An apparatus of this invention is directed to an information processing apparatus that effectively counts, on a type basis, articles of a plurality of types displayed in a depth direction on a display shelf. The information processing apparatus includes a display count acquirer that acquires display count information of articles using article presence/absence sensors provided on the display shelf on which the articles are placed, an article identifier that acquires article identification information capable of identifying the types of articles based on an image acquired by capturing the display shelf, and a display recognizer that recognizes, based on the display
(Continued)

count information and the article identification information, display count of each type of the articles.

10 Claims, 80 Drawing Sheets

(51) Int. Cl.
*G06K 9/62* (2006.01)
*G06Q 10/08* (2012.01)
*G06K 9/00* (2006.01)
*G06K 17/00* (2006.01)
*G06Q 50/28* (2012.01)

(52) U.S. Cl.
CPC ......... *G06K 9/4671* (2013.01); *G06K 9/6201* (2013.01); *G06K 9/6218* (2013.01); *G06K 17/00* (2013.01); *G06Q 10/087* (2013.01); *G06Q 10/0875* (2013.01); *G06Q 50/28* (2013.01); *G06K 2009/4666* (2013.01); *G06K 2209/27* (2013.01); *G06T 2207/30242* (2013.01)

(58) Field of Classification Search
CPC ........... G06K 9/00597; G06K 9/00268; G06K 9/00302; G06K 2009/3291; G06K 9/78; G06Q 30/02; G06Q 30/0201; G06Q 10/087; G06Q 30/0601; G06Q 30/0641; G06Q 10/0639; G06Q 30/00; G06Q 30/016; G06Q 30/0202; G06Q 30/0207; G06Q 30/0211; G06Q 30/0224; G06Q 30/0241; G06Q 30/0627; G06Q 30/0631; A61B 5/165; G06T 7/0042; G06T 7/2093; H04N 21/485; H04N 5/23219
See application file for complete search history.

(56) References Cited

U.S. PATENT DOCUMENTS

| | | | |
|---|---|---|---|
| 8,321,302 B2 | 11/2012 | Bauer et al. | |
| 8,339,265 B2 | 12/2012 | Campero et al. | |
| 8,730,044 B2 | 5/2014 | Campero et al. | |
| 2003/0174099 A1 | 9/2003 | Bauer et al. | |
| 2003/0216969 A1 | 11/2003 | Bauer et al. | |
| 2005/0131578 A1* | 6/2005 | Weaver | G01G 19/4144 700/244 |
| 2005/0190072 A1* | 9/2005 | Brown | G06Q 10/087 340/6.1 |
| 2006/0232382 A1 | 10/2006 | Bauer et al. | |
| 2006/0238307 A1 | 10/2006 | Bauer et al. | |
| 2007/0109132 A1* | 5/2007 | Sano | G07G 1/009 340/572.8 |
| 2008/0077511 A1* | 3/2008 | Zimmerman | G06Q 10/00 705/28 |
| 2009/0036060 A1* | 2/2009 | Takahashi | G06K 7/0008 455/67.14 |
| 2011/0199211 A1 | 8/2011 | Campero et al. | |
| 2012/0076422 A1* | 3/2012 | Yang | G06K 9/6211 382/201 |
| 2013/0093591 A1 | 4/2013 | Campero et al. | |
| 2013/0144757 A1 | 6/2013 | Bauer et al. | |
| 2013/0173435 A1* | 7/2013 | Cozad, Jr. | G06Q 10/087 705/28 |

FOREIGN PATENT DOCUMENTS

| | | |
|---|---|---|
| EP | 1 793 326 A2 | 6/2007 |
| JP | 2001-88912 | 4/2001 |
| JP | 2001-258993 | 9/2001 |
| JP | 2002-24249 | 1/2002 |
| JP | 2002-347909 | 12/2002 |
| JP | 2009-037347 A | 2/2009 |
| JP | 2010-504598 | 2/2010 |
| JP | 2010-52915 | 3/2010 |
| JP | 2010-097457 A | 4/2010 |
| WO | WO 2008/039337 A1 | 4/2008 |

OTHER PUBLICATIONS

International Search Report and Written Opinion dated Mar. 25, 2014 in corresponding PCT International Application.
Japanese Office Action dated Sep. 26, 2017, issued in counterpart Japanese Patent Application No. 2015-504225.

* cited by examiner

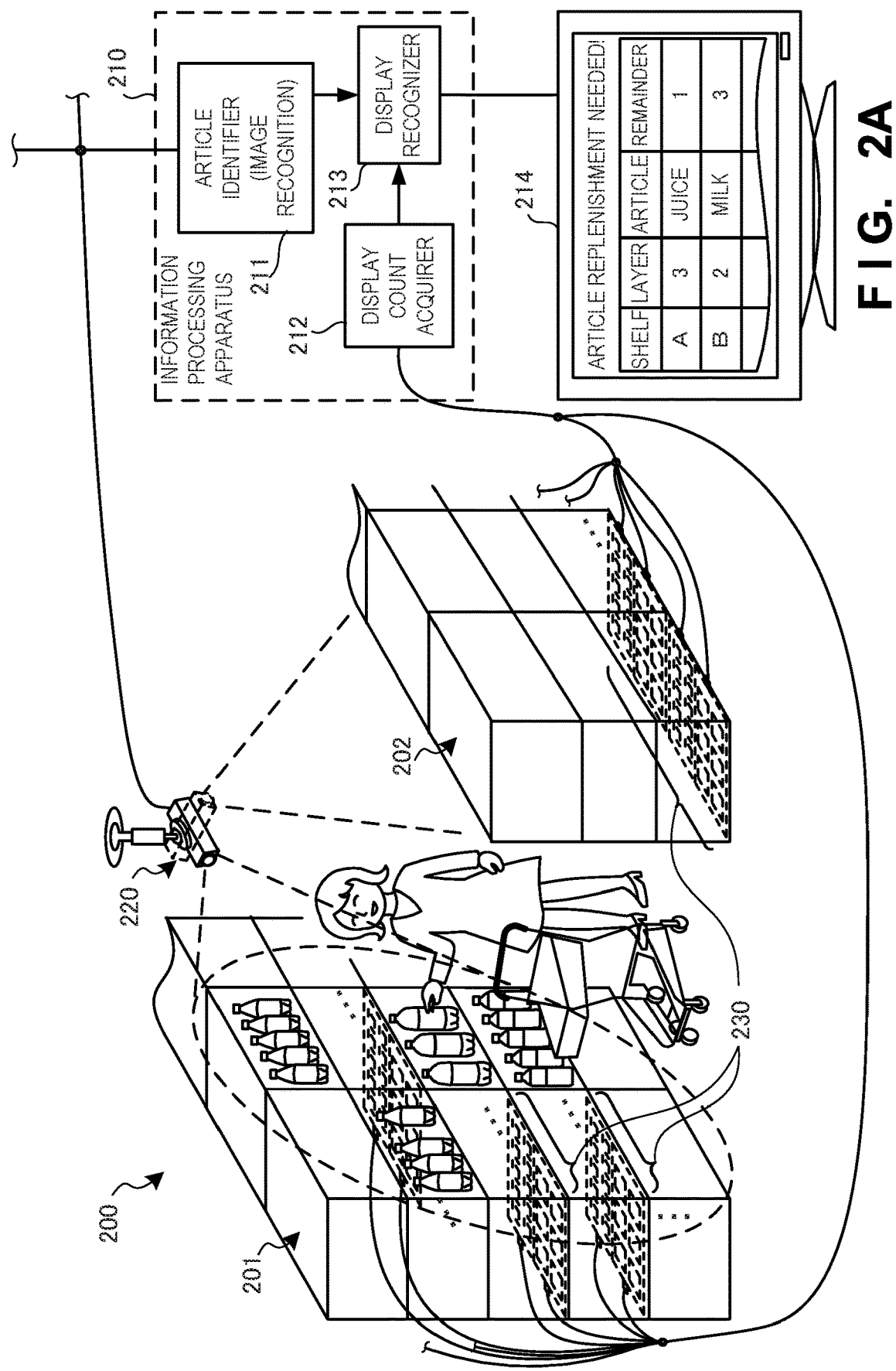

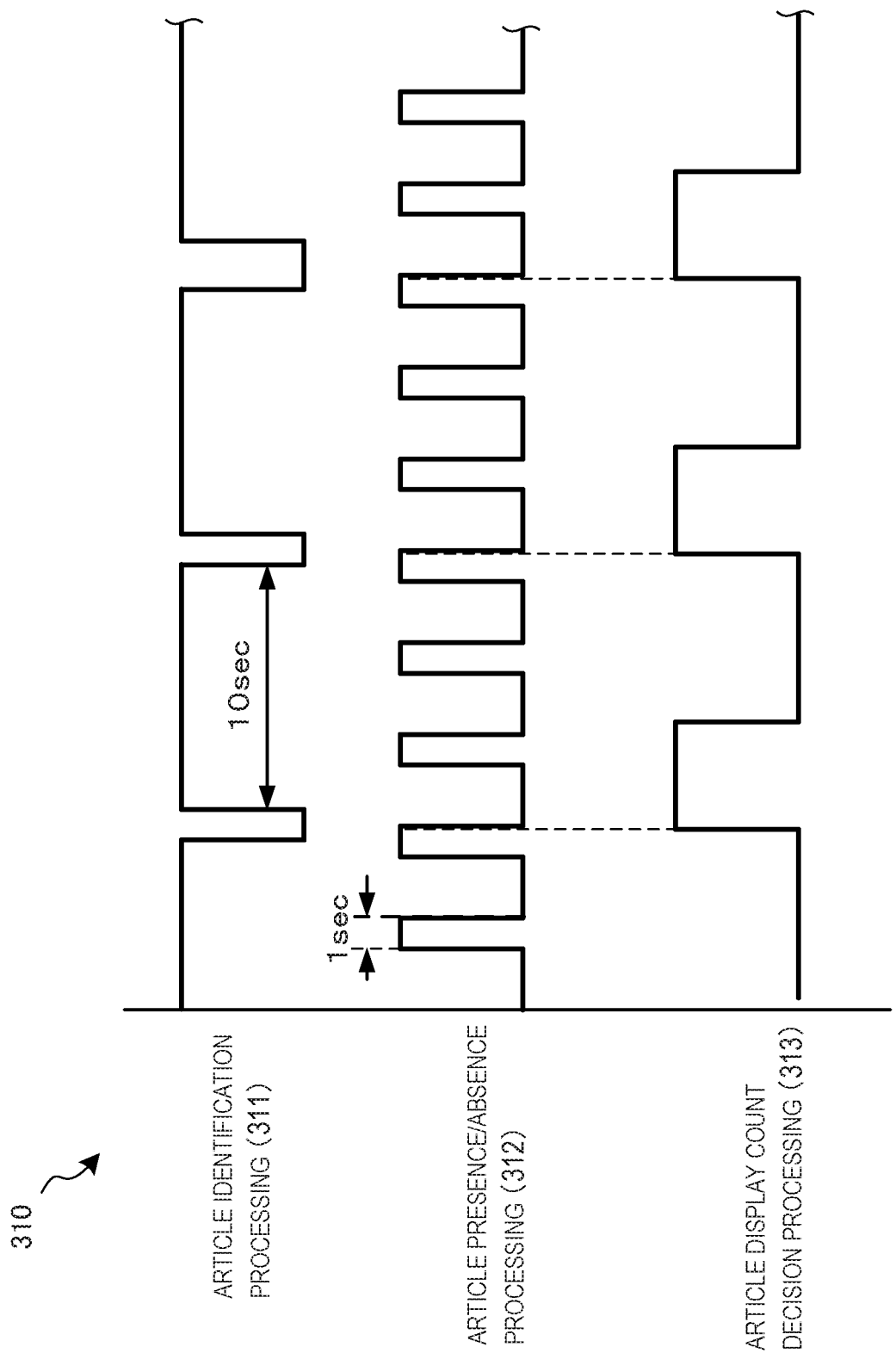

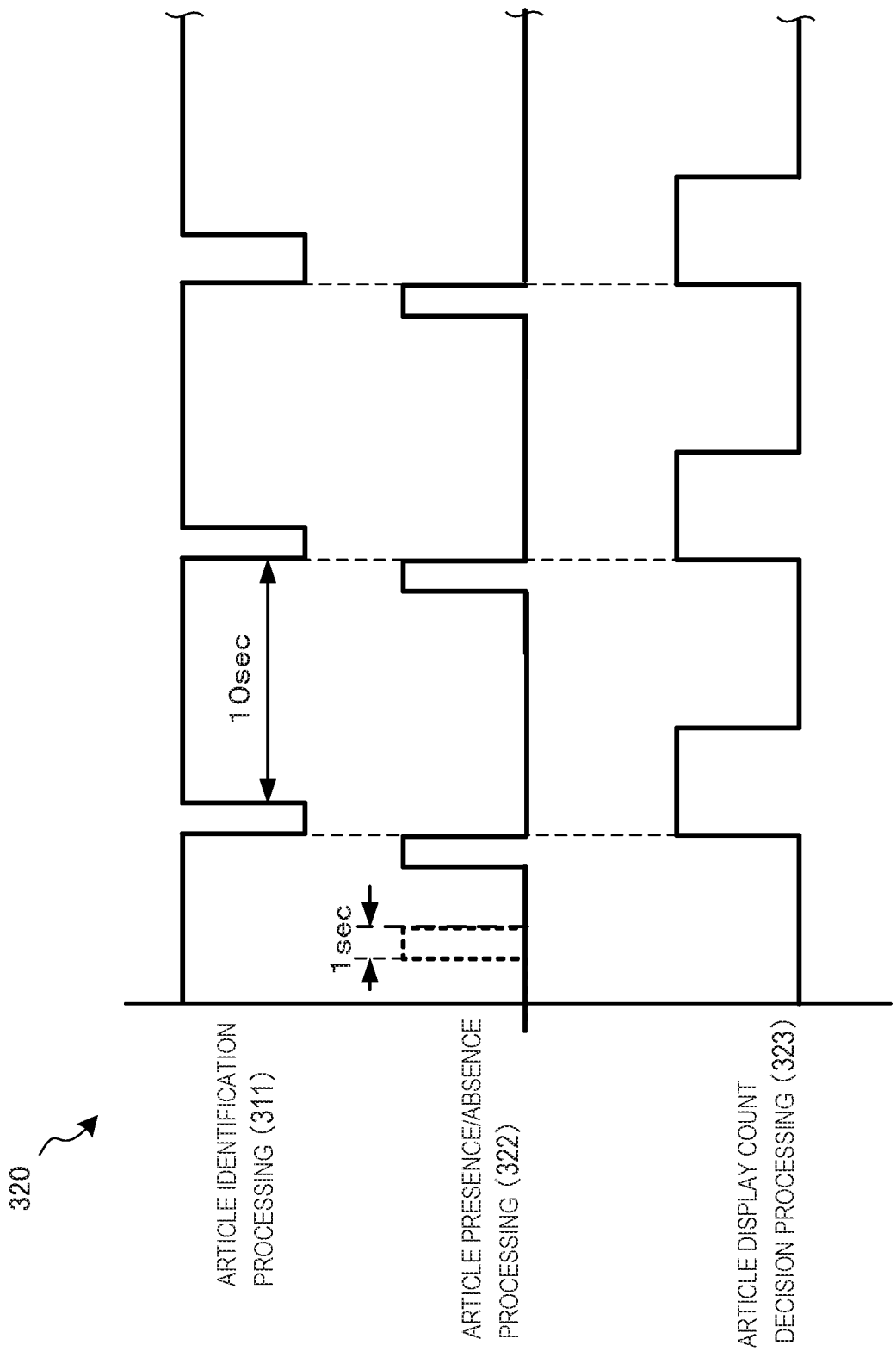

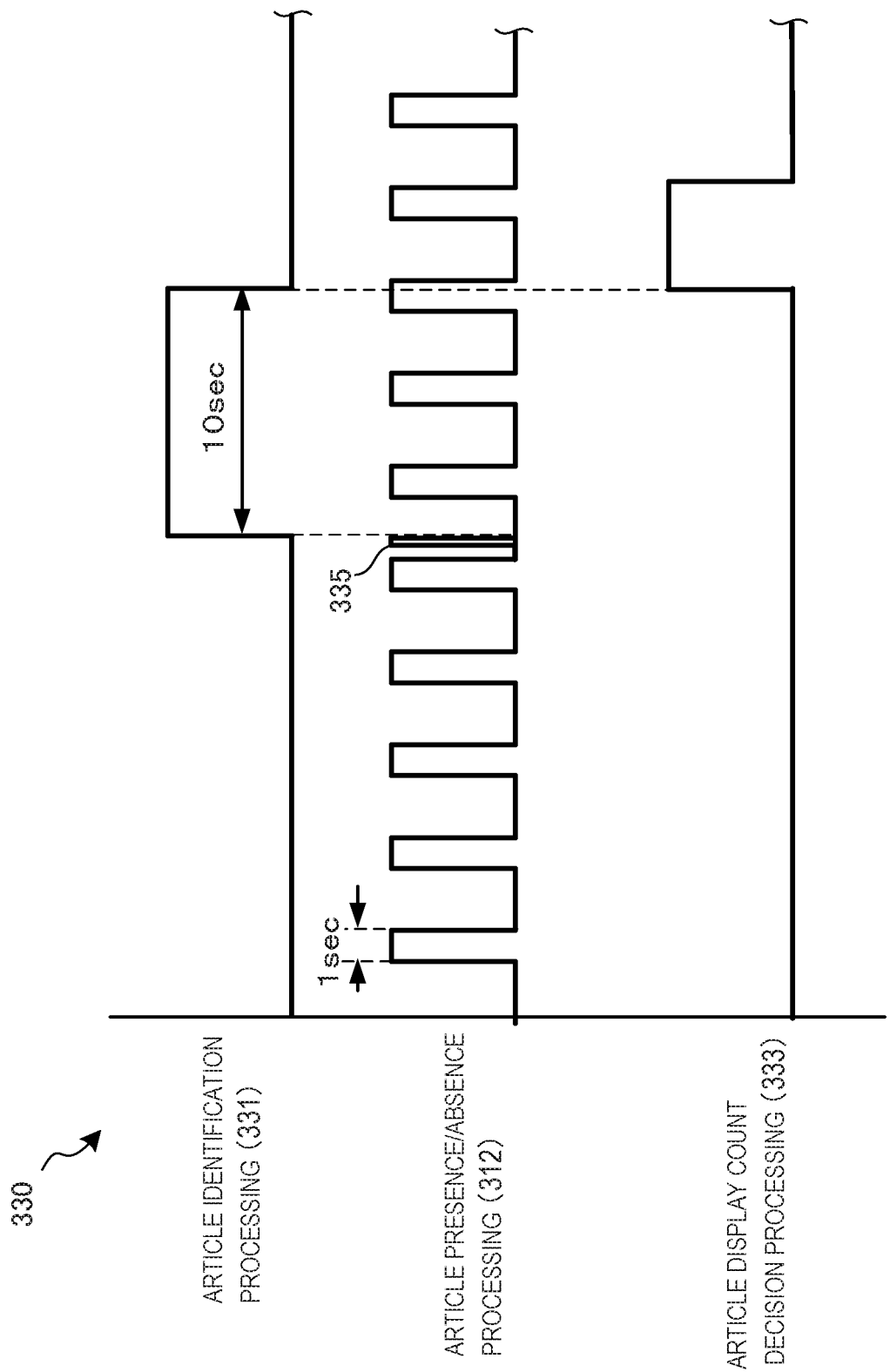

FIG. 5C

| 531 SHELF ID | 532 SHELF POSITION | 533 LAYER | 534 ARTICLE ID | 535 ARTICLE NAME/TYPE | 536 ARTICLE IMAGE | ... |
|---|---|---|---|---|---|---|
| A1 | RIGHT FAR SIDE OF CASH REGISTER | TOP LAYER | F001 | JUICE/ORANGE | | |
| | | | F002 | JUICE/APPLE | | |
| | | ... | ... | | | |
| A2 | RIGHT NEAR SIDE OF CASH REGISTER | TOP LAYER | F101 | COLA/ | | |
| | | | F102 | TEA/ | | |
| | | ... | ... | | | |
| ... | | | | | | |

| SHEET ID | COLUMN | DISPLAY COUNT | ARTICLE ARRANGEMENT (NEAR - FAR) |
|---|---|---|---|
| S0001 | L1 | 5 | ○●●●● |
| | L2 | 6 | ●●●●●● |
| S0012 | L1 | 4 | ○○○○●●●● |
| | L2 | 2 | ○○○○○○●●● |
| | L3 | 7 | ●●○●●●●● |
| ... | | | |
| S0011 | | | |
| S0002 | | | |
| ... | | | |

| 531 SHELF ID | 532 SHELF POSITION | 533 LAYER (UPPER→LOWER) | 551 COLUMN (LEFT→RIGHT) | 534 ARTICLE ID | 535 ARTICLE NAME/TYPE | 536 ARTICLE IMAGE | 543 DISPLAY COUNT | 544 ARTICLE ARRANGEMENT | 552 REPLENISHMENT NECESSITY | 553 WARNING NECESSITY |
|---|---|---|---|---|---|---|---|---|---|---|
| A1 | RIGHT FAR SIDE OF CASH REGISTER | TOP LAYER | A1-1-01 | F001 | JUICE/ORANGE | | 5 | | × | × |
| | | | A1-1-02 | F002 | JUICE/APPLE | | 6 | | × | × |
| | | | A1-1-03 | F003 | JUICE/MIX | | 4 | | △ | × |
| | | | A1-1-04 | F003 | JUICE/MIX | | 2 | | ○ | ○ |
| | | | A1-1-05 | F004 | MILK | | 7 | | × | × |
| | | SECOND LAYER | A1-2-01 | F011 | COFFEE | | 5 | | × | × |
| | | ... | ... | | | | | | | |
| ... | | | | | | | | | | |

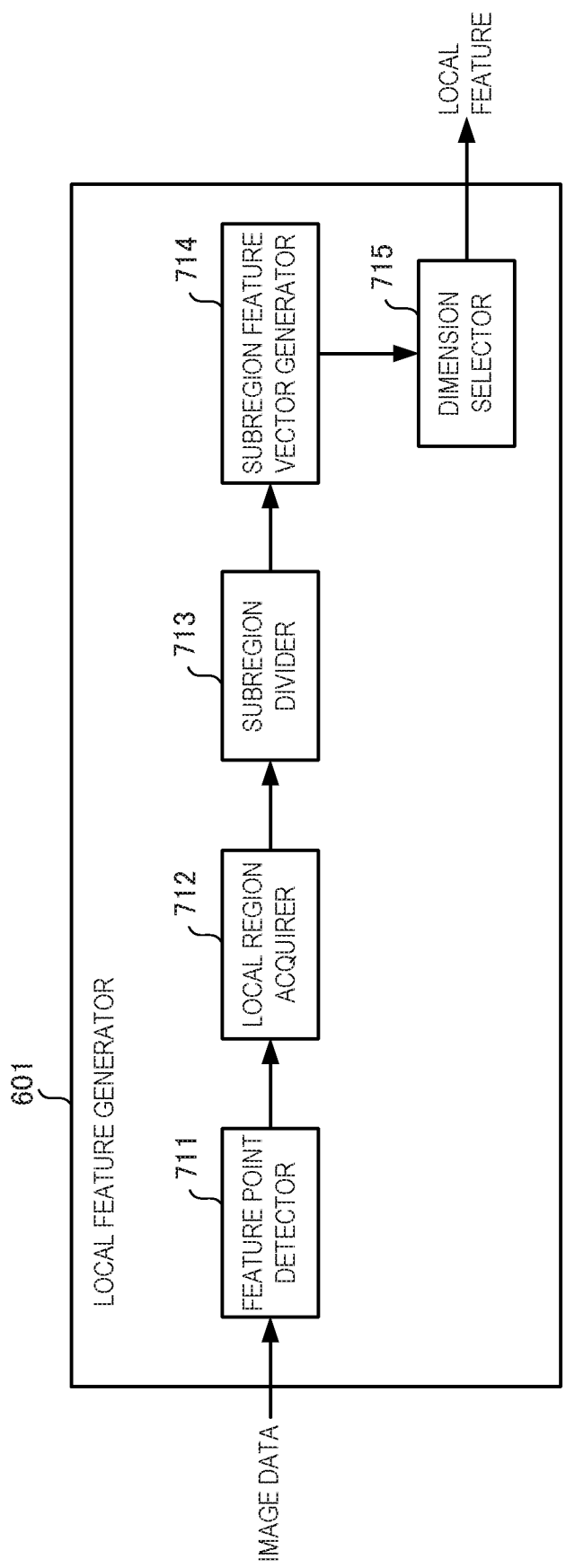
F I G. 7A

741

| 22 | 14 | 10 | 18 | 23 |
|----|----|----|----|----|
| 21 | 6  | 2  | 7  | 15 |
| 13 | 5  | 1  | 3  | 11 |
| 17 | 9  | 4  | 8  | 19 |
| 25 | 20 | 12 | 16 | 24 |

742

| 10 | 18 | 6  | 22 | 11 |
|----|----|----|----|----|
| 25 | 2  | 14 | 3  | 19 |
| 9  | 17 | 1  | 15 | 7  |
| 21 | 5  | 16 | 4  | 23 |
| 13 | 24 | 8  | 20 | 12 |

743

| 22 | 14 | 10 | 18 | 23 |
|----|----|----|----|----|
| 21 | 6  | 2  | 7  | 15 |
| 13 | 5  | 1  | 3  | 11 |
| 17 | 9  | 4  | 8  | 19 |
| 25 | 20 | 12 | 16 | 24 |

| SHEET ID 841 | ARTICLE POSITION ID 842 | SHELF 843 | LAYER 844 | COLUMN 845 | DEPTH DIRECTION POSITION 846 |
|---|---|---|---|---|---|
| S0001 | P01001 | A1 | TOP LAYER | LEFTMOST COLUMN | FRONT POSITION |
| | P01002 | A1 | TOP LAYER | LEFTMOST COLUMN | SECOND POSITION |
| | P01003 | A1 | TOP LAYER | LEFTMOST COLUMN | THIRD POSITION |
| | ... | | | | |
| | P01007 | A1 | TOP LAYER | SECOND COLUMN FROM LEFT | FRONT POSITION |
| | ... | | | | |
| | P02001 | A1 | SECOND LAYER | RIGHTMOST COLUMN | FRONT POSITION |
| | ... | | | | |
| S0012 | ... | | | | |

F I G. 8D

| ARTICLE POSITION ID | SHELF | LAYER | COLUMN | DEPTH DIRECTION POSITION |
|---|---|---|---|---|
| S0001P01001 | A1 | TOP LAYER | LEFTMOST COLUMN | FRONT POSITION |
| S0001P01002 | A1 | TOP LAYER | LEFTMOST COLUMN | SECOND POSITION |
| S0001P01003 | A1 | TOP LAYER | LEFTMOST COLUMN | THIRD POSITION |
| ... | | | | |
| S0001P01007 | A1 | TOP LAYER | SECOND COLUMN FROM LEFT | FRONT POSITION |
| ... | | | | |
| S0002P01011 | A1 | TOP LAYER | THIRD COLUMN FROM LEFT | FRONT POSITION |
| ... | | | | |
| S0012P02001 | A1 | SECOND LAYER | RIGHTMOST COLUMN | FRONT POSITION |

| SHEET MARK ID | LOCAL FEATURE GROUP OF SHEET MARK | | |
|---|---|---|---|
| | RELATIVE POSITION, LOCAL FEATURE | ... | RELATIVE POSITION, LOCAL FEATURE |
| | | | |
| | | | |
| ... | | | |

1511: SHEET MARK ID
1512: LOCAL FEATURE GROUP OF SHEET MARK
1403

FIG. 15C

| SHELF ID 531 | SHELF POSITION 532 | LAYER 533 | ARTICLE ID 534 | ARTICLE NAME/TYPE 535 | ARTICLE IMAGE 536 | ... | SHEET ID 1537 |
|---|---|---|---|---|---|---|---|
| A1 | RIGHT FAR SIDE OF CASH REGISTER | TOP LAYER | F001 | JUICE/ORANGE | | | S0001 |
| | | | F002 | JUICE/APPLE | | | S0012 |
| | | ... | ... | | | | |
| A2 | RIGHT NEAR SIDE OF CASH REGISTER | TOP LAYER | F101 | COLA/ | | | S0011 |
| | | | F102 | TEA/ | | | S0002 |
| | | ... | ... | | | | |
| ... | | | | | | | |

1530

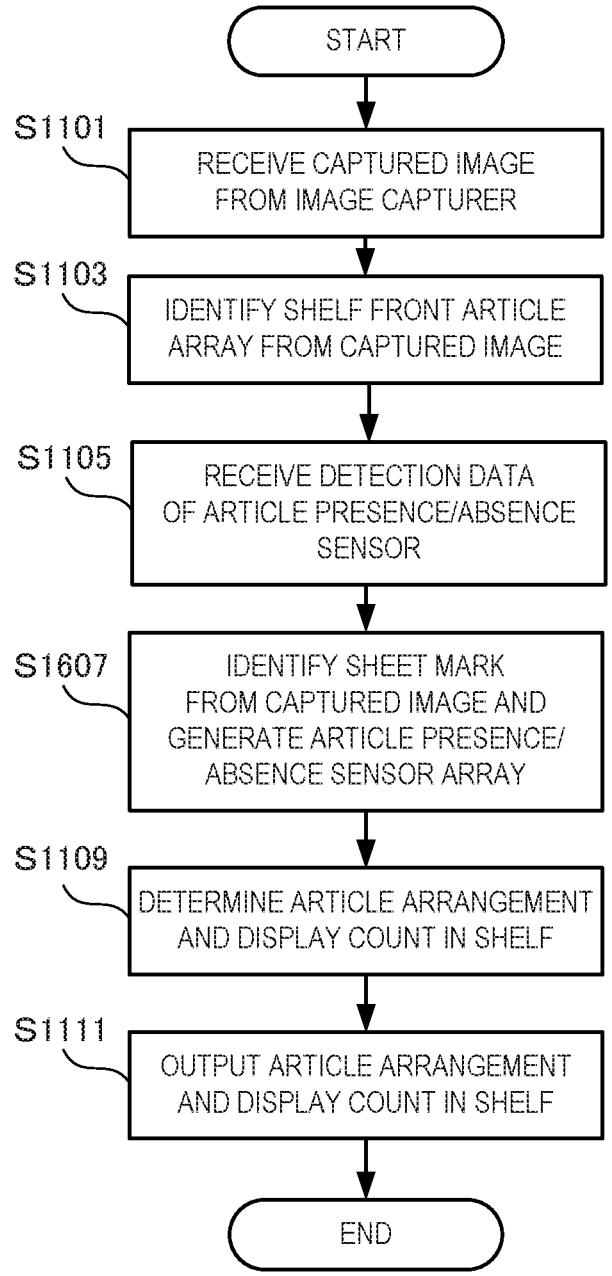
F I G. 16A

F I G. 20A

| SHELF MARK ID | LOCAL FEATURE GROUP OF SHELF MARK | | |
|---|---|---|---|
| | RELATIVE COORDINATES, LOCAL FEATURE | ... | RELATIVE COORDINATES, LOCAL FEATURE |
| | | | |
| | | | |
| ... | | | |
| | | | |

2011 — SHELF MARK ID column
2012 — LOCAL FEATURE GROUP OF SHELF MARK
1903

| SHELF MARK ID | SHELF ID | SHELF CONFIGURATION | | | SENSOR DATA | | |
|---|---|---|---|---|---|---|---|
| | | | ... | | | ... | |
| ... | | | | | | | |

| SHELF ID 531 | SHELF POSITION 532 | LAYER 533 | ARTICLE ID 534 | ARTICLE NAME/TYPE 535 | ARTICLE IMAGE 536 | ... | COLUMN 2037 | SHEET ID 2038 |
|---|---|---|---|---|---|---|---|---|
| A1 | RIGHT FAR SIDE OF CASH REGISTER | TOP LAYER | F001 | JUICE/ORANGE | | | LEFTMOST COLUMN | S0001 |
| | | | F002 | JUICE/APPLE | | | SECOND COLUMN | S0012 |
| | | ... | ... | | | | | |
| A2 | RIGHT NEAR SIDE OF CASH REGISTER | TOP LAYER | F101 | COLA/ | | | LEFTMOST COLUMN | S0011 |
| | | | F102 | TEA/ | | | SECOND COLUMN | S0002 |
| | | ... | ... | | | | | |
| ... | | | | | | | | |

2030

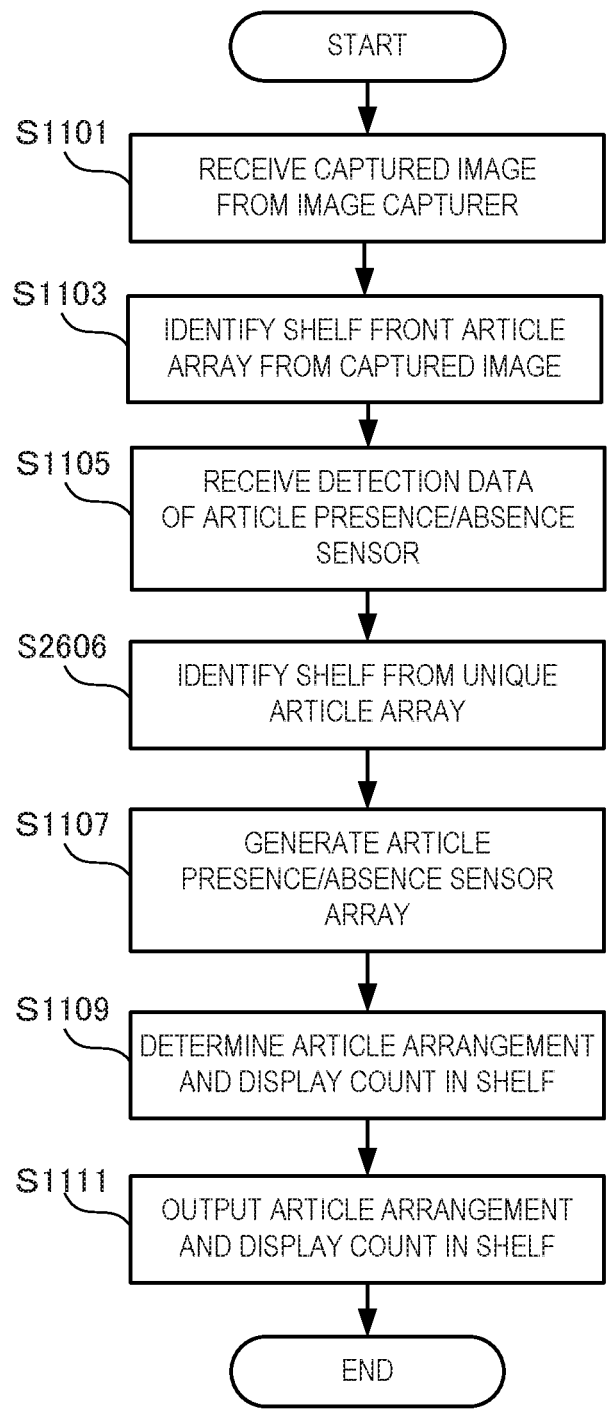
F I G. 26A

FIG. 37

ARTICLE MANAGEMENT SYSTEM, INFORMATION PROCESSING APPARATUS, AND CONTROL METHOD AND CONTROL PROGRAM OF INFORMATION PROCESSING APPARATUS

CROSS-REFERENCE TO RELATED PATENT APPLICATIONS

This application is a continuation of U.S. patent application Ser. No. 14/772,524, filed Sep. 3, 2015, which is a National Stage Entry of International Application No. PCT/JP2014/053637, filed Feb. 17, 2014, which claims priority from Japanese Patent Application No. 2013-042442, filed Mar. 4, 2013. The entire contents of the above-referenced applications are expressly incorporated herein by reference.

TECHNICAL FIELD

The present invention relates to a technique of managing displayed articles.

BACKGROUND ART

In the above technical field, patent literature 1 discloses a technique of capturing articles of commerce displayed on goods shelves while moving a plurality of cameras and counting the quantities of individual articles based on their outline feature data. Patent literature 2 discloses a technique of determining the presence/absence of an article based on the RE energy amount of a response signal to an interrogation signal from an RFID reader.

CITATION LIST

Patent Literature

Patent literature 1: Japanese Patent Laid-Open No. 2001-088912
Patent literature 2: Japanese PCT National Publication No. 2010-504598

SUMMARY OF THE INVENTION

Technical Problem

In the technique described in patent literature 1, however, it is necessary to use a plurality of expensive cameras and control the movement of the cameras. If a plurality of articles of commerce are displayed in the depth direction, and some of them are hidden or only partially seen, it is difficult to identify the articles. On the other hand, the technique described in patent literature 2 can determine the presence/absence of an article but cannot specify the type of the article unless it is known.

The present invention enables to provide a technique of solving the above-described problem.

Solution to Problem

One aspect of the present invention provides an information processing apparatus comprising:
a display count acquirer that acquires display count information of articles using article presence/absence sensors provided on a display shelf on which the articles are placed;
an article identifier that acquires article identification information capable of identifying types of articles based on an image acquired by capturing the display shelf; and
a display recognizes that recognizes, based on the display count information and the article identification information, display count of each type of the articles.

Another aspect of the present invention provides an information processing method comprising:
acquiring display count information of articles using article presence/absence sensors provided on a display shelf on which the articles are placed;
acquiring article identification information capable of identifying a types of articles based on an image acquired by capturing the display shelf; and
recognizing, based on the display count information and the article identification information, display count of each type of the articles.

Still other aspect of the present invention provides an information processing apparatus control program for causing a computer to execute a method comprising:
acquiring display count information of articles using article presence/absence sensors provided on a display shelf on which the articles are placed;
acquiring article identification information capable of identifying types of articles based on an image acquired by capturing the display shelf; and
recognizing, based on the display count information and the article identification information, display count of each type of the articles.

Still other aspect of the present invention provides an information processing system comprising:
article presence/absence sensors provided on a display shelf on which articles are placed;
a display count acquirer that acquires display count information of the articles using the article presence/absence sensors;
an image capturer that captures the display shelf;
an article identifier that acquires article identification information capable of identifying types of articles based on an image acquired by the image capturer; and
a display recognizes that recognizes, based on the display count information and the article identification information, display count of each type of the articles.

Advantageous Effects of Invention

According to the present invention, it is possible to effectively count a plurality of types of articles displayed on a display shelf on a type basis.

BRIEF DESCRIPTION OF THE DRAWINGS

FIG. 2A is a view showing the outline of an article management system including an information processing apparatus according to the second embodiment of the present invention.

FIG. 3B is a timing chart showing an example of the operation timing of the article management system including the information processing apparatus according to the second embodiment of the present invention;

FIG. 3C is a timing chart showing another example of the operation timing of the article management system including the information processing apparatus according to the second embodiment of the present invention;

FIG. 3D is a timing chart showing still another example of the operation timing of the article management system including the information processing apparatus according to the second embodiment of the present invention;

FIG. 5C is a view showing the arrangement of an article type array table according to the second embodiment of the present invention;

FIG. 5D is a view showing the arrangement of an article presence/absence array table according to the second embodiment of the present invention;

FIG. 7A is a block diagram showing the arrangement of a local feature generator according to the second embodiment of the present invention;

FIG. 7D is a view showing a subregion selection order in the local feature generator according to the second embodiment of the present invention;

FIG. 7F is a view showing the hierarchy of feature vectors in the local feature generator according to the second embodiment of the present invention;

FIG. 8D is a view showing an arrangement of the sensor database according to the second embodiment of the present invention;

FIG. 8E is a view showing another arrangement of the sensor database according to the second embodiment of the present invention;

FIG. 15A is a view showing the arrangement of a local feature database according to the third embodiment of the present invention;

FIG. 15C is a view showing the arrangement of an article type array table according to the third embodiment of the present invention;

FIG. 16A is a flowchart showing the processing procedure of the information processing apparatus according to the third embodiment of the present invention;

FIG. 20A is a view showing the arrangement of a local feature database according to the fourth embodiment of the present invention;

FIG. 20B is a view showing the arrangement of a shelf management database according to the fourth embodiment of the present invention;

FIG. 20C is a view showing the arrangement of an article type array table according to the fourth embodiment of the present invention;

FIG. 26A is a flowchart showing the processing procedure of the information processing apparatus according to the fifth embodiment of the present invention;

FIG. 37 is a view for explaining article presence/absence column collation according to the eighth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The information processing apparatus 100 is an apparatus for managing displayed articles.

Figure 1:
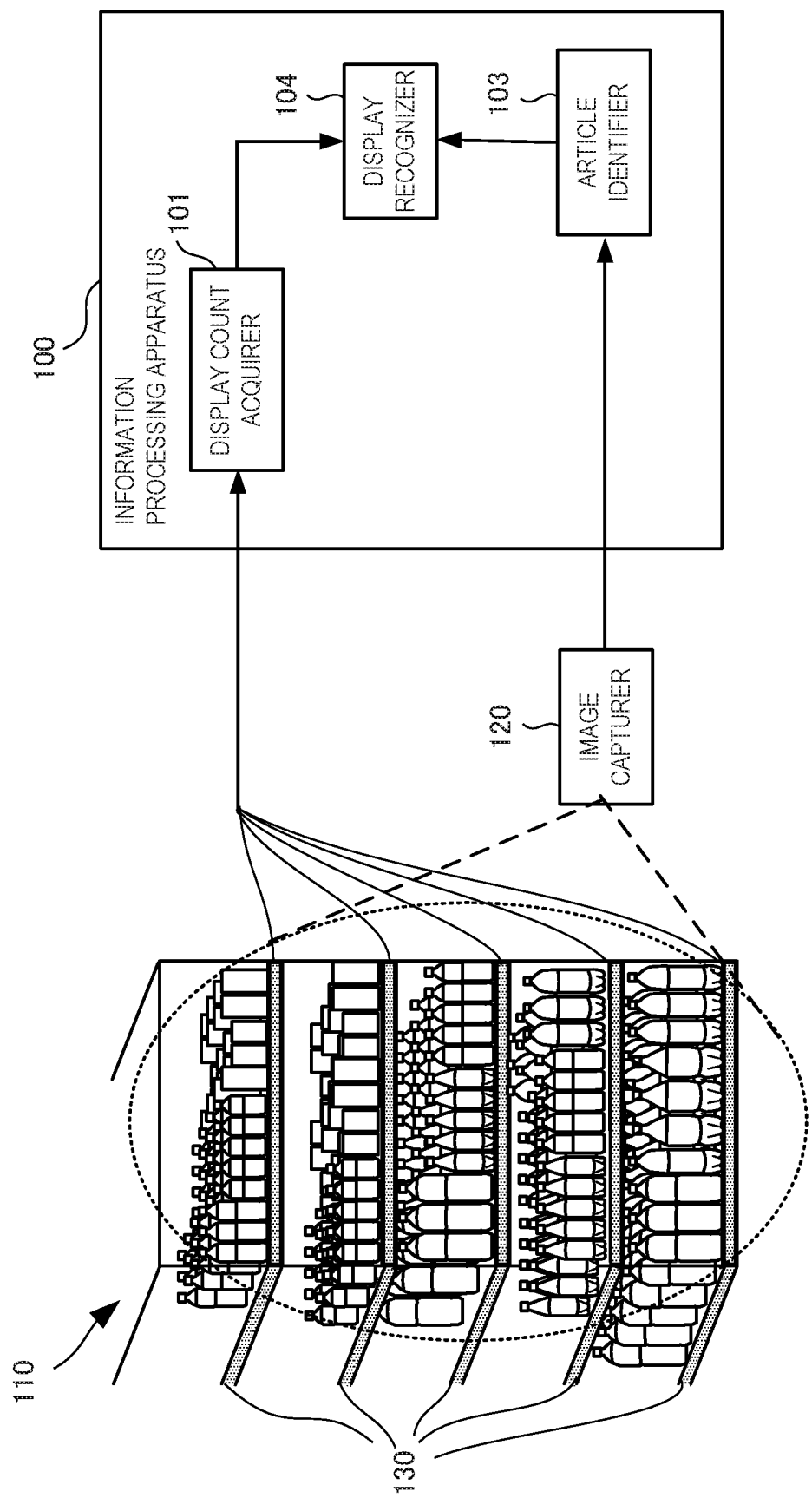
FIG. 1 is a block diagram showing the arrangement of an information processing apparatus according to the first embodiment of the present invention.

As shown in FIG. 1, the information processing apparatus 100 includes a display count acquirer 101, an article identifier 103, and a display recognizer 104. The display count acquirer 101 acquires display count information of articles 110 using article presence/absence sensors 130 provided on a display shelf on which the articles are placed. The article identifier 103 acquires article identification information capable of identifying types of articles based on an image acquired by capturing the display shelf using an image capturer 120. Based on the display count information acquired by the display count acquirer 101 and the article identification information acquired by the article identifier 103, the display recognizer 104 recognizes display count of each type of the articles.

According to this embodiment, it is possible to effectively count a plurality of types of articles displayed on the display shelf on a type basis based on article identification information based on an image and display count information acquired by the article presence/absence sensor.

Second Embodiment

An article management system including an information processing apparatus according to the second embodiment of the present invention will be described next. In this embodiment, an article is identified based on a local feature from a captured image and linked with article presence/absence information from an article presence/absence sensor set on an article display shelf, whereby an enormous quantity of articles of a plurality of types displayed in the depth direction on the display shelf are counted at a high speed on a type basis.

<<Article Management System>>

The arrangement and operation of an article management system 200 according to this embodiment will be described with reference to FIGS. 2A to 3D.

(System Outline)

FIG. 2A is a view showing the outline of the article management system 200 including an information processing apparatus 210 according to this embodiment. Referring to FIG. 2A, an article display shelf in a store will be exemplified. However, the display shelf not limited to this and can be of any type on which a plurality of articles are displayed in the depth direction.

The article management system 200 includes the information processing apparatus 210, an image capturer 220 that is a camera, and article presence/absence sensors 230. The image capturer 220 captures the images of the front lines of display shelves 201 and 202. On the other hand, the article presence/absence sensor 230 arranged on the bottom of each layer of the display shelves 201 and 202 determines the presence/absence of articles on the sensor 230.

The information processing apparatus 210 includes an article identifier 211, a display count acquirer 212, and a display recognizer 213. The article identifier 211 receives the images of the front lines of the display shelves 201 and 202 from the image capturer 220, and identifies the types and array of displayed articles. Note that the article identifier 211 identifies the type, maker, and name of an article. The display count acquirer 212 receives, from the article presence/absence sensor 230, information representing how many articles are arranged on the sensor. The display recognizer 213 links the article arrays of the front lines of the display shelves 201 and 202 from the article identifier 211 with display count information front the display count acquirer 212, and recognizes the number of displayed articles on the display shelves 201 and 202.

The number of displayed articles recognized by the information processing apparatus 210 is displayed on, for example, a display unit 214. This enables inventory management of the display shelves 201 and 202 and allows a clerk to replenish articles of a small display quantity.

(System Arrangement)

Figure 2B:
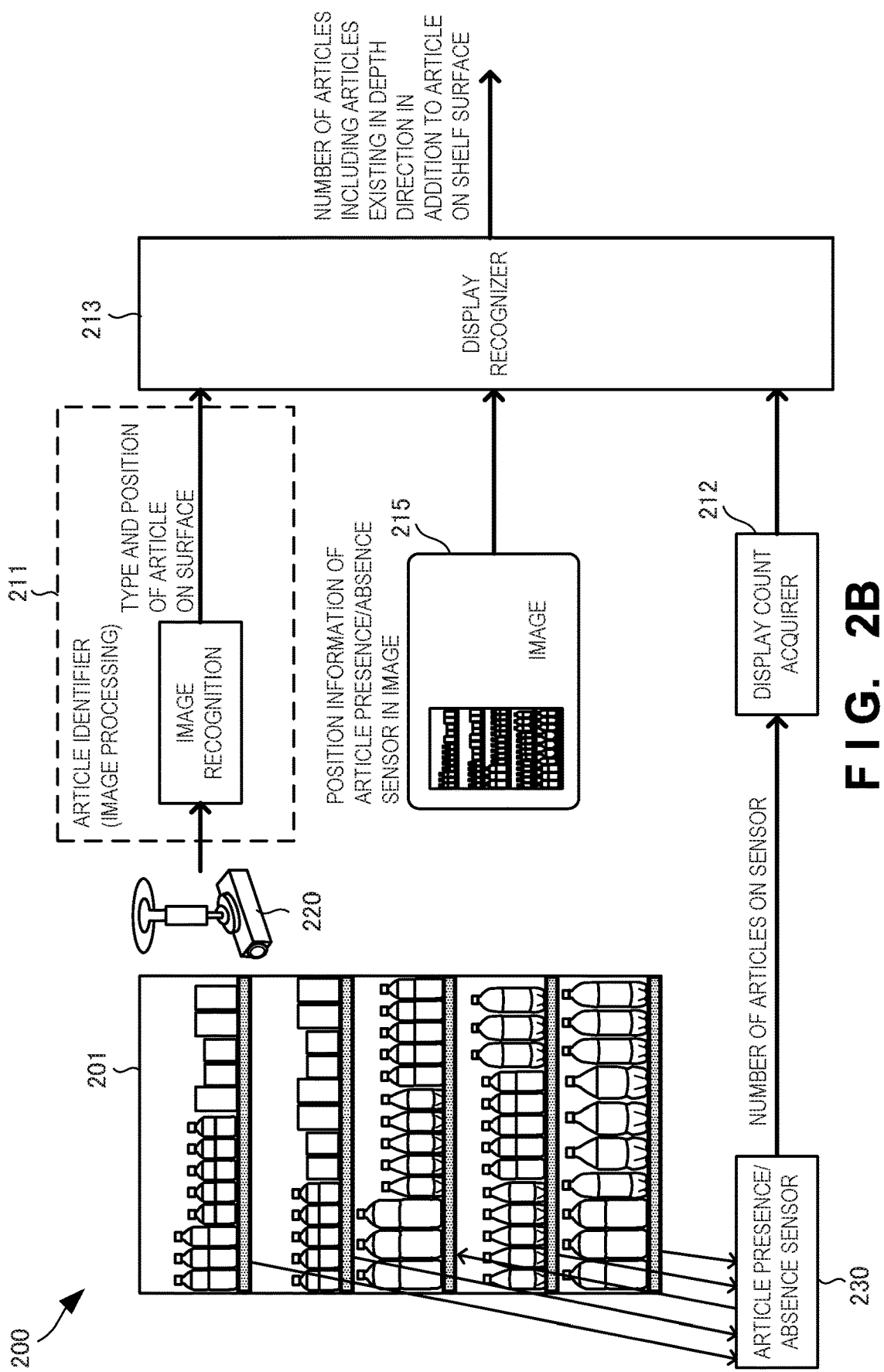
FIG. 2B is a block diagram showing the arrangement of the article management system including the information processing apparatus according to the second embodiment of the present invention.

FIG. 2B is a block diagram showing the arrangement of the article management system 200 including the information processing apparatus 210 according to this embodiment. FIG. 2B shows the schematic arrangement of the article management system 200 according to this embodiment. Note that the same reference numerals as in FIG. 2A denote the same constituent elements in FIG. 2B.

To recognize the number of displayed articles on the display shelves 201 and 202 by the display recognizer 213, the article arrays of the front lines of each of the display shelves 201 and 202 from the article identifier 211 and the display count information from the display count acquirer 212 need to be linked with each other. This is because the display count information from the display count acquirer 212 does not include presence/absence information representing the location and type of articles displayed on the display shelves. Hence, when each article identification information from the article identifier 211 and the display count information from the display count acquirer 212 are linked with each other, the number of displayed articles on the display shelves can be determined.

Position information 215 of the article presence/absence sensor in the image shown in FIG. 2B conceptually shows information that links each article identification information from the article identifier 211 with the display count information from the display count acquirer 212. Different linking methods will be described below in the second to fifth embodiments. However, the present invention is not limited to this. In the second embodiment, a case where the information processing apparatus 210 has the position information 215 of the article presence/absence sensor will be described.

(Operation Procedure)

Figure 3A:
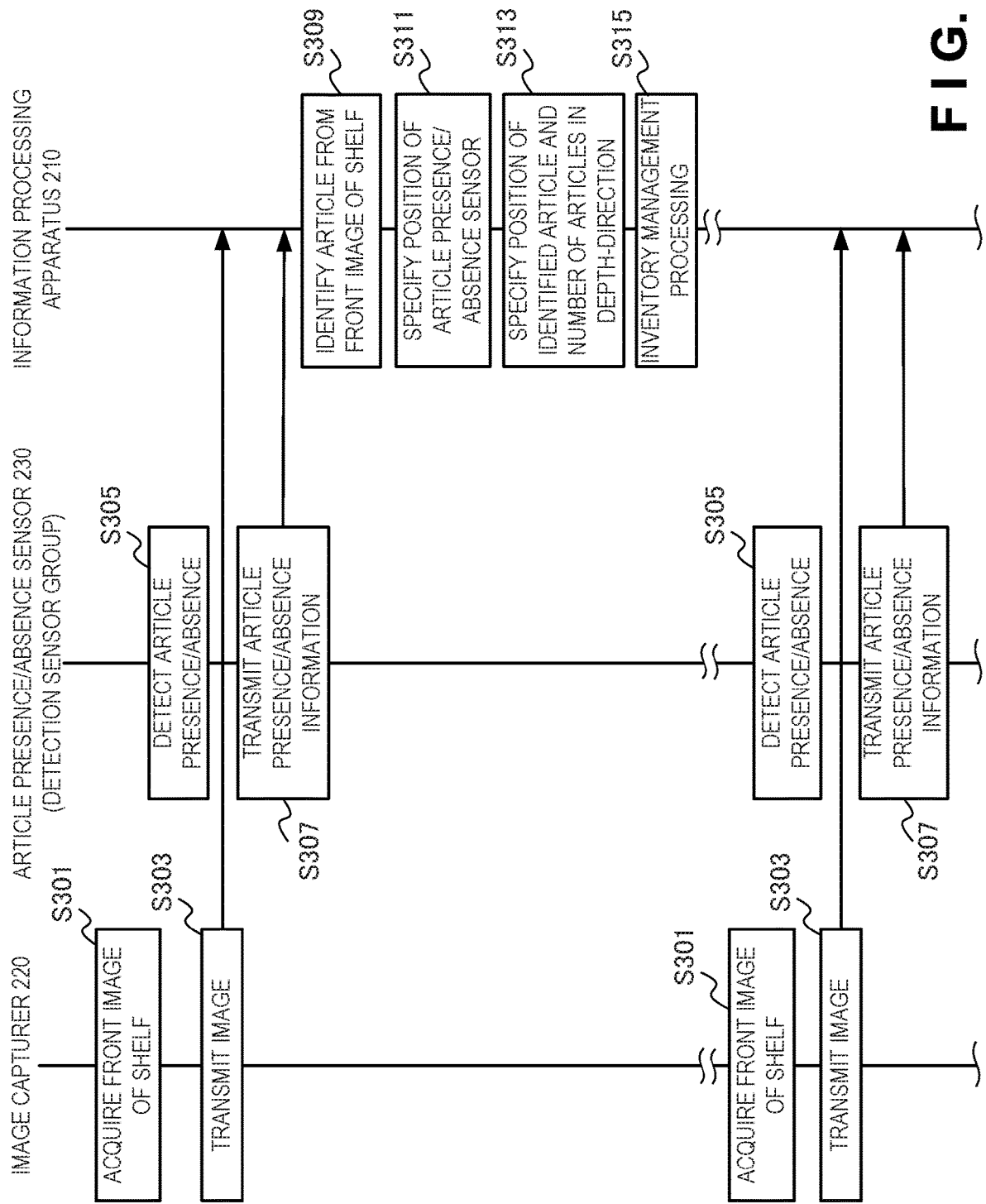
FIG. 3A is a sequence chart showing the operation procedure of the article management system including the information processing apparatus according to the second embodiment of the present invention.

FIG. 3A is a sequence chart showing the operation procedure of the article management system 200 including the information processing apparatus 210 according to this embodiment.

The image capturer 220 acquires the front image of a display shelf in step S301, and transmits the front image to the information processing apparatus 210 in step S303. On the other hand, the article presence/absence sensor 230 formed from a detection sensor group detects the presence/absence of an article on each sensor in step S305, and transmits article presence/absence information to the information processing apparatus 210 in step S307.

In step S309, the information processing apparatus 210 identifies each article based on the front image of the display shelf. Next, in step S311, the information processing apparatus 210 links the article identification information with the article presence/absence information from the article presence/absence sensor, and specifies the position of the article presence/absence sensor on the display shelf. In step S313, the information processing apparatus 210 specifies the position of the identified article and the number of articles in the depth direction. The number of displayed articles on the display shelf is thus counted. In step S315, the information processing apparatus 210 performs inventory management processing based on the number of displayed articles on display shelf. Note that the inventory management processing is not limited.

(Operation Timing)

FIG. 3B is a timing chart showing an example 310 of the operation timing of the article management system 200 including the information processing apparatus 210 according to this embodiment.

Article identification processing 311 of identifying displayed articles from the front image of the display shelf shot by the image capture 220 is implemented in, for example, about 10 sec using an article identification method according to this embodiment. On the other hand, article presence/absence processing 312 of collecting and ordering article presence/absence information from the article presence/absence sensor 230 is implemented in, for example, about 1 sec using an article presence/absence detection method according to this embodiment.

FIG. 3B shows the timing in a case where the article identification processing 311 and the article presence/absence processing 312 are independently performed without being associated, and article display count decision processing 313 of specifying the array and number of displayed articles on the display shelf is performed next to the end of the article presence/absence processing 312.

FIG. 3C is a timing chart showing another example 320 of the operation timing of the article management system 200 including the information processing apparatus 210 according to this embodiment. In FIG. 3C, the timing is adjusted so as to end each article presence/absence processing 322 in synchronism with the timing to complete the article identification processing 311 that needs a processing time of, for example, about 10 sec. FIG. 3C shows the timing in a case where article display count decision processing 323 is performed after completion of article recognition by the article identification processing 311 and completion of article presence/absence detection by the article presence/absence processing 322. According to the timing shown in FIG. 3C, it is possible to decrease the number of times of article presence/absence processing 322 to the number of times of article identification processing 311 and effectively perform the article display count decision processing 323.

FIG. 3D is a timing chart showing still another example 330 of the operation timing of the article management system 200 including the information processing apparatus 210 according to this embodiment. In FIG. 3D, article identification processing 331 starts if the article presence/absence information obtained the article presence/absence processing 312 has changed (335). FIG. 3D shows the timing in a case where article display count decision processing 333 is performed after completion of article recognition by the article identification processing 331. According to the timing shown in FIG. 3D, since the article identification processing 331 is performed only when the number of articles has changed in the article presence/absence processing 312 (taken out by a customer or replenished by a clerk), it is possible to decrease the number of times of article identification processing 331 and effectively perform the article display count decision processing 333.

Note that the timing may be controlled to start article presence/absence processing when an article change is recognized from the front image of the display shelf. The processing timing is not limited to these.

<<Functional Arrangement of Information Processing Apparatus>>

Figure 4:
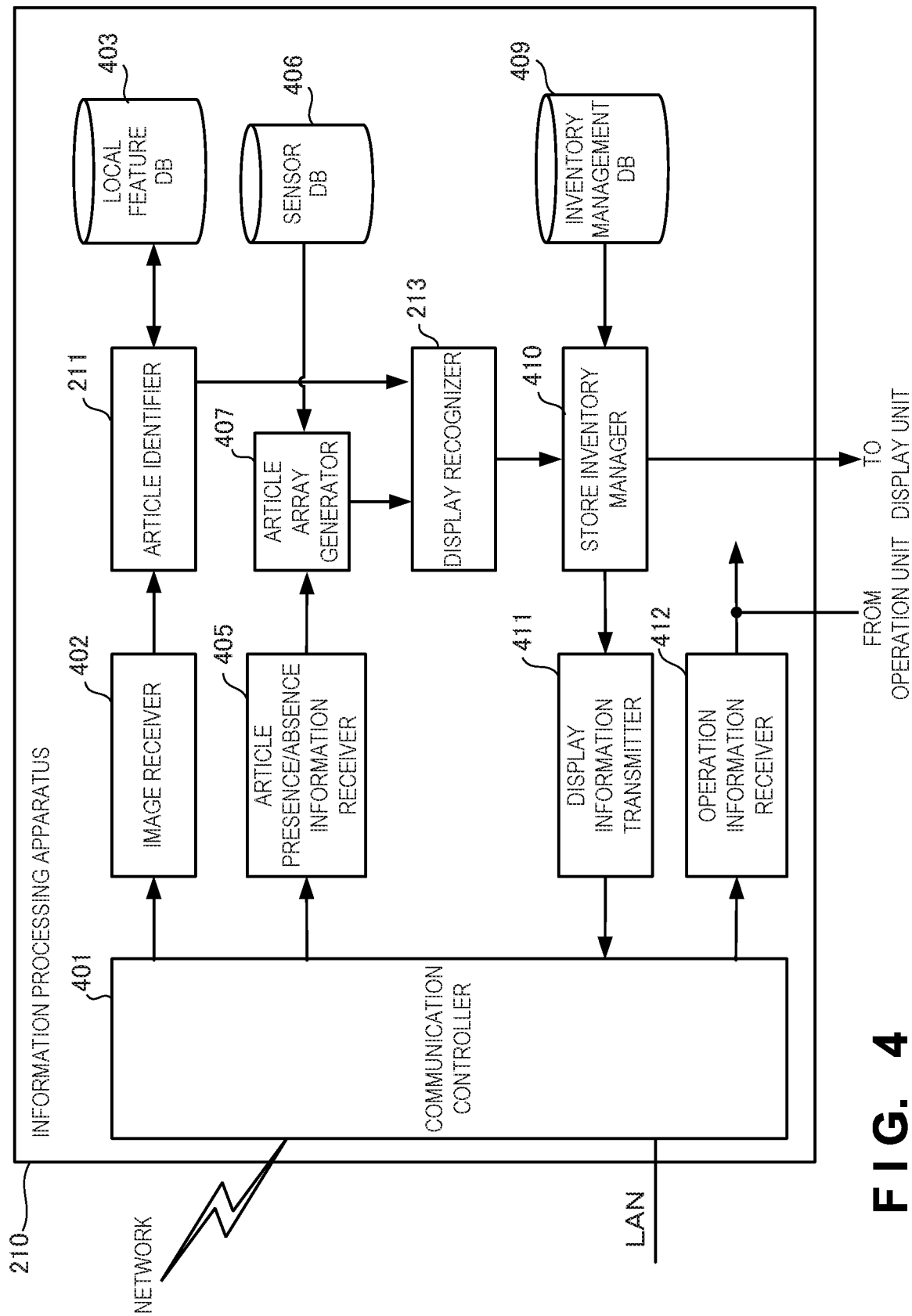
FIG. 4 is a block diagram showing the functional arrangement of the information processing apparatus according to the second embodiment of the present invention.

FIG. 4 is a block diagram showing the functional arrangement of the information processing apparatus 210 according to this embodiment. Note that the same reference numerals as in FIGS. 2A and 2B denote the same constituent elements in FIG. 4.

The information processing apparatus 210 includes a communication controller 401 that communicates via a WAN (Wide Area Network) or LAN (Local Area Network). An image receiver 402 receives, via the communication controller 401, the front image of a display shelf shot by the image captures 220. The article identifier 211 collates a local feature generated from an article image stored in a local feature database 403 with a local feature generated from the front image of the display shelf, and identifies a matching article in the front image of the display shelf. On the other hand, an article presence/absence information receiver 405 receives article presence/absence information from the article presence/absence sensor 230 via the communication controller 401.

An article array generator 407 refers to arrangement information of the article presence/absence sensor 230 in the display shelf stored in a sensor database 406 serving as a shelf allocation storage, and generates an article presence/absence array table representing the article array on the display shelf from the article presence/absence information. The display recognizer 213 links the article identification information identified by the article identifier 211 with the article presence/absence information generated by the article array generator 407 and determines the shelf allocation of the display shelf, and also calculates the display count on the display shelf. The display count is calculated by integrating the numbers of present articles linked with article columns having the same article identification information.

Based on the display count from the display recognizer 213, a store inventory manager 410 refers to an inventory management database 409 that holds inventory information of the store, and performs inventory management processing of articles to be displayed on, for example, the display shelves in the store. The result of inventory management is displayed on the display unit 214 such as a display or externally notified from a display information transmitter 411 via the communication controller 401. Each functional unit operates in accordance with an operation instruction received from an operation unit or received by an operation information receiver 41:2 via the communication controller 401.

(Local Feature Database)

Figure 5A:
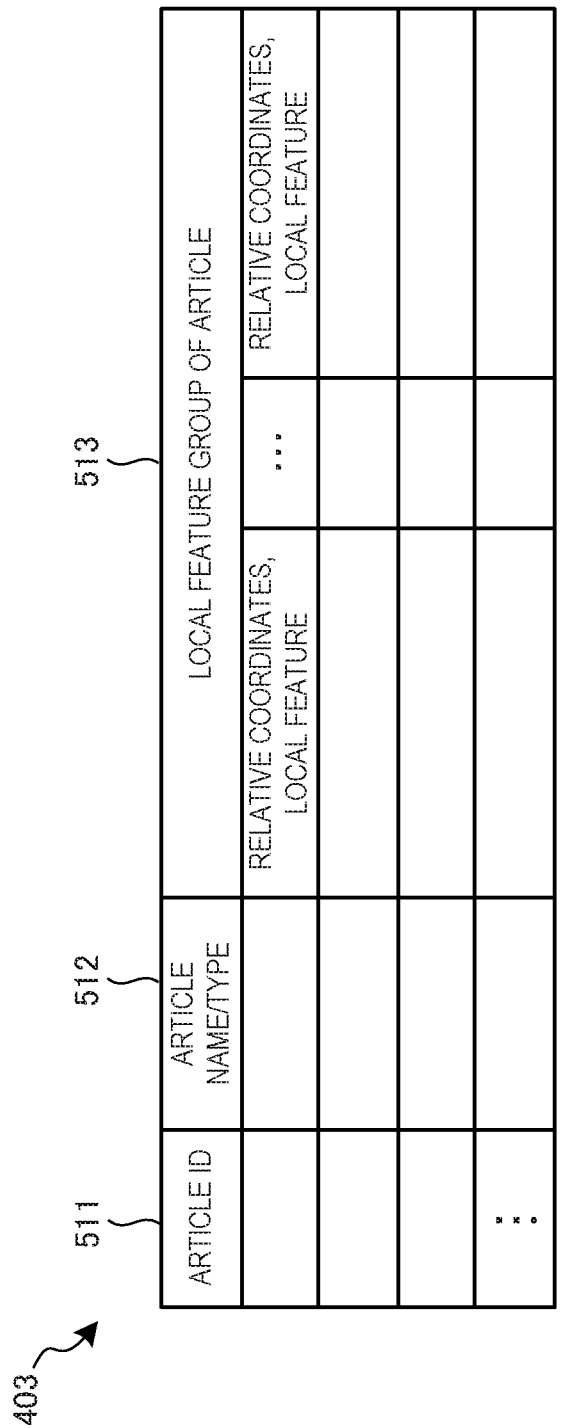
FIG. 5A is a view showing the arrangement of a local feature database according to the second embodiment of the present invention.

FIG. 5A is a view showing the arrangement of the local feature database 403 according to this embodiment. The local feature database 403 is used to store a local feature generated from the image of each article and identify an article upon comparison with a local feature generated from an input image. Note that the arrangement of the local feature database 403 is not limited to that shown in FIG. 5A.

The local feature database 403 stores an article name/type 512 and a local feature group 513 generated from an article in association with an article ID 511.

(Sensor Database)

Figure 5B:
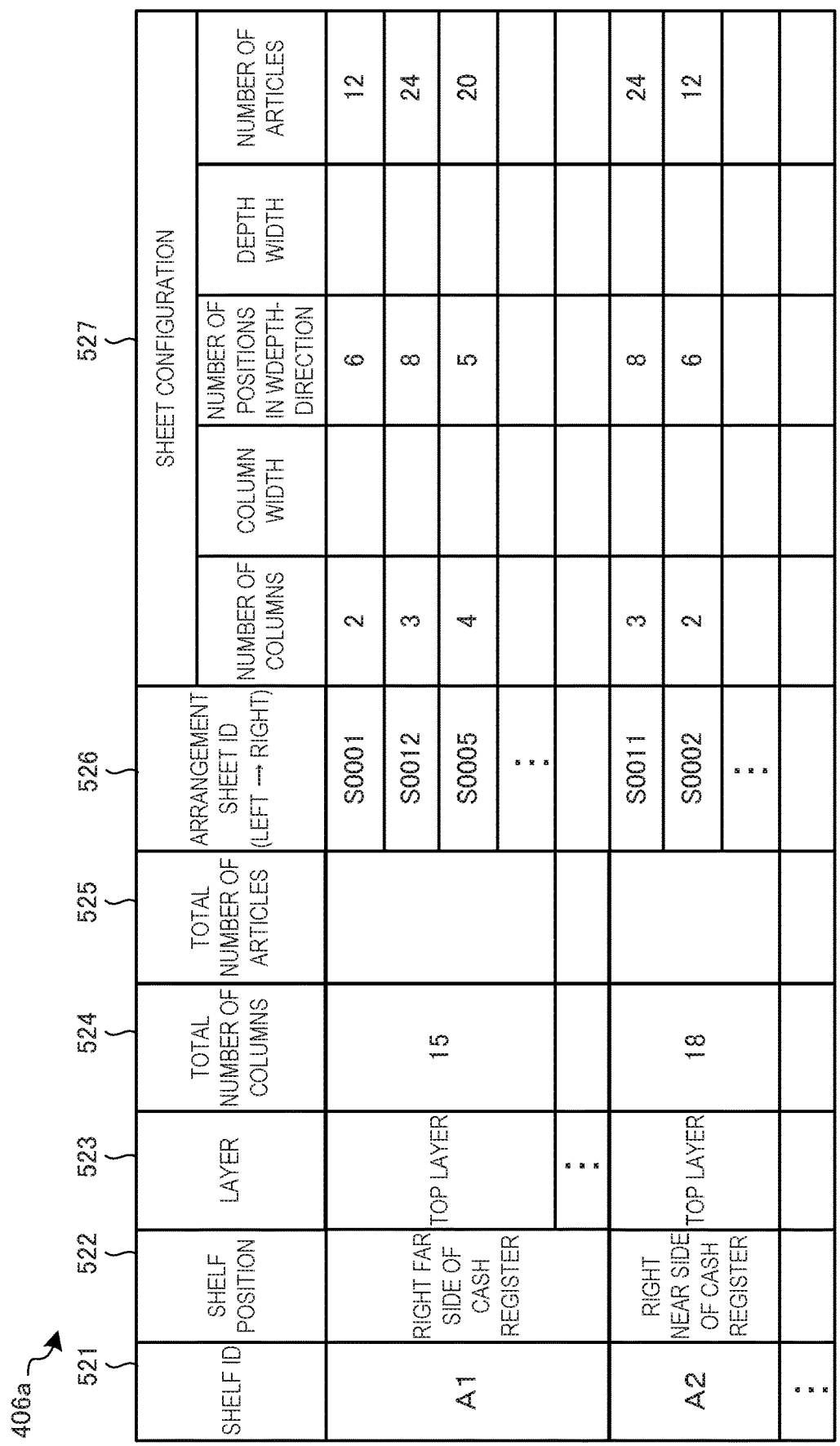
FIG. 5B is a view showing the arrangement of a sensor database according to the second embodiment of the present invention.

FIG. 5B is a view showing the arrangement of a sensor database 406a according to this embodiment. The sensor database 406a indicates part of the sensor database 406 shown in FIG. 4 and is used to store the position, in a display shelf, of an article presence/absence sensor arranged on the display shelf and link the article array of the front line of the display shelf with article presence/absence information from the article presence/absence sensor. Note that the arrangement of the sensor database 406a is not limited to that shown in FIG. 5B as long as the information associates the article presence/absence sensor with the position on the display shelf.

The sensor database 406 stores a shelf position 522 and a plurality of layers 523 in association with a shelf ID 521 of the display shelf. In association with each layer 523, a total number 524 of columns, a total number 525 of articles, and sheet IDs 526 of a plurality of article presence/absence detection sheets arranged on the layer are stored. A sheet configuration 527 is stored in association with each sheet ID 526. The article presence/absence detection sheet is a sheet having at least one column and including, in each column, a plurality of article presence/absence sensors as many as the number of depth-direction positions (see FIGS. 9A to 9E). The sheet configuration 527 includes the number of columns of sensors on the sheet, the column width, the number of depth-direction positions, the depth width, and the number of articles.

(Article Type Array Table)

FIG. 5C is a view showing the arrangement of an article type array table 530 according to this embodiment. The article type array table 530 is a table that stores articles that the article identifier 211 has identified from the front image of a display shelf.

The article type array table 530 stores a shelf position 532 and a plurality of layers 533 in association with a shelf ID 531. An identified article IC 534, an article name/type 535, and an article image 536 are stored in association with each layer 533. Note that the article image 536 may be a local feature.

(Article Presence/Absence Array Table)

FIG. 5D is a view showing the arrangement of an article presence/absence array table 540 according to this embodiment. The article presence/absence array table 540 is a table that stores an article presence/absence result that the article array generator 407 has received from an article presence/absence sensor.

In association with a sheet ID 541, the article presence/absence array table 540 stores columns 542 provided on a sheet, display counts 543 of the columns, and an article arrangement 544. Note that the article arrangement 544 stores the total number of depth-direction positions and the presence/absence of articles on the column. In FIG. 5D, article presence is indicated by ●, and article absence is indicated by ○. This storage form enables detection of an error of article absence sandwiched between article presences.

(Shelf Allocation and Display Count Table)

Figure 5E:
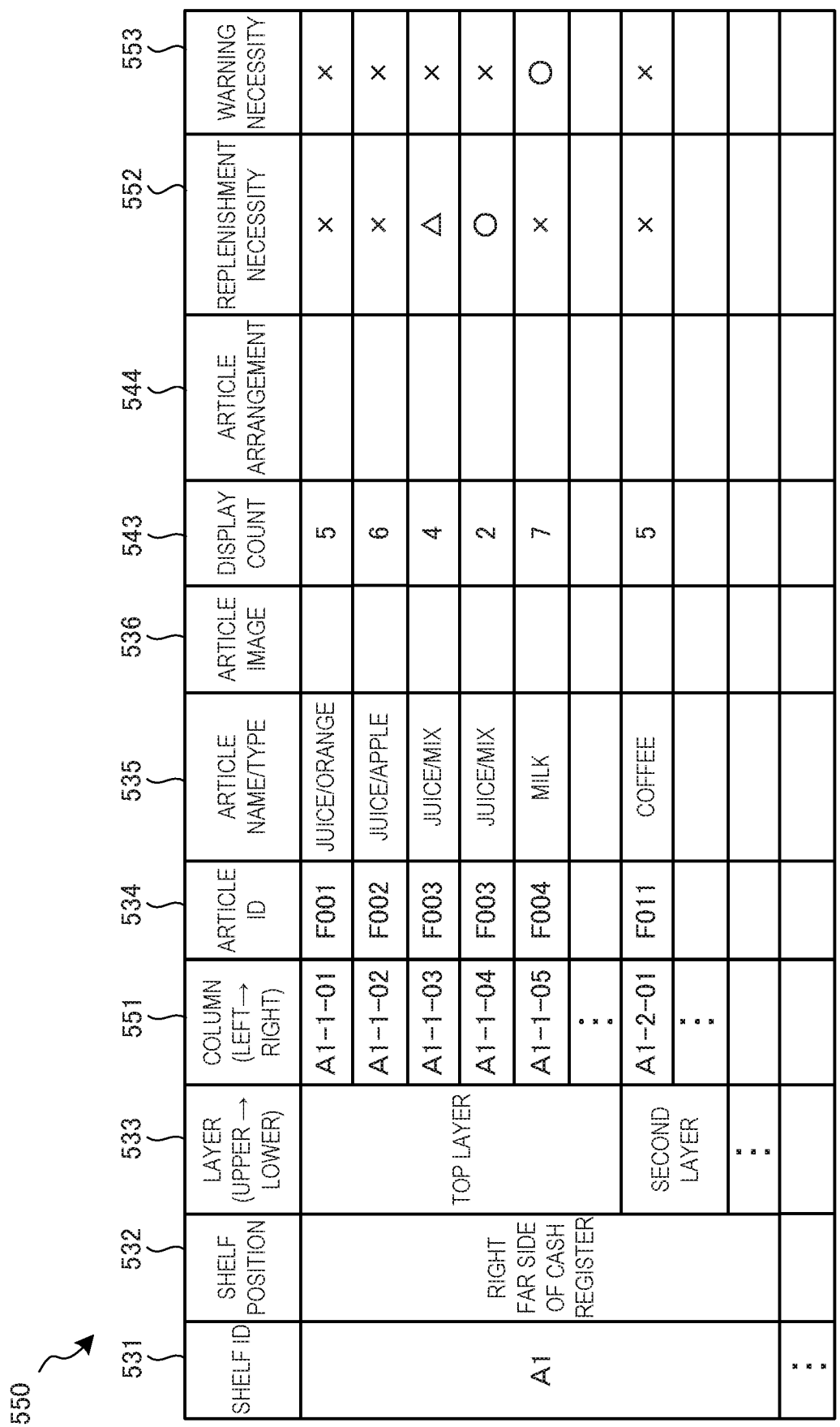
FIG. 5E is a view showing the arrangement of a shelf allocation and display count table according to the second embodiment of the present invention.

FIG. 5E is a view showing the arrangement of a shelf allocation and display count table 550 according to this embodiment. The shelf allocation and display count table 550 is a table that stores an article display position and a display count which are calculated after the display recognizer 213 links the article type array table 530 with the article presence/absence array table 540. Note that the same reference numerals as in FIGS. 5C and 5D denote the same items in FIG. 5E.

The shelf allocation and display count table 550 stores the shelf position 532 and the plurality of layers 533 in association with the shelf ID 531. In association with each layer 533, columns 551 are stored sequentially from the left to the right of the layer. In association with each column 551, the article IC 534, the article name/type 535, the article image 536, the display count 543, and the article arrangement 544 of the column are stored.

A replenishment necessity flag 552 is stored based on the display count 543 of each column. In FIG. 5E, "○" indicates "replenishment necessary", "Δ" indicates "attention to replenishment", and "×" indicates "replenishment unnecessary". In addition, a warning necessity flag 553 is stored based on the article arrangement 544 of each column. In FIG. 5E, "○" indicates "warning necessary", and "×" indicates "warning unnecessary". Note that in FIG. 5E, an error of article absence sandwiched between article presences is discriminated in the fifth column, as in FIG. 5D.

<<Article Identifier>>

Examples of the arrangement of the article identifier 211 will be described below with reference to FIGS. 6A to 6G. Note that the article identifier 211 according to this embodiment is not limited to those shown in FIGS. 6A to 6G.

Arrangement Example

Figure 6A:
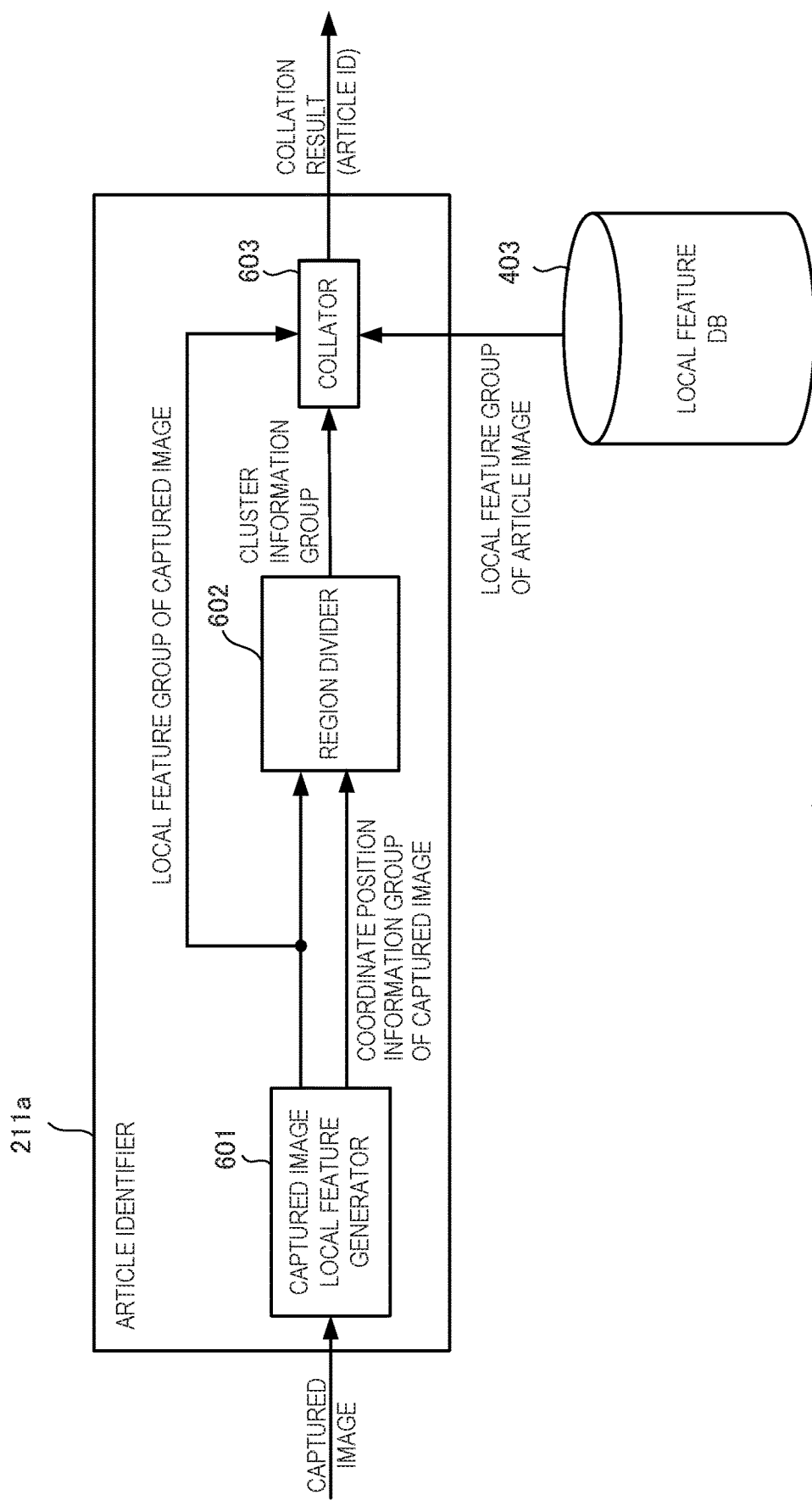
FIG. 6A is a block diagram showing an arrangement of an article identifier according to the second embodiment of the present invention.

FIG. 6A is a block diagram showing the arrangement of an article identifier 211a according to this embodiment. The article identifier 211a is an example of the article identifier 211 shown in FIG. 4, and includes a captured image local feature generator 601, a region divider 602, and a collator 603.

The captured image local feature generator 601 detects a number of feature points from the shot front image of the display shelf, and outputs the coordinate position information group of the captured image formed from the coordinate positions of the large number of feature points to the region divider 602. The captured image local feature generator 601 also outputs, to the collator 603, the local feature group of the captured image formed from the local features of peripheral regions (neighboring regions) including the feature points based on the coordinate positions of the feature points.

The region divider 602 clusters the feature points of the captured image using the coordinate position information group of the captured image output from the captured image local feature generator 601, and also outputs, to the collator 603, a cluster information group formed from a plurality of pieces of cluster information associated with the plurality of clusters including one or more feature points.

The collator 603 uses the local feature group of the captured image output from the captured image local feature generator 601, the local feature group of an article image stored in the local feature database 403, and the cluster information group output from the region divider 602. The collator 603 collates the local feature group of the captured image with the local feature group of the article image on a cluster basis, thereby determining identity or similarity to each feature point. As a result, the collator 603 identifies an identical or similar object between the captured image and the article image, and outputs the article ID as the identification result (collation result). Concerning a feature point determined to be identical or similar, the collator 603 may output information of a region of the captured image determined to be identical or similar based on the coordinate position information of a feature point belonging to the cluster.

Figure 6B:
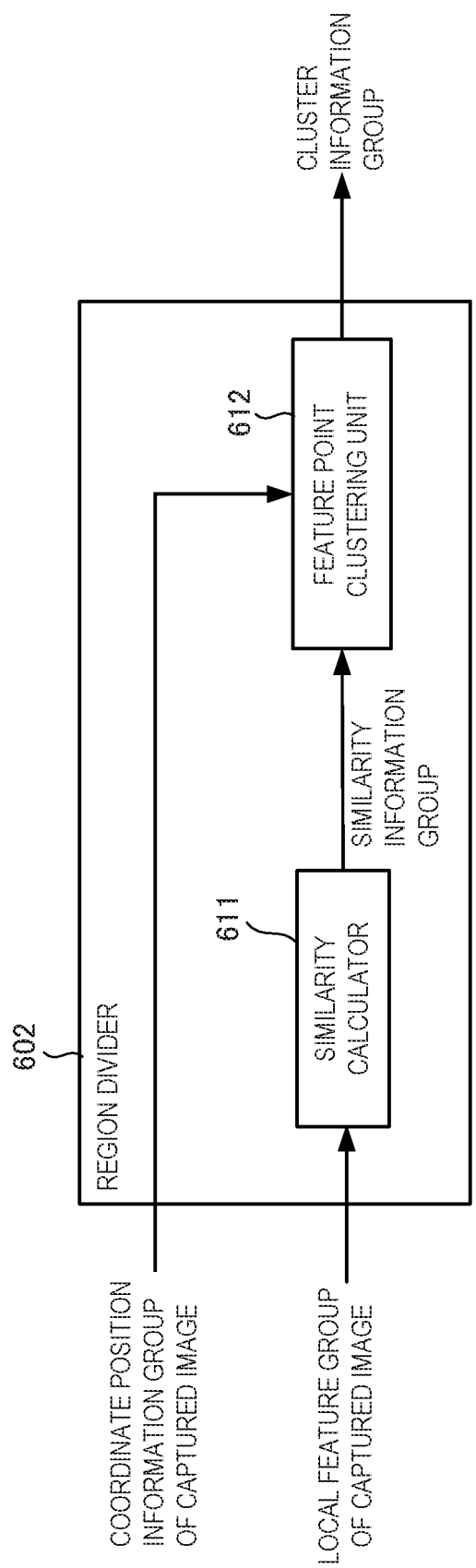
FIG. 6B is a block diagram showing the arrangement of a region divider in the article identifier shown in FIG. 6A according to the second embodiment of the present invention.

FIG. 6B is a block diagram showing the arrangement of the region divider 602 in the article identifier 211a shown in FIG. 6A according to this embodiment. The region divider 602 includes a similarity calculator 611 and a feature point clustering unit 612.

The similarity calculator 611 calculates the similarity between two arbitrary local features in the local feature group of the captured image output from the captured image local feature generator 601, and outputs a number of calculated similarities to the feature point clustering unit 612 as similarity information group. A method of calculating the similarity between local features is assumed to, for example, calculate the feature distance (for example, Euclidean distance) between two arbitrary local features and calculate the similarity based on the distance. At this time, if the distance value is small, the similarity is made high, and if the distance value is large, the similarity is made low. A method of normalizing the feature distance by a predetermined value and calculating the similarity from the normalized value is also assumed to be used.

The feature point clustering unit 612 clusters the feature points of the captured image using the coordinate position information group of the captured image output from the captured image local feature generator 601 and the similarity information group output from the similarity calculator 611, and outputs a cluster information group representing the clustering result to the collator 603. The feature point clustering unit 612 performs clustering to, for example, classify local features having a high similarity (small distance value) to different clusters. To cluster the feature points, for example, a method of calculating the distance between an arbitrary feature point of the captured image and each cluster center of gravity and classifying the feature point to a cluster where the calculated distance is minimized is assumed to be used. At this time, if feature points of similarities equal or more than a threshold are included in an arbitrary cluster, a feature point whose distance to the cluster center of gravity is long is excluded from the cluster and classified into another cluster. As the distance between each feature point and the cluster center of gravity, for example, a Euclidean distance, Mahalanobis distance, or city block distance (Manhattan distance) may be used.

Clustering may be done using a graph cut method. For example, graph cut may be provided to a graph obtained by calculating an edge value based on the distance between feature points and the similarity between the local features using the feature points as nodes (for example, making the edge value between two nodes large if the distance between the feature points is short, and the similarity between the local features is high). As the graph cut, for example, normalized cut or the Markov cluster algorithm may be used.

Another Arrangement Example

Figure 6C:
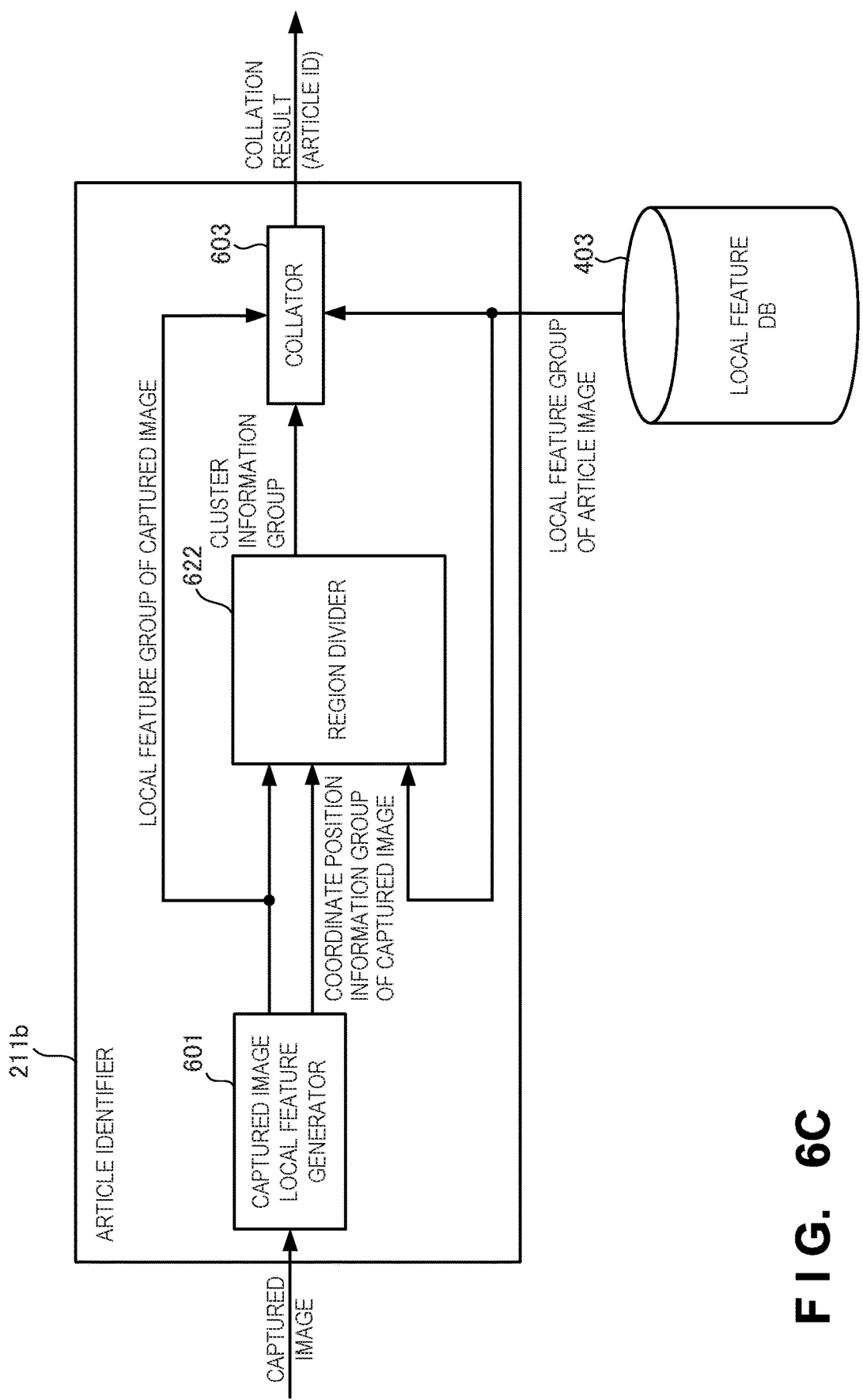
FIG. 6C is a block diagram showing another arrangement of the article identifier according to the second embodiment of the present invention.

FIG. 6C is a block diagram showing the arrangement of an article identifier 211b according to this embodiment. The article identifier 211b is another example of the article identifier 211 shown in FIG. 4, and includes the captured image local feature generator 601, a region divider 622, and the collator 603. The operations of the captured image local feature generator 601 and the collator 603 are the same as in FIG. 6A, and a description thereof will be omitted here. The operation of the region divider 622 will mainly be described below.

The region divider 622 uses the local feature group of the captured image and the coordinate position information group of the captured image output from the captured image local feature generator 601, and the local feature group of an article image output from the local feature database 403. The region divider 622 clusters the feature points of the captured image and outputs a cluster information group associated with the clustering result to the collator 603.

Figure 6D:
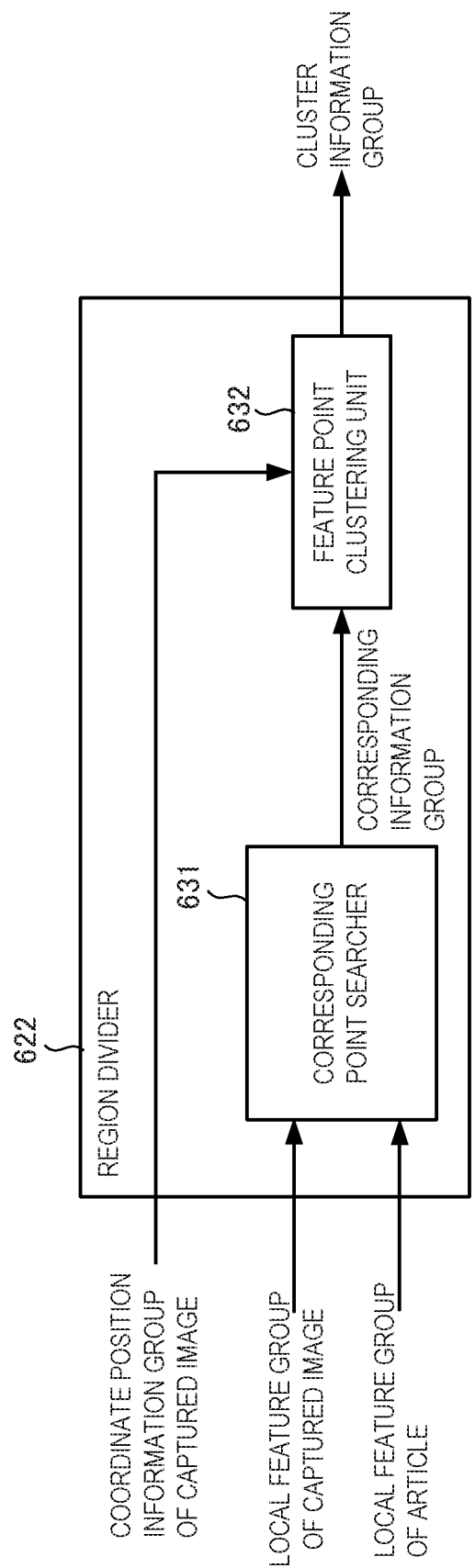
FIG. 6D is a block diagram showing the arrangement of a region divider in the article identifier shown in FIG. 6C according to the second embodiment of the present invention.

FIG. 6D is a block diagram showing the arrangement of the region divider 622 in the article identifier 211b shown in FIG. 6C according to this embodiment. The region divider 622 includes a corresponding point searcher 631 and a feature point clustering unit 632.

The corresponding point searcher 631 uses the local feature group of the captured image output from the captured image local feature generator 601 and the local feature group of an article image output from the local feature database 403. The corresponding point searcher 631 generates corresponding information that is information representing which local feature of the local feature group of the article image matches an arbitrary local feature included in the local feature group of the captured image, that is, which feature point of the article image corresponds to an arbitrary feature point of the captured image. The corresponding point searcher 631 also outputs a number of pieces of generated corresponding information to the feature point clustering unit 632 as a corresponding information group.

To generate the corresponding information, for example, the same method as that of the collator 603 shown in FIG. 6A is assumed to be used. As the corresponding relationship, a given feature point of the article image may correspond to a plurality of feature points of the captured image. In addition, the feature points of the captured image may correspond to the feature points of the article image in a one-to-one correspondence.

The feature point clustering unit 632 uses the coordinate position information group output from the captured image local feature generator 601 and the corresponding information group output from the corresponding point searcher 631. The feature point clustering unit 632 selects feature points having the corresponding relationship with feature points of the article image out of the feature points of the captured image, and clusters the selected feature points of the captured image based on their coordinate positions. The feature point clustering unit 632 also outputs a cluster information group representing the result of clustering to the collator 603. To cluster the feature points, a known method is assumed to be used.

If a feature point of the article image corresponds to a plurality of feature points of the captured image, the feature point clustering unit 632 may cluster the feature points of the captured image to different clusters. To do this, the feature point clustering unit 632 is assumed to use clustering by graph cut. In this case, if a feature point of the article image corresponds to a plurality of feature points of the captured image, a graph is assumed to be generated using the plurality of feature points of the captured image as nodes such that the edge values between the nodes become small, and graph cut is applied to divide the nodes having a small edge value. As the graph cut, for example, normalized cut or the Markov cluster algorithm may be used.

If the distance between two arbitrary feature points of a first image is short (for example, the distance value is smaller than a threshold), and the feature point distance in the article image corresponding to the feature points is long (for example, the distance value is larger than another threshold), the feature point clustering unit 632 may classify the two feature points of the captured image to different clusters. To do this, clustering by graph cut is assumed to be used, as in the above-described case.

The feature point clustering unit 632 may use, for example, a method of counting, for each analysis region having an arbitrary size, feature points included in the region and if the count value is equal to or larger than a predetermined threshold, classifying the feature points included in the region to the same cluster. When the feature points are clustered in this way, processing can be performed at a higher speed.

Still Another Arrangement Example

Figure 6E:
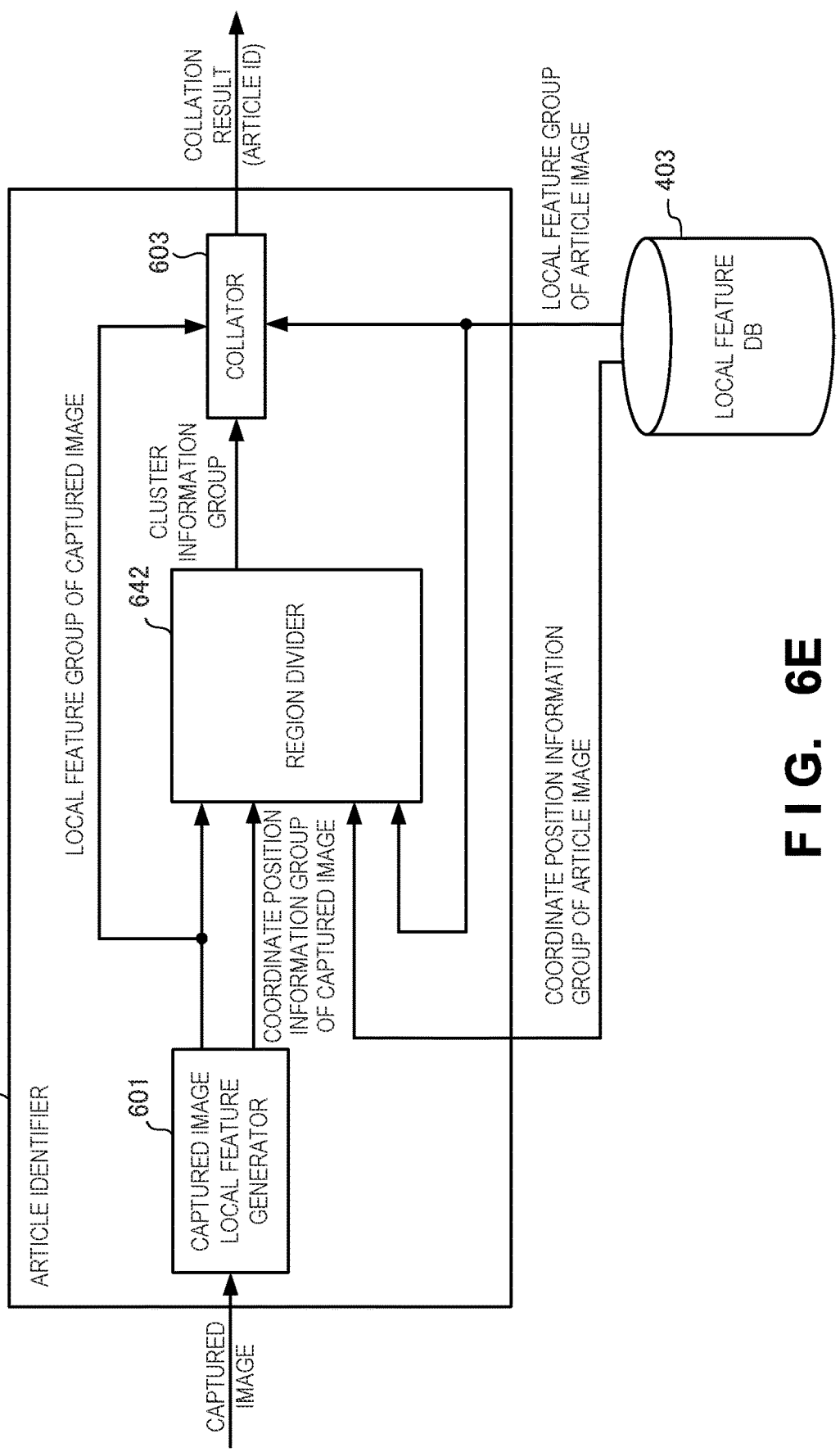
FIG. 6E is a block diagram showing still another arrangement of the article: identifier according to the second embodiment of the present invention.

FIG. 6E is a block diagram showing the arrangement of an article identifier 211c according to this embodiment. The article identifier 211c is still another example of the article identifier 211 shown in FIG. 4, and includes the captured image local feature generator 601, a region divider 642, and the collator 603. The operations of the captured image local feature generator 601 and the collator 603 are the same as in FIGS. 6A and 6C, and a description thereof will be omitted here.

The region divider 642 uses the local feature group of the captured image and the coordinate position information group of the captured image output from the captured image local feature generator 601, and the local feature group of an article image and the coordinate position information group of the article image output from the local feature database 403. The region divider 642 clusters the feature points of the captured image and outputs a cluster information group representing the clustering result to the collator 603.

Figure 6F:
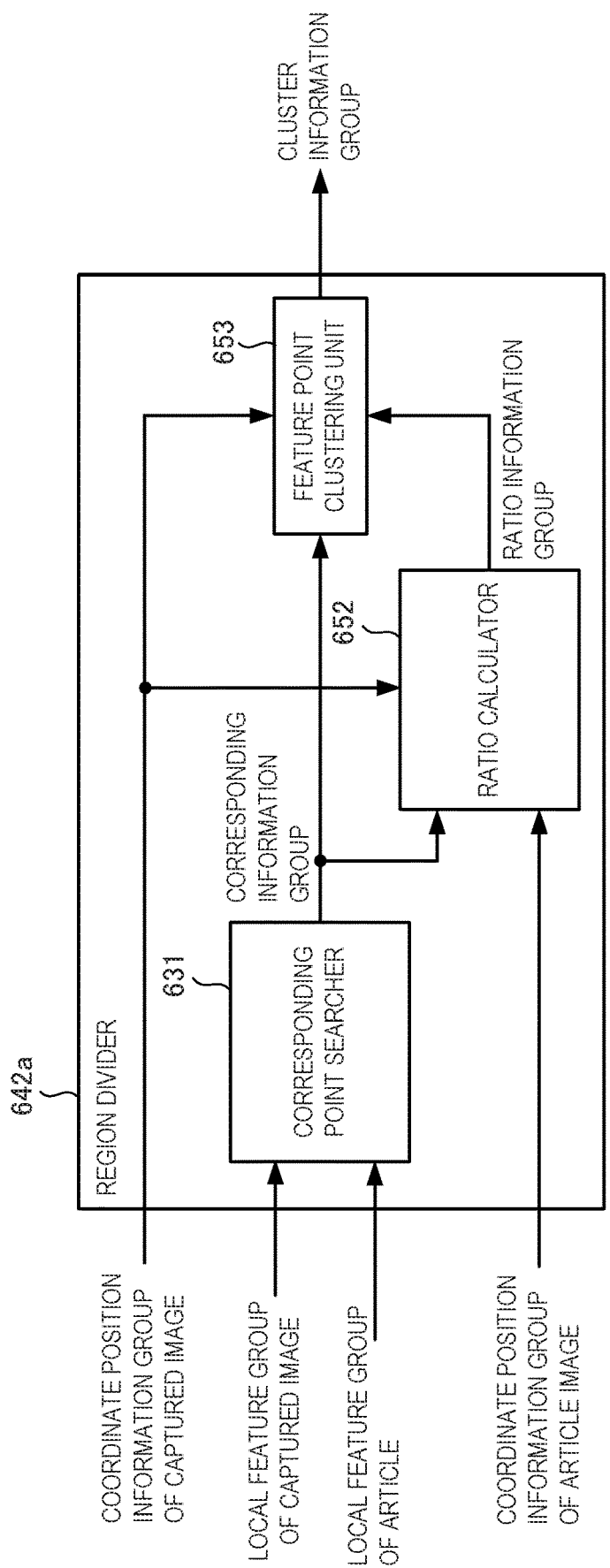
FIG. 6F is a block diagram showing an arrangement of a region divider in the article identifier shown in FIG. 6E according to the second embodiment of the present invention.

FIG. 6F is a block diagram showing the arrangement of a region divider 642a in the article identifier 211c shown in FIG. 6E according to this embodiment. The region divider 642a is an example of the region divider 642 shown in FIG. 6E, and includes the corresponding point searcher 631, a ratio calculator 652, and a feature point clustering unit 653.

The corresponding point searcher 631 generates a corresponding information group by the same operation as in FIG. 6D, and outputs the generated corresponding information group to the ratio calculator 652 and the feature point clustering unit 653.

The ratio calculator 652 uses the local feature group of the captured image output from the captured image local feature generator 601, the local feature group of an article image output from the local feature database 403, and the corresponding information group output from the corresponding point searcher 631. The ratio calculator 652 calculates the ratio of the distance (to be referred to as a feature point distance hereinafter) between two arbitrary feature points of the captured image to the feature point distance in a second image corresponding to the feature points, and outputs a number of calculated ratios to the feature point clustering unit 653 as a ratio information group. As the feature point distance, for example, a Euclidean distance, Mahalanobis distance, or city block distance is assumed to be used.

The feature point clustering unit 653 uses the coordinate position information group of the captured image output from the captured image local feature generator 601, the corresponding information group output from the corresponding point searcher 631, and the ratio information group output from the ratio calculator 652. The feature point clustering unit 653 clusters the feature points of the captured image and outputs a cluster information group representing the clustering result to the collator 603. Clustering is assumed to be performed so as to, for example, classify feature points for which the calculated ratio difference is small to the same cluster (classify feature points for which the ratio difference is large to different clusters). At this time, clustering is performed using graph cut. More specifically, for example, graph cut is assumed to be applied to a graph obtained by making the edge value between nodes large based on the distance between feature points and the ratio difference using the feature points as the nodes. As the graph cut, for example, normalized cut or the Markov cluster algorithm may be used.

The feature point clustering unit 653 is also assumed to, for example, cluster the feature points of the captured image in the following way using the coordinate position information group, the corresponding information group, and the ratio information group. In this case, a belonging probability that a given feature point belongs to an arbitrary cluster is calculated using the ratio information group between the feature point and a plurality of peripheral feature points. In this case, the feature point clustering unit 653 performs clustering based on the calculated belonging probability and the coordinate position information of the feature point. To cluster the feature points, for example, a method of selecting a feature point of the captured image corresponding to an arbitrary feature point of an article image based on the corresponding information group, calculating the distance between the feature point and each cluster center of gravity based on the coordinate position information and the belonging probability, and classifying the feature point to a cluster where the calculated distance is minimized is assumed to be used.

Figure 6G:
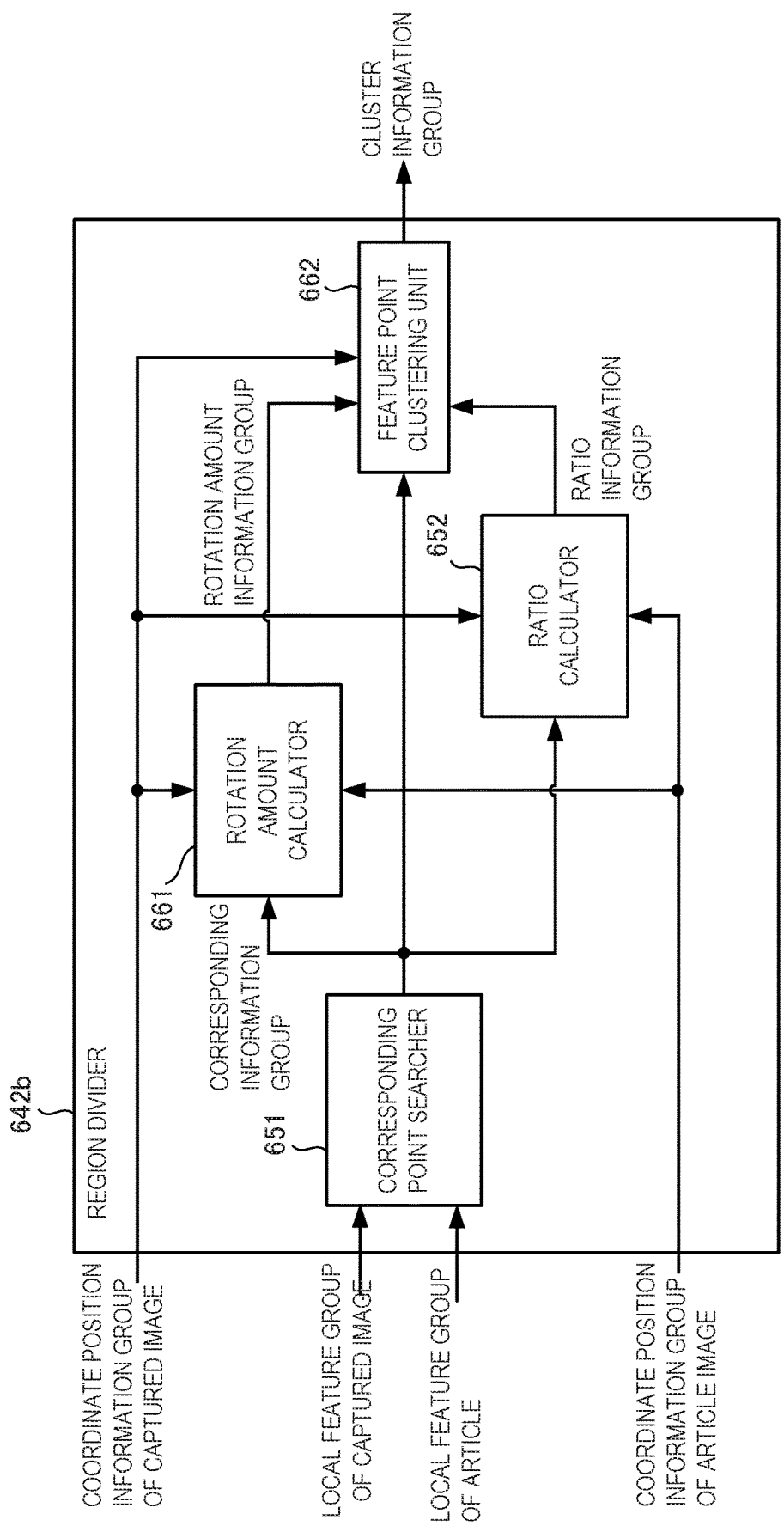
FIG. 6G is a block diagram showing another arrangement of the region divider in the article identifier shown in FIG. 6E according to the second embodiment of the present invention.

FIG. 6G is a block diagram showing the arrangement of a region divider 642b in the article identifier 211c shown in FIG. 6E according to this embodiment. The region divider 642b is another example of the region divider 642 shown in FIG. 6E, and includes the corresponding point searcher 631, the ratio calculator 652, a rotation amount calculator 661, and a feature point clustering unit 662. The operation of the ratio calculator 652 is the same as in FIG. 6F, and a description thereof will be omitted here.

The corresponding point searcher 631 generates a corresponding information group by the same operation as in FIG. 6D, and outputs the generated corresponding information group to the ratio calculator 652, the rotation amount calculator 661, and the feature point clustering unit 662.

The rotation amount calculator 661 uses the coordinate position information group of the captured image output from the captured image local feature generator 601, the corresponding information group output from the corresponding point searcher 631, and the coordinate position information group of an article image output from the local feature database 403. The rotation amount calculator 661 calculates the direction of a vector formed by two feature points of the captured image and the direction of a vector formed by two feature points of the article image. The rotation amount calculator 661 also calculates the rotation amount of the object of the captured image from the calculated vector directions, and outputs a number of calculated rotation amounts to the feature point clustering unit 662 as a rotation amount information group.

The feature point clustering unit 662 uses the coordinate position information group of the captured image output from the captured image local feature generator 601, the corresponding information group output from the corresponding point searcher 631, the ratio information group output from the ratio calculator 652, and the rotation amount information group output from the rotation amount calculator 661. The feature point clustering unit 662 clusters the feature points of the captured image. In addition, the feature point clustering unit 662 outputs a cluster information group associated with each cluster obtained as the result of clustering to the collator 603.

For example, feature points for which the calculated ratio difference and rotation amount difference are small may be classified to the same cluster (feature points for which the ratio difference and the rotation amount difference are large may be classified to different clusters). Clustering is assumed to be performed using, for example, graph cut. For example, graph cut may be provided to a graph obtained by calculating an edge value based on the distance, the ratio difference, and the rotation amount difference between feature points using feature points as nodes (for example, making the edge value between two nodes large if the distance value between the feature points is short, and the ratio difference and the rotation amount difference are small). As the graph cut, for example, normalized cut or the Markov cluster algorithm is assumed to be used.

Referring to FIG. 6G, a relative coordinate position database including a table representing the relative coordinate positions of the reference point (for example, object center) of the article image and the feature points of the article image may be provided. The reference point is a predetermined coordinate position on the second image. The reference point can be the object center or the coordinate position of the upper left corner of the article image, as described above. A description will be made below assuming that the reference point indicates the object center.

The feature point clustering unit 662 uses the coordinate position information group of the captured image output from the captured image local feature generator 601, the corresponding information group output from the corresponding point searcher 631, the ratio information group output from the ratio calculator 652, the rotation amount information group output from the rotation amount calculator 661, and the relative coordinate position stored in the relative coordinate position database. The feature point clustering unit 662 clusters the feature points of the captured image. In addition, the feature point clustering unit 662 outputs a cluster information group representing the result of clustering to the collator 603.

To cluster the feature points, for example, a method of selecting, out of the feature points of the captured image, a number of feature points corresponding to an arbitrary feature point of the article image based on the corresponding information group, estimating the object center point of the captured image based on the coordinate positions of the selected feature points, and clustering the estimated object center points based on their coordinate positions is usable. To cluster the object center points, for example, a method of counting, for each analysis region having an arbitrary size, object center points included in the region and if the count value is equal to or larger than a predetermined threshold, classifying the object center points included in the region to the same cluster may be used. When the object center points are clustered in this way, processing can be performed at a higher speed.

<<Local Feature Generator>>

FIG. 7A is a block diagram showing the arrangement of the local feature generator 601 according to this embodiment. The local feature generator 601 includes a feature point detector 711, a local region acquirer 712, a subregion divider 713, a subregion feature vector generator 714, and a dimension selector 715.

The feature point detector 711 detects a number of characteristic points (feature points) from image data, and outputs the coordinate position, scale (size), and angle of each feature point. The local region acquirer 712 acquires a local region to do feature extraction from the coordinate position, scale, and angle of each detected feature point. The subregion divider 713 divides the local region into subregions. For example, the subregion divider 713 can divide the local region into 16 blocks (4×4 blocks) or 25 blocks (5×5 blocks). Note that the number of divisions is not limited. In this embodiment, a description will be made below representatively assuming a case where the local region is divided into 25 blocks (5×5 blocks).

The subregion feature vector generator 714 generates a feature vector for each subregion of the local region. As the feature vector of a subregion, for example, a gradient direction histogram can be used. Based on the positional relationship between the subregions, the dimension selector 715 selects dimensions to be output as local features such that the correlation between the feature vectors of subregions in close vicinity lowers (for example, dimensions are deleted or thinned out). The dimension selector 715 can not only simply select dimensions but also decide the priority order of selection. That is, the dimension selector 715 can select dimensions according to a priority order so as to, for example, prohibit dimensions in the same gradient direction from being selected for adjacent subregions. The dimension selector 715 outputs feature vectors formed from the selected dimensions as local features. Note that the dimension selector 715 can output the local features in a state in which the dimensions are rearranged based on the priority order.

<<Processing of Local Feature Generator>>

FIGS. 7B to 7F are views showing the processing of the local feature generator 601 according to this embodiment.

Figure 7B:
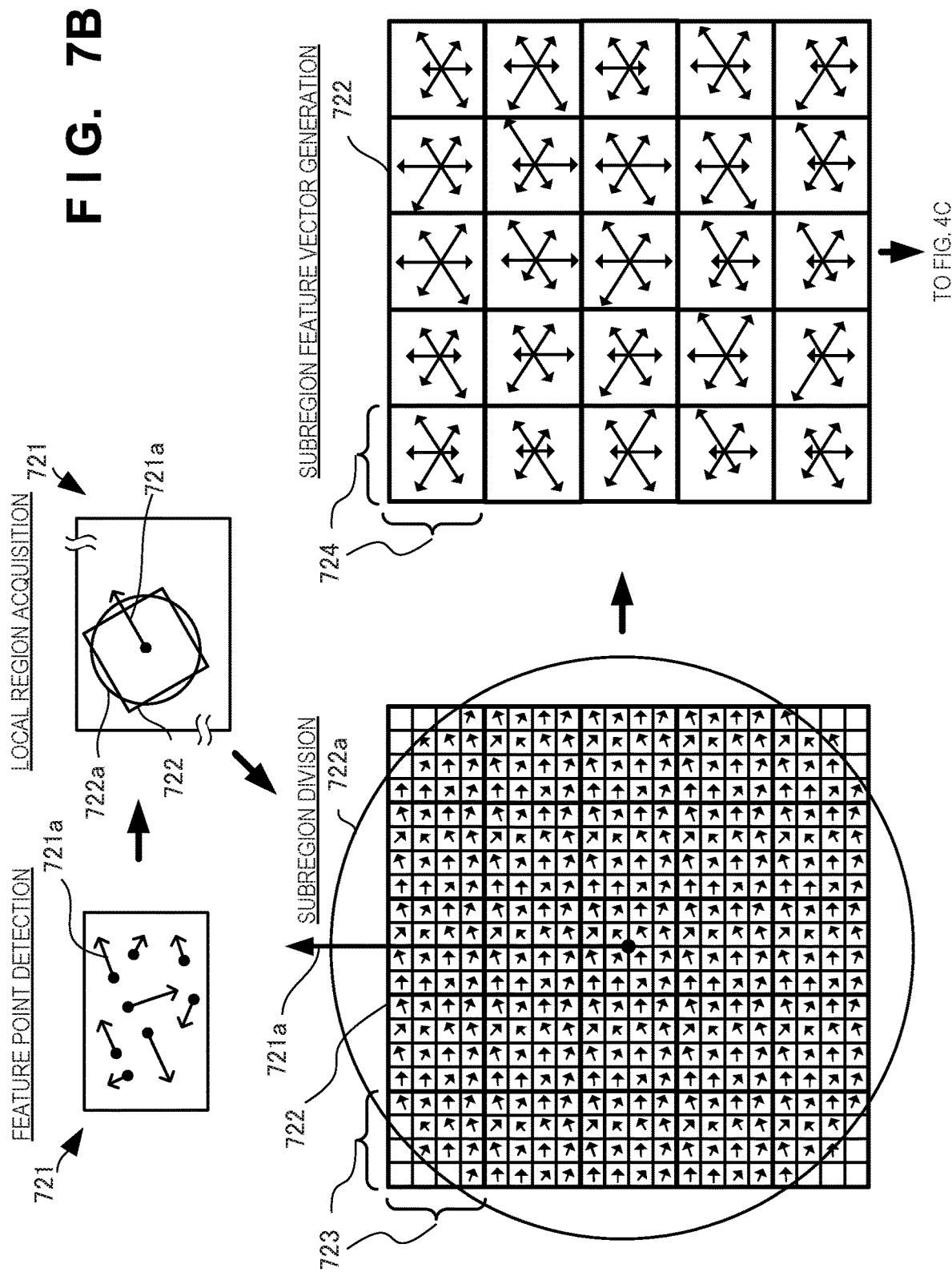
FIG. 7B is a view for explaining the procedure of local feature generation according to the second embodiment of the present invention.

FIG. 7B is a view showing a series of processes of feature point detection/local region acquisition/subregion division/ feature vector generation in the local feature generator 601. For more information of the series of processes, see U.S. Pat. No. 6,711,293 or David. G. Lowe, "Distinctive image features from scale-invariant key points", (U.S.A.), International Journal of Computer Vision, 60(2), 2004, pp. 91-110.

(Feature Point Detector)

An image 721 shown in FIG. 7B shows a state in which feature points are detected from an image of a video by the feature point detector 711 shown in FIG. 7A. Local feature generation will be explained below representatively using one feature point data 721a. The starting point of the arrow of the feature point data 721a represents the coordinate position of the feature point, the length of the arrow represents the scale (size), and the direction of the arrow represents the angle. As the scale (size) or direction, a brightness, chroma, hue, or the like can be selected in accordance with the target video. In the example of FIG. 7B, a case where six directions are set at an interval of 60° will be described. However, the present invention is not limited to this.

(Local Region Acquirer)

The local region acquirer 712 shown in FIG. 7A generates, for example, a Gaussian window 722a with respect to the starting point of the feature point data 721a as the center, and generates a local region 722 including most of the Gaussian window 722a. In the example of FIG. 7B, the local region acquirer 712 generates the square local region 722. However, the local region may have a circular shape or any other shape. The local region is acquired for each feature point. If the local region is circular, robustness in the capturing direction improves.

(Subregion Divider)

A state in which the subregion divider 713 divides the scale and angle of each pixel included in the local region 722 of the feature point data 721a into subregions 723 is illustrated. Note that FIG. 7B shows an example in which the local region is divided into 5×5=25 subregions each formed from 4×4=16 pixels. However, the subregions may have another shape, and another number of divisions such as 4×4=16 may be employed.

(Subregion Feature Vector Generator)

The subregion feature vector generator 714 generates a histogram for each of the angles of six directions based on the scales of the pixels in each subregion and quantizes the histogram to obtain a feature vector 724 of the subregion. That is, the directions are normalized to the angles output from the feature point detector 711. The subregion feature vector generator 714 totals the frequencies of the six directions quantized on a subregion basis to generate a histogram. In this case, the subregion feature vector generator 714 outputs feature vectors formed from 25 subregion blocks×6 directions=a 150-dimensional histogram generated for each feature point. The gradient directions need not always be quantized to six directions and can be quantized to an arbitrary quantization number such as four directions, eight directions, or 10 directions. When quantizing the gradient directions to D directions, letting G (0 to $2\pi$ radian) be the gradient direction before quantization, a quantization value $Qq$ ($q=0, \ldots D-1$) in the gradient direction can be obtained by $$Qq = \text{floor}(G \times D/2\pi) \quad (1)$$

or $$Qq = \text{round}(G \times D/2\pi) \bmod D \quad (2)$$

However, the present invention is not limited to this.

Here, floor( ) is a function of dropping fractions below the decimal point, round( ) is a function of performing rounding, and mod is an operation of obtaining the remainder. When generating a gradient histogram, the subregion feature vector generator 714 may add and total the magnitudes of the gradients, instead of totaling simple frequencies. When totaling gradient histograms, the subregion feature vector generator 714 may add a weight value not only to a subregion to which a pixel belongs but also to a subregion in close vicinity (for example, adjacent block) in accordance with the distance between the subregions. The subregion feature vector generator 714 may also add a weight value to gradient directions before and after the quantized gradient directions. Note that the feature vector of a subregion is not limited to a gradient direction histogram, and any data having a plurality of dimensions (elements) such as color information can be used. In this embodiment, a description will be made assuming that a gradient direction histogram is used as the feature vector of a subregion.

(Dimension Selector)

Processing of the dimension selector 715 in the local feature generator 601 will be described next with reference to FIGS. 7C to 7F.

Based on the positional relationship between the subregions, the dimension selector 715 selects (thins out) dimensions (elements) to be output as a local feature such that the correlation between the feature vectors of subregions in close vicinity lowers. More specifically, the dimension selector 715 selects dimensions such that, for example, at least one gradient direction changes between adjacent subregions. Note that in this embodiment, the dimension selector 715 mainly uses an adjacent subregion as a subregion in close vicinity. However, the subregion in close vicinity is not limited to the adjacent subregion and, for example, a subregion within a predetermined distance from the target subregion may be used as a subregion in close vicinity.

Figure 7C:
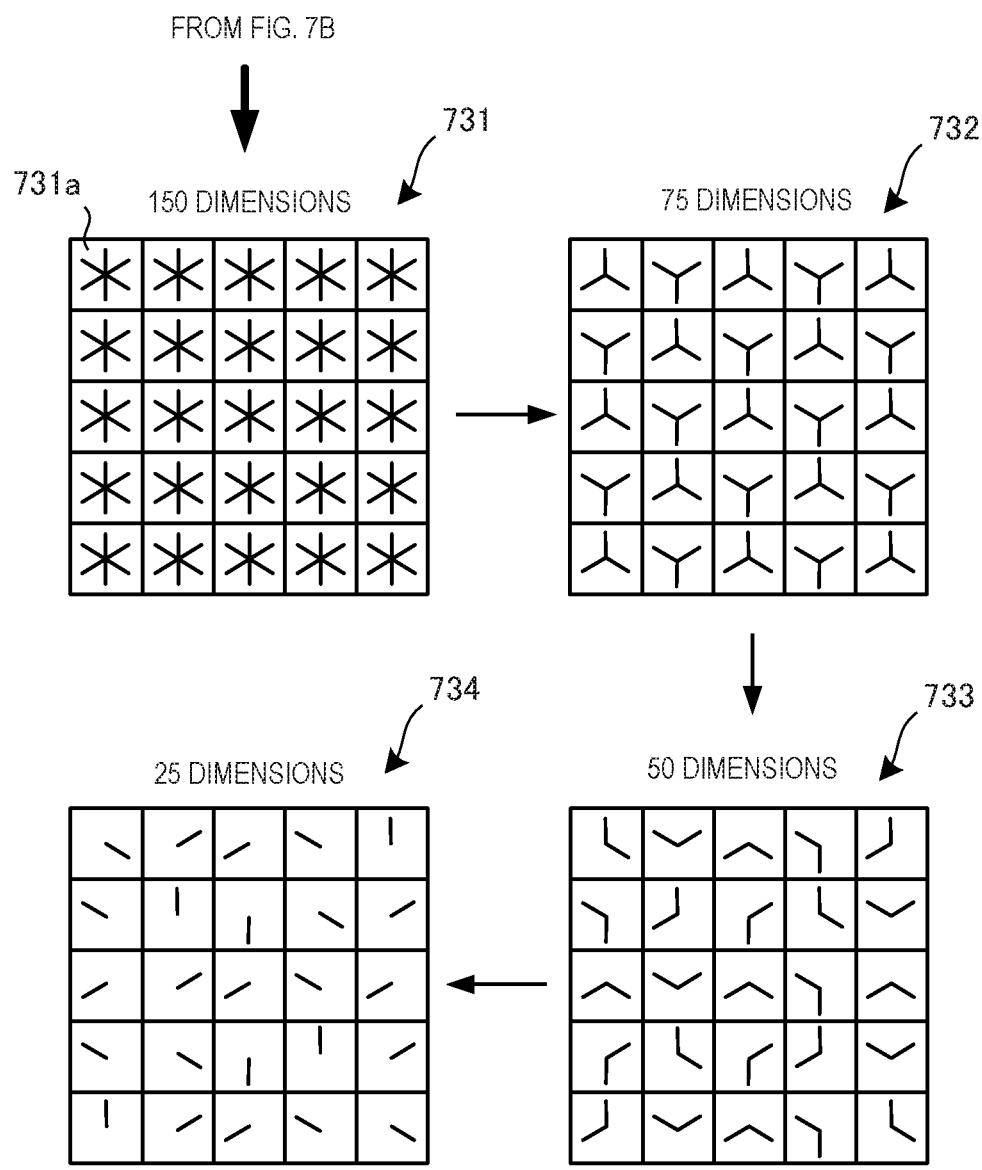
FIG. 7C is a view for explaining the procedure of local feature generation according to the second embodiment of the present invention.

FIG. 7C is a view showing an example in which dimensions are selected from feature vectors 731 of 150-dimensional gradient histograms generated by dividing a local region into subregions of 5×5 blocks and quantizing the gradient directions to six directions 731a. In the example of FIG. 7C, dimensions are selected from 150-dimensional (5×5=25 subregion blocks×6 directions) feature vectors.

(Dimension Selection in Local Region)

FIG. 7C is a view showing a state of processing of selecting the number of dimensions of feature vectors by the local feature generator 601.

As shown in FIG. 7C, the dimension selector 715 selects feature vectors having ½ dimensions, that is, feature vectors 732 of 75-dimensional gradient histograms from the feature vectors 731 of the 150-dimensional gradient histograms. In this case, the dimensions can be selected not to select dimensions of the same gradient directions between subregion blocks adjacent in the horizontal and vertical directions.

In this example, let q ($q=0, 1, 2, 3, 4, 5$) be a quantized gradient direction in the gradient direction histogram. Blocks in which elements $q=0, 2, 4$ are selected and subregion blocks in which elements $q=1, 3, 5$ are selected are alternately arranged. In the example of FIG. 7C, when the gradient directions selected in adjacent subregion blocks are combined, a total of six directions are selected.

In addition, the dimension selector 715 selects feature vectors 733 of 50-dimensional gradient histograms from the feature vectors 732 of the 75-dimensional gradient histograms. In this case, the dimensions can be selected such that subregion blocks diagonally located at 45° have identical directions only in one direction (remaining directions are different).

Furthermore, when selecting feature vectors 734 of 25-dimensional gradient histograms from the feature vectors 733 of 50-dimensional gradient histograms, the dimension selector 715 can select the dimensions not to make the selected gradient directions match between subregion blocks diagonally located at 45°. In the example shown in FIG. 7C, the dimension selector 715 selects one gradient direction from each subregion from one dimension to 25 dimensions, two gradient directions from 26 dimensions to 50 dimensions, and three gradient directions from 51 dimensions to 75 dimensions.

As described above, it is preferable to select gradient directions that do not overlap between adjacent subregion blocks and evenly select all the gradient directions. At the same time, the dimensions are preferably evenly selected from the entire local region, as in the example shown in FIG. 7C. Note that the dimension selection method shown in FIG. 7C is merely an example, and the selection method is not limited to this.

(Priority Order in Local Region)

FIG. 7D is a view showing an example of the feature vector selection order from subregions in the local feature generator 601.

The dimension selector 715 can not only simply select dimensions but also decide the priority order of selection so as to select dimensions in the order of contribution to the features of feature points. That is, the dimension selector 715 can select dimensions according to a priority order so as to prohibit dimensions in the same gradient direction from being selected for adjacent subregion blocks. The dimension selector 715 outputs feature vectors formed from the selected dimensions as local features. Note that the dimension selector 715 can output the local features in a state in which the dimensions are rearranged based on the priority order.

That is, the dimension selector 715 may make a selection so as to add dimensions in the order of subregion blocks as indicated by, for example, a matrix 741 shown in FIG. 7D during selection of one to 25 dimensions, 26 to 50 dimensions, and 51 to 75 dimensions. When the priority order indicated by the matrix 741 shown in FIG. 7D is used, the dimension selector 715 can select the gradient directions while giving higher priority to subregion blocks close to the center.

Figure 7E:
FIG. 7E is a view showing a feature vector selection order in the local feature generator according to the second embodiment of the present invention.

A matrix 751 in FIG. 7E shows an example of the numbers of elements of 150-dimensional feature vectors according to the selection order shown in FIG. 7D. In this example, when each of 5×5=25 blocks is indicated by a number p (p=0, 1, . . . , 25) in the raster scan order, and a quantized gradient direction is represented by q (q=0, 1, 2, 3, 4, 5), the number of an element of a feature vector is represented by 6×p+q.

Figure 7F:
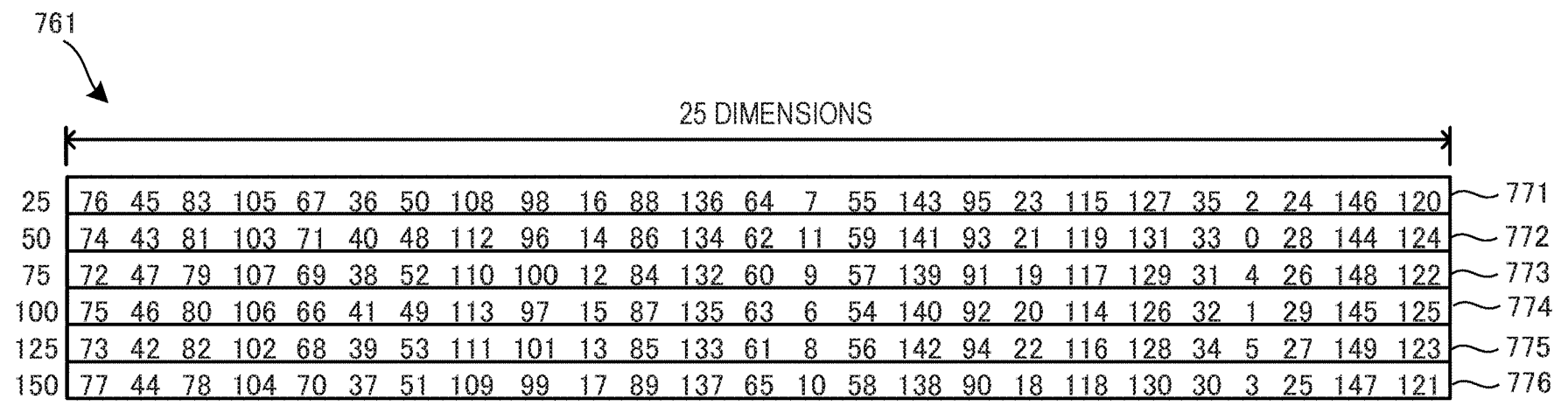

A matrix 761 in FIG. 7F shows a state in which the 150 dimensions according to the selection order shown in FIG. 7E form a hierarchy on the basis of 25 dimensions. That is, the matrix 761 in FIG. 7F shows an example of the arrangement of local features obtained by selecting the elements shown in FIG. 7E in accordance with the priority order indicated by the matrix 741 in FIG. 7D. The dimension selector 715 can output the dimensional elements in the order shown in FIG. 7F. More specifically, when outputting, for example, 150-dimensional local features, the dimension selector 715 can output elements of a total of 150 dimensions in the order shown in FIG. 7F. Additionally, when outputting, for example, 25-dimensional local features, the dimension selector 715 can output elements 771 of the first line (76th, 45th, 83rd, . . . , 120th elements) shown in FIG. 7F in the order (from left to right) shown in FIG. 7F. When outputting, for example, 50-dimensional local features, the dimension selector 715 can output elements 772 of the second line shown in FIG. 7F in the order (from left to right) shown in FIG. 7F, in addition to the first line shown in FIG. 7F.

In the example shown in FIG. 7F, the local features have a hierarchical structural sequence. That is, for example, in the 25-dimensional local features and the 150-dimensional local features, the arrangements of the elements 771 to 776 in the local features of the first 25 dimensions are the same. By thus hierarchically (progressively) selecting the dimensions, the dimension selector 715 can extract and output an arbitrary number of dimensions of local features, that is, local features of an arbitrary size in accordance with the application, communication capacity, terminal specifications, and the like. In addition, the dimension selector 715 can perform image collation using local features of different number of dimensions by hierarchically selecting the dimensions and rearranging and outputting them based on the priority order. For example, when performing image collation using 75-dimensional local features and 50-dimensional local features, the distance between local features can be calculated using only first 50 dimensions.

Note that the priority order shown in FIG. 7F based on the matrix 741 shown in FIG. 7D is merely an example, and the order to select dimensions is not limited to this. For example, as the order of blocks, not only the example of the matrix 741 shown in FIG. 7D but also an order indicated by a matrix 742 shown in FIG. 7D or a matrix 743 shown in FIG. 7D may be used. For example, the priority order may be decided so as to evenly select dimensions from all subregions. Alternatively, assuming that the degree of importance is high near the center of the local region, the priority order may be decided such that the selection frequency of a subregion near the center becomes high. Information representing the dimension selection order can be, for example, defined by a program or stored in a table or the like (skeleton order storage) to be referred to when executing a program.

The dimension selector 715 may select dimensions by selecting subregion blocks on an alternate basis. That is, six dimensions are selected in a certain subregion, and no dimension is selected in another subregion in close vicinity to the subregion. In this case as well, the dimensions can be said to be selected for each subregion such that the correlation between subregions in close vicinity lowers.

The shape of the local region or subregion is not limited to a square, and an arbitrary shape can be used. For example, the local region acquirer 712 may acquire a circular local region. In this case, the subregion divider 713 can divide the circular local region into 9 or 17 subregions, for example, in concentric circle shape having a plurality of subregions. In this case as well, the dimension selector 715 can select dimensions in each subregion.

As described above, according to the local feature generator 601 of this embodiment, the dimensions of generated feature vectors are hierarchically selected while maintaining the information amount of local features, as shown in FIGS. 7B to 7F. This processing makes it possible to recognize landscape elements and display the recognition result in real time while maintaining the recognition accuracy. Note that the arrangement and processing of the local feature generator 601 are not limited to those of the example. It is of course possible to apply another processing capable of recognizing landscape elements and display the recognition result in real time while maintaining the recognition accuracy.

(Article Array Generator)

Figure 8A:
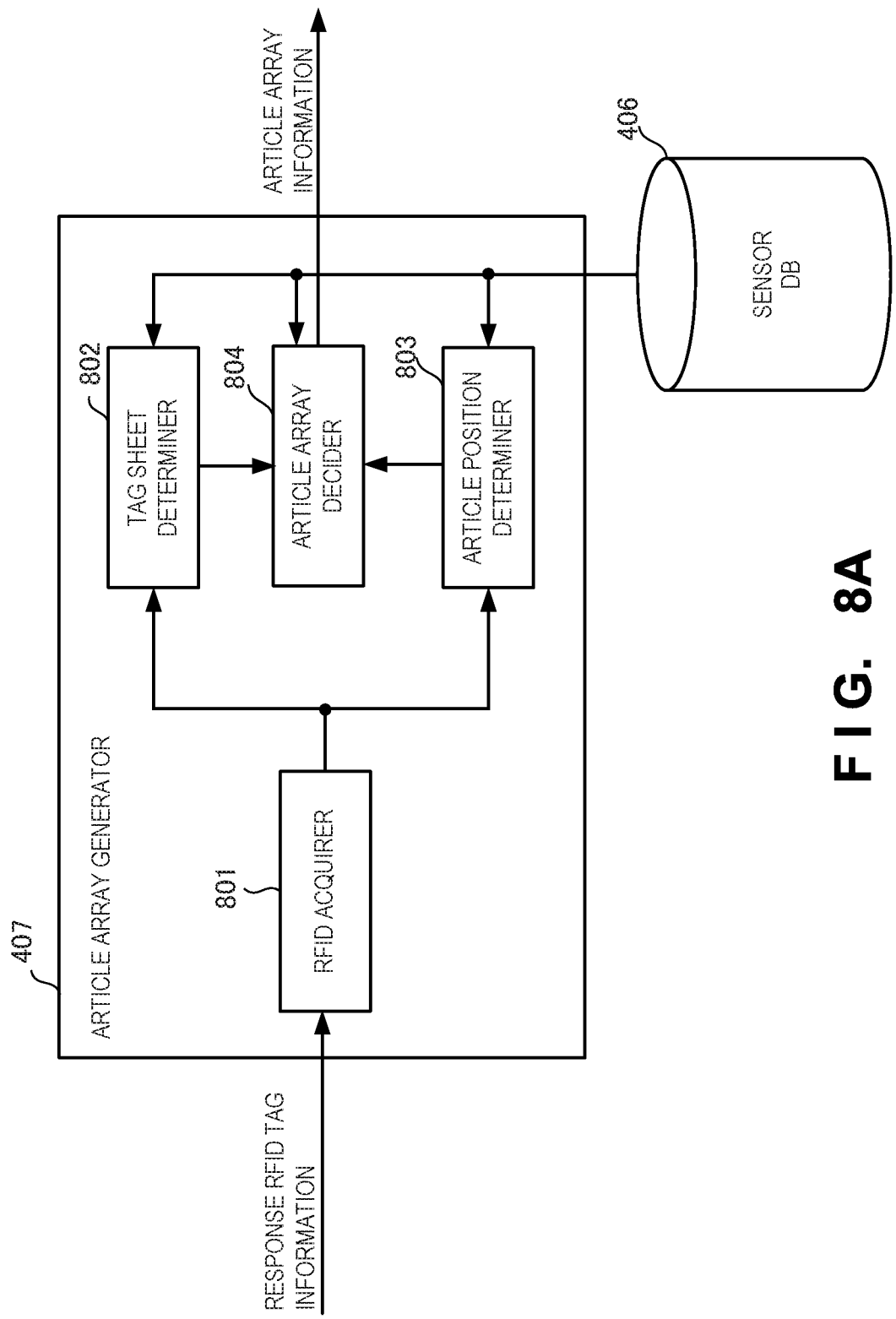
FIG. 8A is a block diagram showing the arrangement of an article array generator according to the second embodiment of the present invention.

FIG. 8A is a block diagram showing the arrangement of the article array generator 407 according to this embodiment. Note that article presence/absence information as the target of the article array generator 407 is not limited to information obtained by an article, presence/absence sensor with an RFID tag shown in FIGS. 8A to 9E.

The article array generator 407 includes an RFID (Radio Frequency IDentification: individual identifier by radio waves) acquirer 801, a tag sheet determiner 802, an article position determiner 803, and an article array decision 804.

The RFID acquirer 801 acquires the ID of an RFID tag representing article presence received by the article presence/absence information receiver 405. The tag sheet determiner 802 specifies a tag sheet position on a display shelf based on the RFID (to be referred to as a sheet ID hereinafter) of a sheet detected from an article presence/absence detection tag sheet. The article position determiner 803 specifies an article position on the display shelf based on the RFID (to be referred to as an article position ID hereinafter) of an article position detected from each article presence/absence determination tag of the tag sheet.

The article array decision 804 decides an article array on the display shelf including the number of depth-direction positions based on the arrangement of the tag sheet on the display shelf from the tag sheet determiner 802 and the article position on the display shelf from the article position determiner 803. Note that the article array output from the article array decider 804 is an array of article presence/absence, and what kind of article is arranged in each column is unknown.

(Operation Procedure)

Figure 8B:
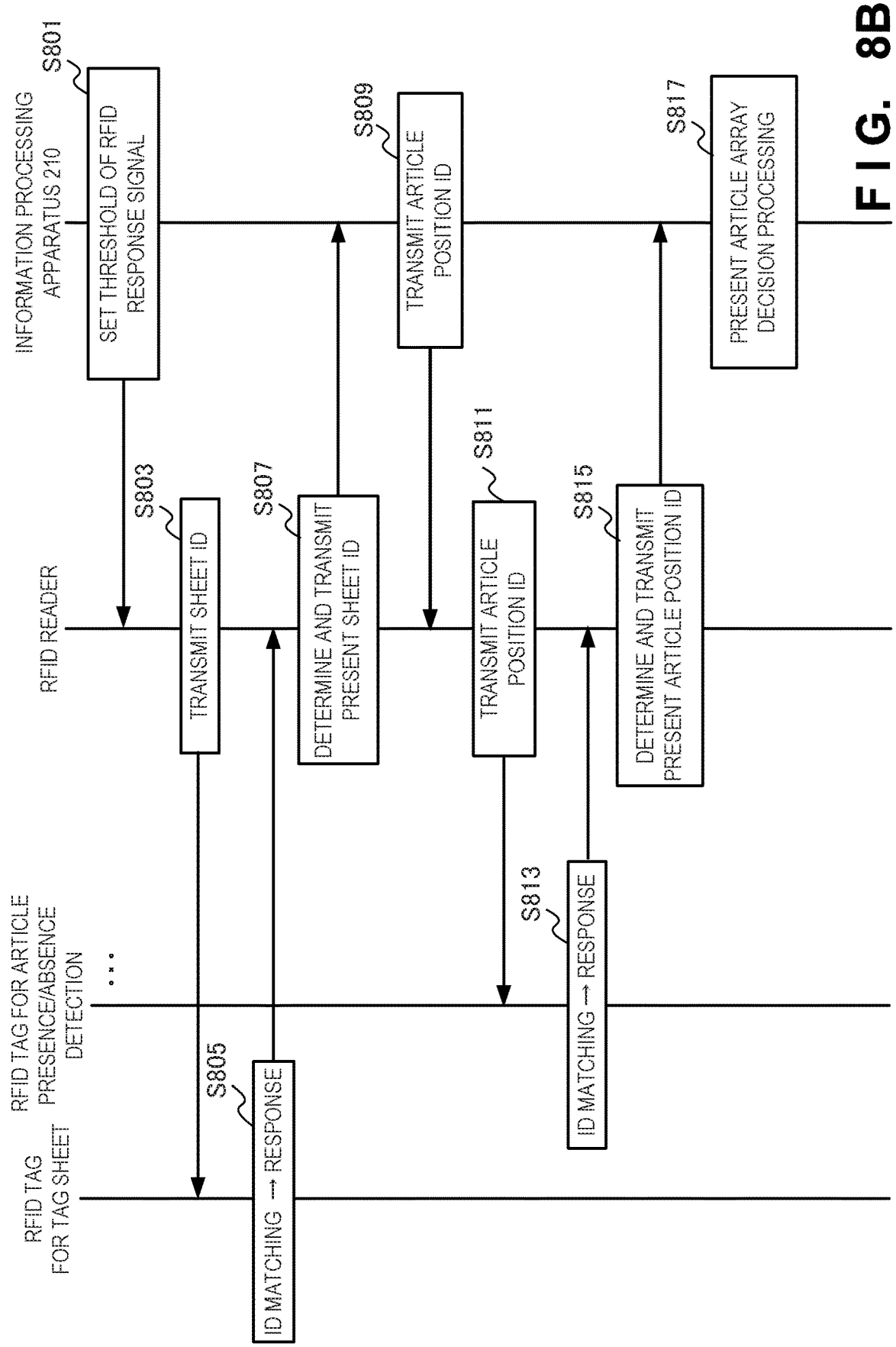
FIG. 8B is a sequence chart showing the operation procedure of article presence/absence data acquisition according to the second embodiment of the present invention.

FIG. 8B is a sequence chart showing the operation procedure of article presence/absence data acquisition according to this embodiment. Note that in this embodiment, an RFID reader transmits a tag information read signal including an ID to an RFID tag placed at each article arrangement position. If the RFID tag responds in a signal strength more than a threshold, it is determined that no article is present. If the RFID tag responds in a signal strength less than the threshold, it is determined that arm article is present.

In step S801, the information processing apparatus 210 sets a threshold used to determine the presence/absence of an article based on the strength of an RFID response signal. This threshold setting may be done not only as initial setting but also based on the history of, for example, error occurrence in article presence/absence detection.

In step S803, the RFID reader transmits a command including an RFID to an RFID tag to identify a tag sheet. The RFID tag for tag sheet with a matching RFID returns a response signal in step S805. The RFID reader receives the response from the RFID tag for tag sheet, and notifies the information processing apparatus 210 that the tag sheet is arranged on the layer of the display shelf as the target of the RFID reader in step S807. In step S809, the information processing apparatus 210 notifies the RFID reader of RFIDs of RFID tags for article detection on the tag sheet based on the tag sheet ID. Note that the RFID reader may find the RFIDs of the RFID tags for article detection on the sheet. Note that this processing is performed to shorten the RFID tag operation processing, and the RFIDs may be scanned throughout the bits.

In step S811, the RFID reader transmits a command including an RFID to each of RFID tags for article detection on the sheet. The RFID tag for article presence/absence detection with a matching RFID returns a response signal to the RFID reader in step S813. The RFID reader receives the response from the RFID tag for article presence/absence detection, and compares the signal strength of the response signal with the threshold in step S815. If the signal strength is less than the threshold, it is determined that an article is present. If the signal strength is more than the threshold, it is determined that no article is present. The RFID reader notifies the information processing apparatus 210 of the RFIDs of present articles.

In step S817, the information processing apparatus 210 receives the RFIDs of present articles, refers to the sensor database 406, and decides the article array on the display shelf as shown in FIG. 5D.

(Communication Procedure)

Figure 8C:
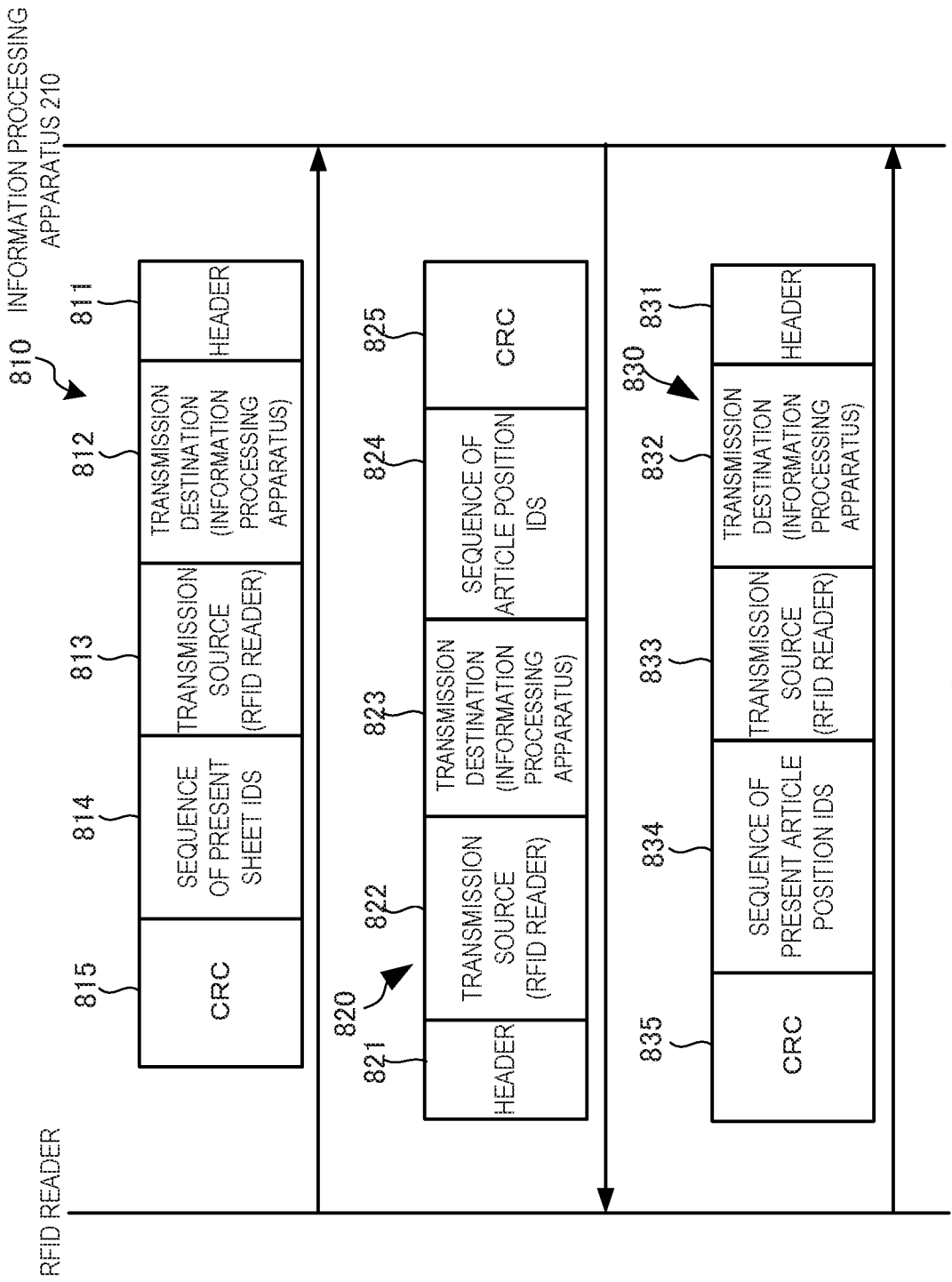
FIG. 8C is a sequence chart showing a communication procedure at the time of article presence/absence data acquisition according to the second embodiment of the present invention.

FIG. 8C is a sequence chart showing a communication procedure at the time of article presence/absence data acquisition according to this embodiment.

A message 810 used to transmit the RFID of a tag sheet on the display shelf from the RFID reader to the information processing apparatus 210 includes a header 811, an information processing apparatus as a transmission destination 812, an RFID reader as a transmission source 813, a sequence of tag sheet IDs 814 that has responded to the RFID reader, and a CRC 815 as error correction. A message 820 used to transmit an RFID of article presence/absence detection on a tag sheet from the information processing apparatus 210 to the RFID reader includes a header 821, an RFID reader as a transmission destination 822, an information processing apparatus as a transmission source 823, a sequence of RFIDs 824 for article presence/absence detection, and a CRC 825 as error correction. A message 830 used to transmit an RFID of article presence from the RFID reader to the information processing apparatus 210 includes a header 831, an information processing apparatus as a transmission destination 832, an RFID reader as a transmission source 833, a sequence of RFIDs 834 for which the response signal strength to the RFID reader is less than the threshold, and a CRC 835 as error correction.

(Sensor Database)

FIG. 8D is a view showing the arrangement of a sensor database 406b according to this embodiment. The sensor database 406b represents part of the sensor database 406 shown in FIG. 4, and stores at which position of which layer of which display shelf a tag sheet is arranged. In association with a sheet ID 841, the sensor database 406b stores a determined position on the display shelf for each article arrangement position of the tag sheet. That is, the sensor database 406b stores a display shelf 843, a layer 844, a column 845, and a depth-direction position 846 in correspondence with an RFID that is an article position ID 842. The number of displayed articles can be calculated by linking the article positions with articles from the front image of the display shelf.

FIG. 8E is a view showing the arrangement of a sensor database 406c according to this embodiment. The sensor database 406c represents another example of part of the sensor database 406 shown in FIG. 4, and stores at which position of which layer of which display shelf an article is arranged in correspondence with an RFID that is an article position ID. If all article position IDs on the display shelf are stored in this way, the article array can be decided. Then, the number of displayed articles can be calculated by linking articles from the front image of the display shelf.

<<Article Presence/Absence Sensor>>

Figure 9A:
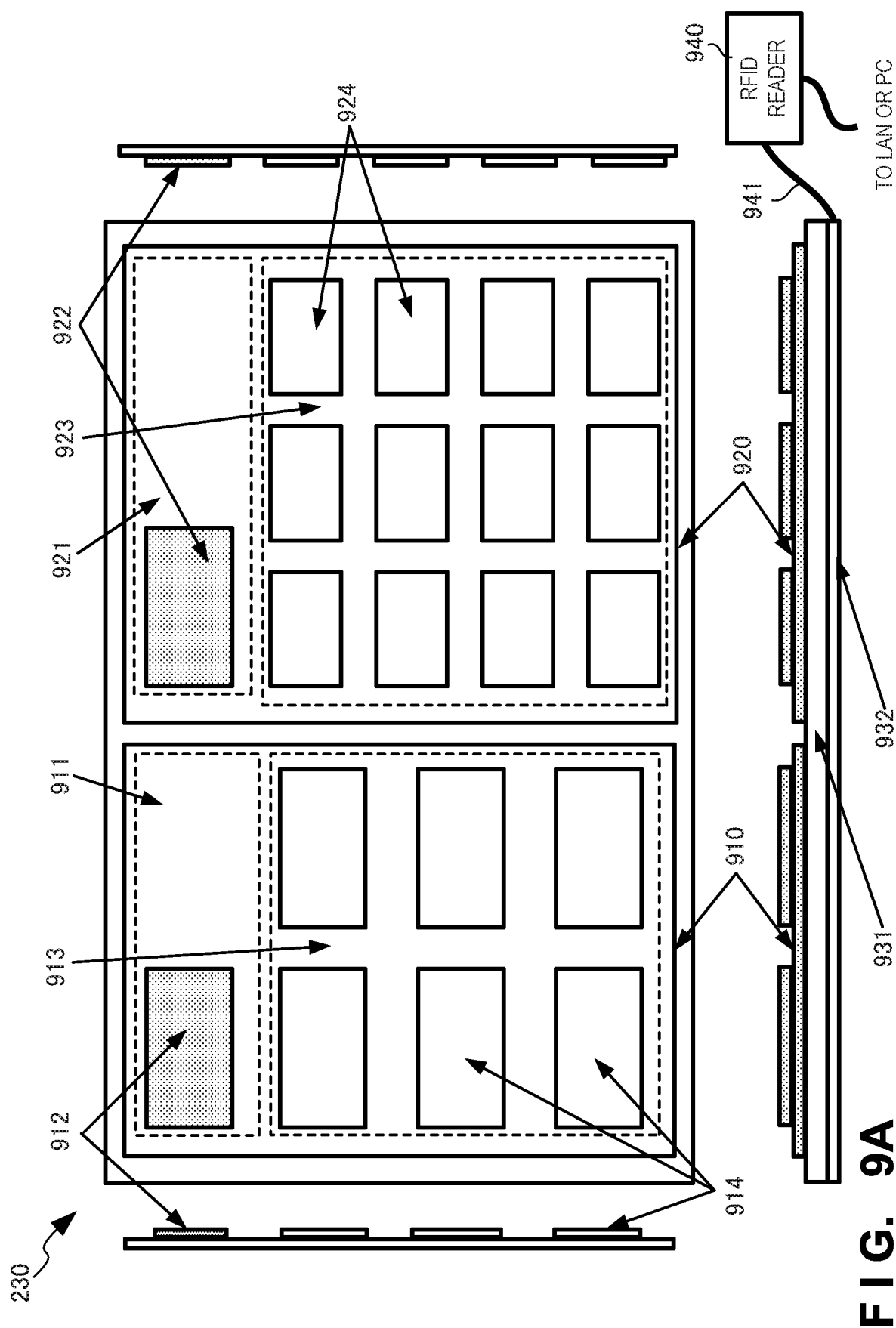
FIG. 9A is a view showing the arrangement of an article presence/absence sensor according to the second embodiment of the present invention.

FIG. 9A is a view showing the arrangement of the article presence/absence sensor 230 according to this embodiment. Although FIG. 9A shows an example in which two tag sheets are arranged on the display shelf, the present invention is not limited to this. Note that the arrangement of the article presence/absence sensor 230 is not limited to those shown in FIGS. 9A to 9E.

A tag sheet 910 includes a management target article non-arrangement region 911 and a management target article arrangement region 913. A sheet recognition RFID tag 912 is arranged in the management target article non-arrangement region 911. Article presence/absence sensing RFID tags 914 are arranged in the management target article arrangement region 913. The sensing RFID tags 914 can detect the presence/absence of a total of six articles on 2 columns×3 depth-direction positions.

A tag sheet 920 includes a management target article non-arrangement region 921 and a management target article arrangement region 923. A sheet recognition RFID tag 922 is arranged in the management target article non-arrangement region 921. Article presence/absence sensing RFID tags 924 are arranged in the management target article arrangement region 923. The sensing RFID tags 924 can detect the presence/absence of a total of 12 articles on 3 columns×4 depth-direction positions.

The tag sheets 910 and 920 are arranged on a spacer 931. A reader antenna 932 is arranged on the lower surface of the spacer 931. The reader antenna 932 is connected to an RFID reader 940 via a connection line 941. The thickness of the spacer 931 affects a change in electromagnetic coupling when an article is placed near the upper surface of the sensing RFID tag 924, as will be described later. Although not illustrated, another spacer is preferably arranged between the tag sheets 910 and 920 and the bottoms of articles to stabilize the distance between them from the viewpoint of stabilizing the influence on the electromagnetic coupling. It is determined that an article is placed on the sensing RFID tag 924 whose response signal to the RFID reader 940 is less than a threshold, and the information processing apparatus 210 is notified of it via a communication line. Note that the communication line may be a channel for wireless communication.

According to the article presence/absence sensor 230 of this embodiment, since the sensing RFID tag 914 is not adhered to an article, an increase in cost caused by tag adhesion can be prevented. In addition, there is neither a problem concerning an invasion of privacy or information security nor a problem concerning fears of consumers which is caused by unauthorized reading of the sensing RFID tag 914 adhered to a purchased article. That is, a problem of unauthorized reading of tag information by a third party does not arise.

(Reader Antenna)

Figure 9B:
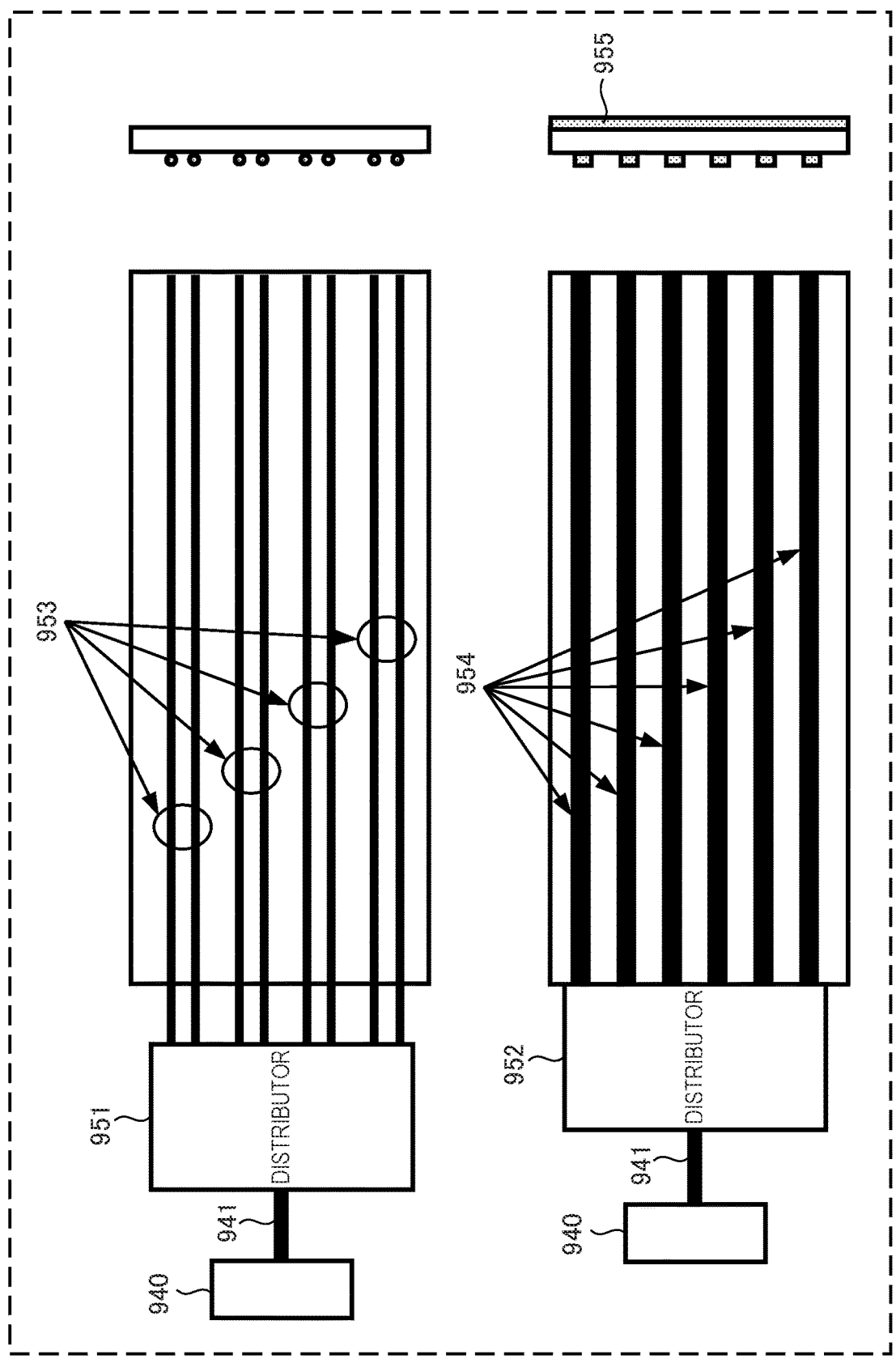
FIG. 9B is a view showing the arrangement of a reader antenna in the article presence/absence sensor according to the second embodiment of the present invention.

FIG. 9B is a view showing the arrangement of the reader antenna 932 in the article presence/absence sensor 230 according to this embodiment. The reader antenna 932 that is wired while being separated from at least one tag sheet by the spacer 931 can have various arrangements. FIG. 9B shows two examples.

A reader antenna 953 is an antenna with two parallel lines. Two lines of each row are connected to the RFID reader 940 by the connection line 941 via a distributor 951.

A reader antenna 954 is an antenna with microstrip lines. The microstrip line of each row is connected to the RFID reader 940 by the connection line 941 via a distributor 952. In the case of microstrip lines, a ground conductor 955 is connected via a matching terminating resistor (not shown).

The tag sheet including an RFID tag is arranged while being separated from the two lines or microstrip lines by the spacer 931.

(Article Arrangement)

Figure 9C:
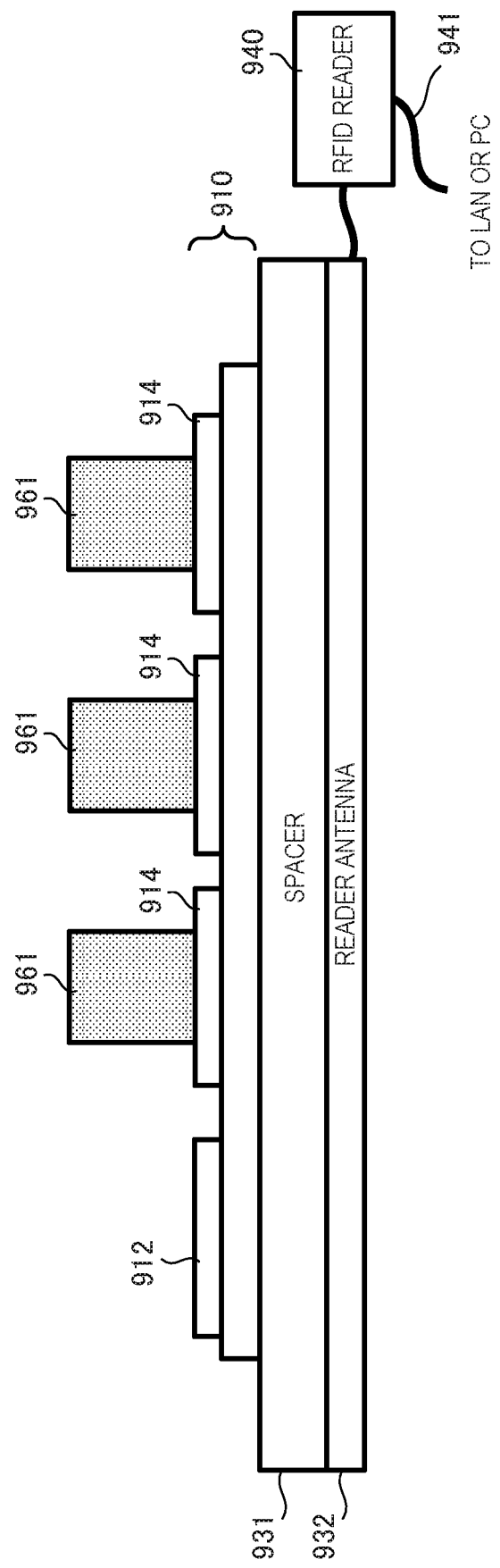
FIG. 9C is a view showing the arrangement of articles on the article presence/absence sensor according to the second embodiment of the present invention.

FIG. 9C is a view showing the arrangement of articles on the article presence/absence sensor 230 according to this embodiment. Note that the same reference numerals as in FIG. 9A denote the same elements in FIG. 9C, and a description thereof will be omitted.

FIG. 9C shows a case where an article 961 is arranged near the upper surface of each sensing RFID tag 914 on the tag sheet 910. In this embodiment, the articles 961 in the depth direction on a single column are assumed to be identical.

The principle of detecting the presence/absence of an article near the upper surface of the sensing RFID tag 914 by the RFID reader 940 via the reader antenna 932 in this way will be described below.

(RFID Tag)

Figure 9D:
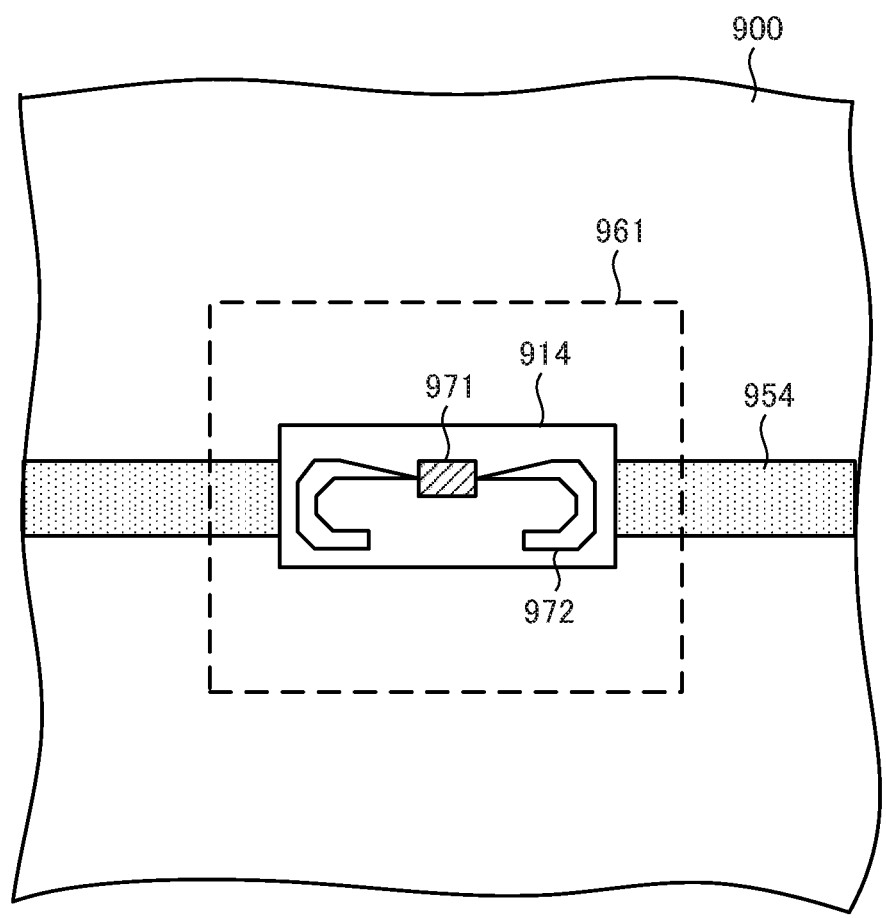
FIG. 9D is a view showing the arrangement of an RFID tag in the article presence/absence sensor according to the second embodiment of the present invention.

FIG. 9D is a view showing the arrangement of the RFID tag 914 of the article presence/absence sensor 230 according to this embodiment.

FIG. 9D shows the plan view of the display shelf. As the plan view, FIG. 9D shows an enlarged view of a region where one article 961 is placed. As shown in FIG. 9D, the reader antenna 954 with microstrip lines is formed on an article management plate 900. The RFID tag 914 is placed above the reader antenna 954. An article arrangement region where the article 961 is placed is set above the RFID tag 914 at a position to cover the RFID tag 914. The RFID tag 914 includes an RFID chip 971 and a tag antenna 972.

(Positional Relationship)

Figure 9E:
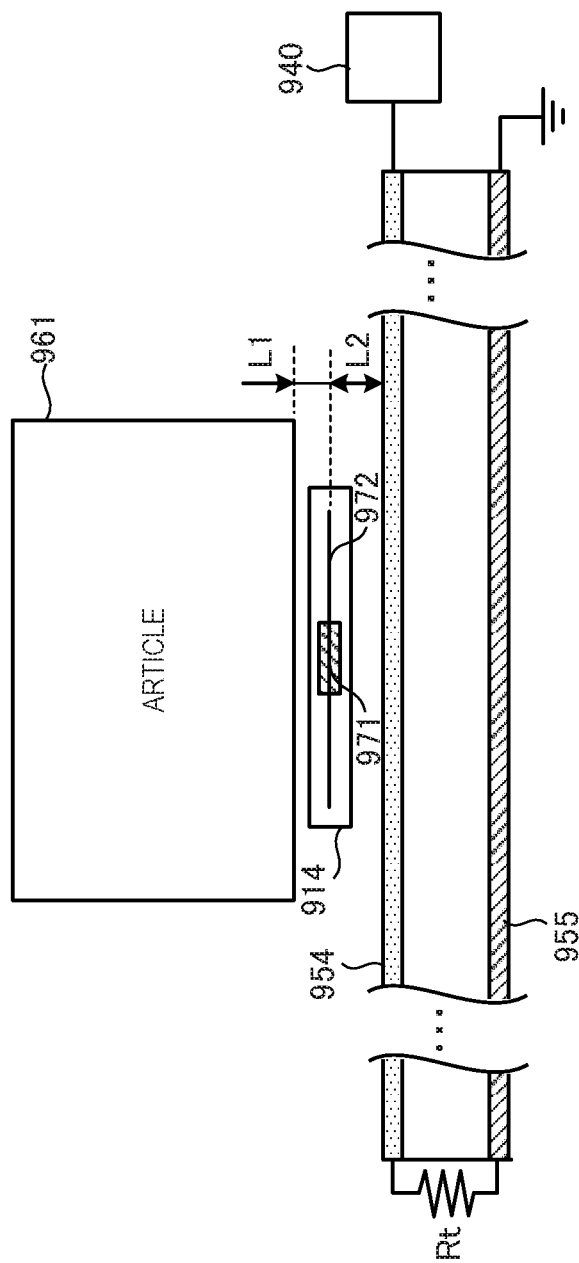
FIG. 9E is a view showing the positional relationship in the article presence/absence sensor according to the second embodiment of the present invention.

FIG. 9E is a view showing the positional relationship in the article presence/absence sensor 230 according to this embodiment.

The article presence/absence sensor 230 according to this embodiment determines the presence/absence of an article based on the strength of a response signal returned from the sensing RFID tag 914 with a matching RFID in response to a command including an RFID transmitted from the RFID reader 940 via the reader antenna 932. If no article exists, and the electromagnetic coupling between the reader antenna 932 and the sensing RFID tag 914 is strong, a strong response signal is returned to the reader antenna 932. The strength of the response signal is compared with the threshold. Since the strength is more than the threshold, it is determined that no article is present. On the other hand, if an article exists, and the electromagnetic coupling between the reader antenna 932 and the sensing RFID tag 914 is weak, a weak response signal is returned to the reader antenna 932. The strength of the response signal is compared with the threshold. Since the strength is less than the threshold, it is determined that an article is present.

The structure of the article presence/absence sensor 230 suitable for determining the strength of the response signal will briefly be described below. Referring to FIG. 9E, a distance L1 is the distance from the tag antenna 972 of the sensing RFID tag 914 to the bottom of the article 961. A distance L2 is the distance from the tag antenna 972 of the sensing RFID tag 914 to the reader antenna 954 with microstrip lines. Note that since the distances L1 and L2 are preferably stable, the sensing RFID tag 914 may be covered with a plastic plate or the like to use the thickness of the plastic plate, or any other method is usable.

In the article presence/absence sensor 230 according to this embodiment, the distances L1 and L2 are adjusted to adjust a coupling coefficient k2 between the article 961 and the tag antenna 972 and a coupling coefficient k1 between the tag antenna 972 and the reader antenna 954. The signal strength between the tag antenna 972 and the reader antenna 954 is changed in accordance with the coupling coefficient k2 that changes depending on the presence/absence of the article 961, and the presence/absence of the article 961 is determined based on the change in the signal strength. The coupling coefficients k1 and k2 meet a relationship k<k2. For this reason, a change in the reflected signal strength caused by the frequency change of the tag antenna 972 depending on the presence/absence of an article becomes larger than that caused by maintaining communication between the reader antenna 954 and the tag antenna 972. That is, since the presence/absence of the article 961 can reliably be grasped, a detection error can be suppressed.

In the article presence/absence sensor 230 according to this embodiment, letting $\lambda$ be the wavelength of the radio signal between the tag antenna 972 and the reader antenna 954, distance $L1 \leq \lambda$ and distance $L2 \leq \lambda$ can be set. Since the communication range between the tag antenna 972 and the reader antenna 954 is narrow, and there is no influence of disturbance or noise, the presence/absence of an article can stably be determined. It is also easy to arrange the antennas that meet a relationship $L2 \leq \lambda/2\pi$. When the relationship $L2 \leq \lambda/2\pi$ is met, wireless communication between the reader antenna 954 and the tag antenna 972 is performed mainly using direct waves, and radio interference caused by a multipath phenomenon reflecting the ambient environment hardly occurs. It is therefore possible to suppress detection errors. In particular, when managing the presence/absence of articles on a shelf, the shelf is a metal shelf or a cold case made of a metal in many cases. Even under such an environment, the system can stably operate.

According to the article presence/absence sensor 230 of this embodiment, the article 961 need not block the path between the RFID tag 914 and the RFID reader 940 to detect the presence/absence of the article 961. In addition, it is only necessary to provide a place to arrange the article 961 while being spaced part from the tag antenna 972 (or the RFID tag 914) so as to form electromagnetic coupling with the tag antenna 972. Hence, the article 961 can freely be arranged.

In addition, according to the article presence/absence sensor 230 of this embodiment, the field components of a quasistatic field, induction field, and radiation field are mixed at a sufficient strength, and the direction of a vector variously changes over time. It is therefore possible to improve the degree of freedom of the relative directions of the reader antenna 954 and the tag antenna 972.

<<Hardware Arrangement of Information Processing Apparatus>>

Figure 10A:
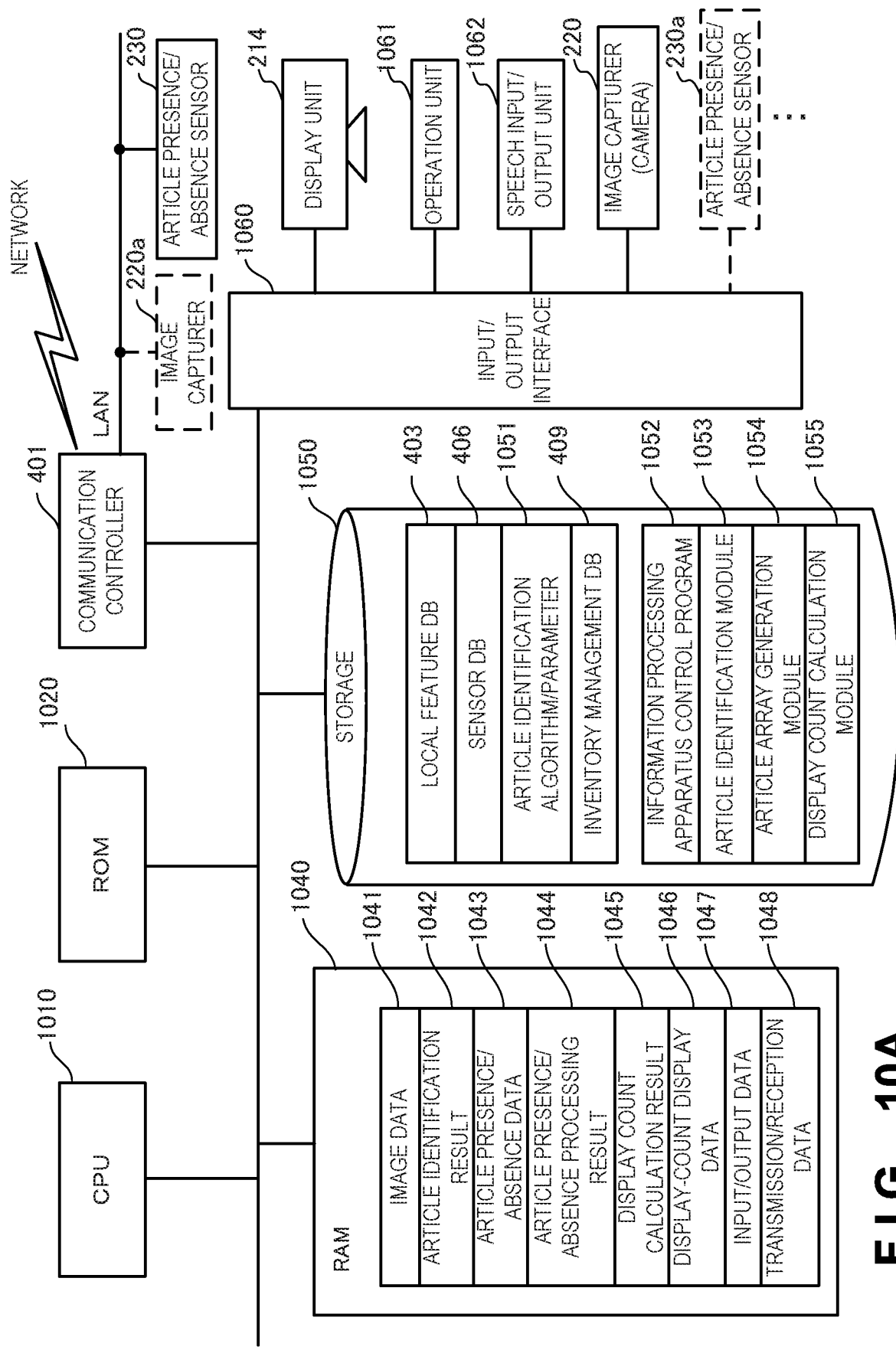
FIG. 10A is a block diagram showing the hardware arrangement of the information processing apparatus according to the second embodiment of the present invention.

FIG. 10A is a block diagram showing the hardware arrangement of the information processing apparatus 210 according to this embodiment.

In FIG. 10A, a CPU (Central Processing Unit) 1010 is a processor for arithmetic control, and implements the functional components of the information processing apparatus 210 shown in FIG. 4 by executing a program. A ROM (Read Only Memory) 1020 stores initial data, permanent data of programs and the like, and programs. The communication controller 401 communicates with another communication terminal or each server via a network, and also communicates with an image capturer 220a or the article presence/absence sensor 230.

Note that the number of CPUs 1010 is not limited to one, and the CPU 1010 may include a plurality of CPUs or a CPU for image processing. The communication controller 401 preferably includes a CPU independent of the CPU 1010 and writes or reads transmission/reception data in or from an area of a RAM (Random Access Memory) 1040. It is preferable to provide a DMAC (not shown) that transfers data between the RAM 1040 and a storage 1050. Additionally, an input/output interface 1060 preferably includes a CPU independent of the CPU 1010 and writes or reads input/output data in or from an area of the RAM 1040. Hence, the CPU 1010 recognizes data reception by or transfer to the RAM 1040 and processes data. In addition, the CPU 1010 prepares the processing result in the RAM 1040 and leaves subsequent transmission or transfer to the communication controller 401, the DMAC, or the input/output interface 1060.

The RAM 1040 is a random access memory used by the CPU 1010 as a work area for temporary storage. An area to store data necessary for implementation of the embodiment is allocated to the RAM 1040. Image data 1041 is the data of the front image of the display shelf acquired from the image capturer 220. An article identification result 1042 is article information identified from the image data 1041 based on the local feature. Article presence/absence data 1043 is the data of article presence/absence on the display shelf collected from the article presence/absence sensor 230. An article presence/absence processing result 1044 is article array information generated based on the article presence/absence data 1043. A display count calculation result 1045 is a result obtained by linking the article identification result 1042 with the article presence/absence processing result 1044 and calculating the shelf allocation of articles and the number of displayed articles. Display-count display data 1046 is display data generated to notify a clerk of the display count calculation result 1045. Input/output data 1047 is data input/output via the input/output interface 1060. Transmission/reception data 1048 is data transmitted/received via the communication controller 401.

The storage 1050 stores databases, various kinds of parameters, and following data and programs necessary for implementation of the embodiment. The local feature database 403 is a database that stores the data shown in FIG. 5A. The sensor database 406 is a database that stores the data shown in FIG. 5B, 8D, or 8E. An article identification algorithm/parameter 1051 includes algorithms and parameters used to identify an article from the front image of the display shelf shown in FIGS. 6A to 6G and 7A to 7F. The inventory management database 409 is a database used for inventory management (not shown). The storage 1050 stores the following programs. An information processing apparatus control program 1052 is a control program that controls the entire information processing apparatus 210. An article identification module 1053 is a module configured to identify an article from the front image of the display shelf. An article array generation module 1054 is a module configured to generate an article array by referring to the sensor database 406 based on the article presence/absence data. A display count calculation module 1055 is a module configured to link article identification information identified by the article identification module 1053 with article array information generated by the article array generation module 1054 and calculate the shelf allocation of the display shelf and the display count.

The input/output interface 1060 interfaces input/output data from/to input/output devices. A display unit 214 and an operation unit 1061 including a touch panel/keyboard are connected to the input/output interface 1060. A speech input/output unit 1062 such as a speaker and a microphone is also connected. In addition, the image capturer 220 and an article presence/absence sensor 230a are connected. Note that the image capturer and the article presence/absence sensor may be connected to a LAN via the communication controller 401 or connected as an I/O via the input/output interface 1060. In FIG. 10A, the image capturer 220 is connected to the input/output interface 1060, and the article presence/absence sensor 230 is connected to the LAN. Hence, the image capturer 220a and the article presence/absence sensor 230a are indicated by broken lines.

Note that programs and data associated with general-purpose functions and other implementable functions of the information processing apparatus 210 are not shown in the RAM 1040 or the storage 1050 of FIG. 10A.

(Processing Result Output)

Figure 10B:
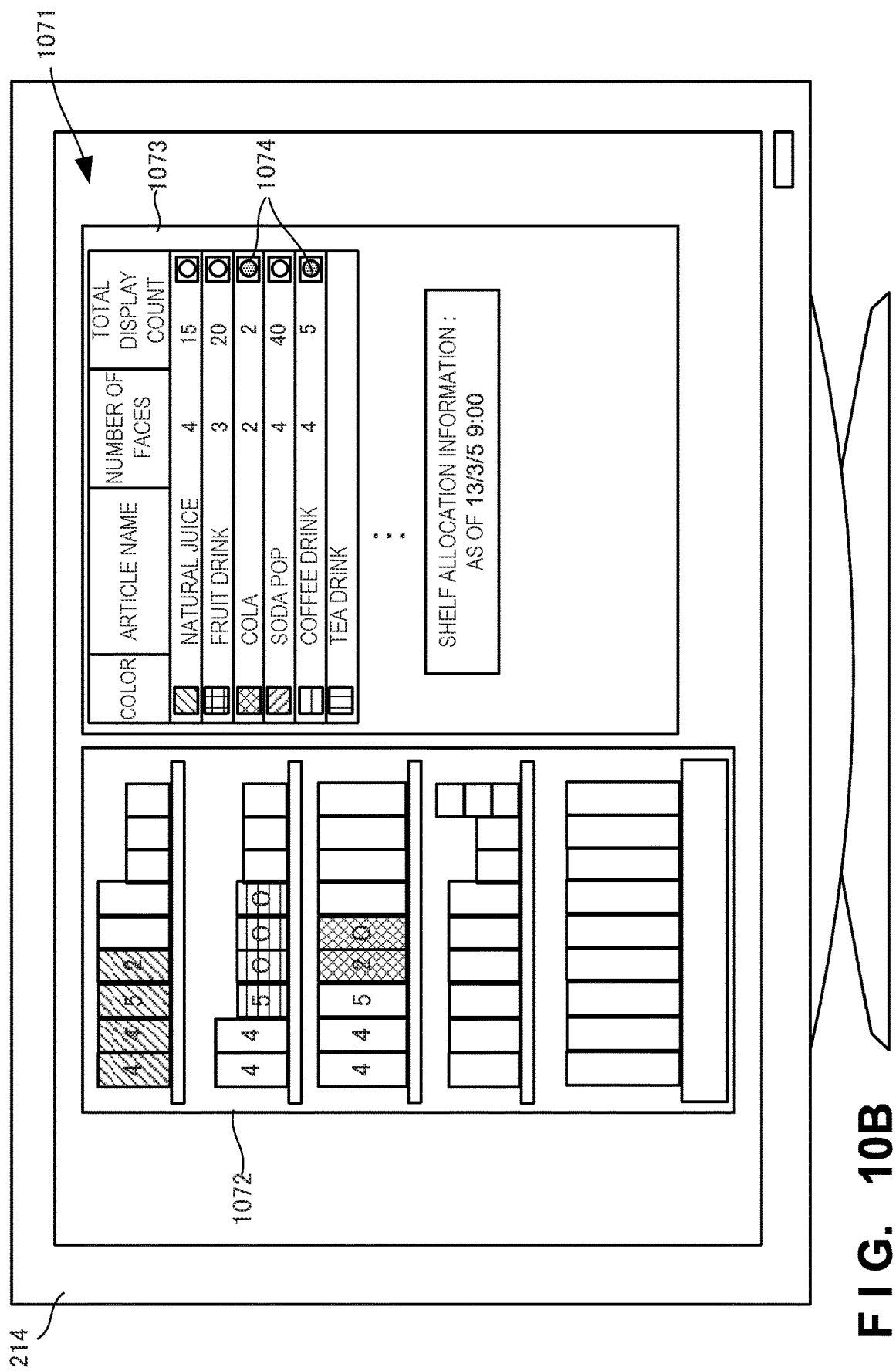
FIG. 10B is a view showing the processing result output of the information processing apparatus according to the second embodiment of the present invention.

FIG. 10B is a view showing the processing result output of the information processing apparatus 210 according to this embodiment.

A management target display shelf 1072 and an article table 1073 are displayed in a display screen 1071 of the display unit 214. The shelf allocation of the articles and the display count are displayed on the display shelf 1072. The corresponding colors of article columns, the article names, the numbers of faces (numbers of columns of identical articles), and the total numbers of displayed articles are displayed in the article table 1073. Warning marks 1074 that notify a clerk that the total number of displayed articles has decreased, and replenishment is necessary are also displayed.

<<Processing Procedure of Information Processing Apparatus>>

Figure 11A:
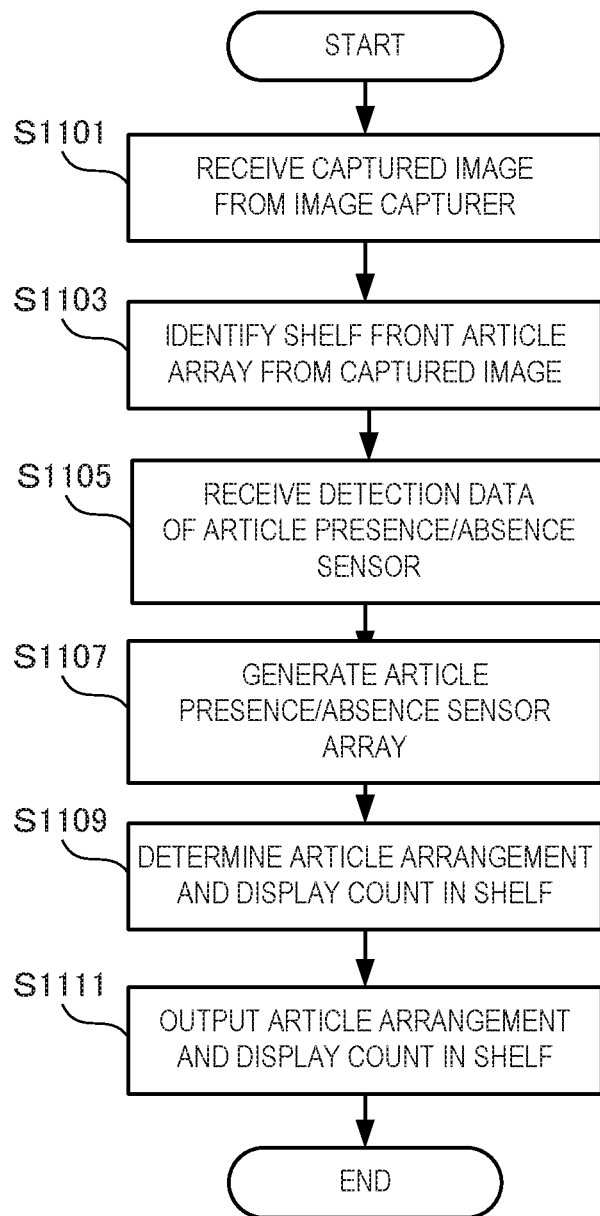
FIG. 11A is a flowchart showing the processing procedure of the information processing apparatus according to the second embodiment of the present invention.

FIG. 11A is a flowchart showing the processing procedure of the information processing apparatus 210 according to this embodiment. This flowchart is executed by the CPU 1010 shown in FIG. 10A using the RAM 1040 and implements the functional components shown in FIG. 4.

In step S1101, the information processing apparatus 210 acquires the captured front image of the display shelf from the image capturer 220. In step S1103, the information processing apparatus 210 identifies the article array on the front of the display shelf from the acquired captured image.

In step S1105, the information processing apparatus 210 acquires article presence/absence detection data from the article presence/absence sensor 230 and stores it. In step S1107, the information processing apparatus 210 generates the array of article presence/absence sensors from the article presence/absence detection data.

In step S1109, the information processing apparatus 210 links the article array of the front with the array of article presence/absence sensors, and determines the article arrangement and the display count in the display shelf. In step S1111, the information processing apparatus 210 outputs the article arrangement and the display count in the display shelf.

(Shelf Surface Article Array Recognition Processing)

Figure 11B:
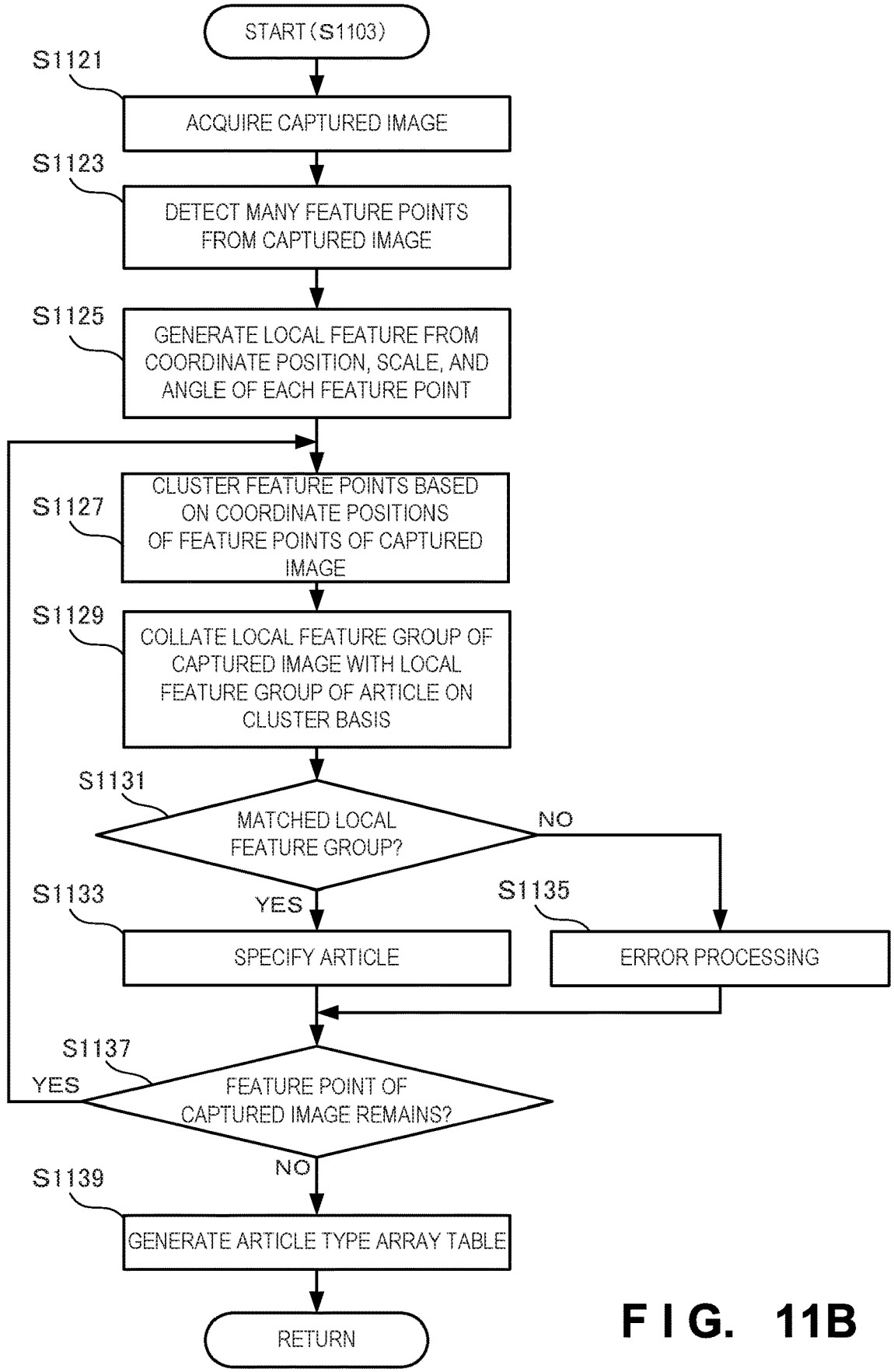
FIG. 11B is a flowchart showing the procedure of shelf surface article array recognition processing according to the second embodiment of the present invention.

FIG. 11B is a flowchart showing the procedure of shelf surface article array recognition processing (step S1103) according to this embodiment.

In step S1121, the information processing apparatus 210 acquires the received captured image. In step S1123, the information processing apparatus 210 detects a number of feature points from the captured image. In step S1125, the information processing apparatus 210 generates local features from the coordinate positions, scales, and angles of the feature points in accordance with the processes shown in FIGS. 7A to 7F.

In step S1127, the information processing apparatus 210 clusters the feature points based on the coordinate positions of the feature points of the captured image in accordance with the processes shown in FIGS. 6A to 6G. In step S1129, the information processing apparatus 210 collates the local feature group of the captured image with the local feature groups of articles on a cluster basis.

In step S1131, the information processing apparatus 210 determines based on the collation result whether a matched local feature group exists. If a matched local feature group exists, in step S1133, the information processing apparatus 210 specifies the article as an article having the matched local feature group. On the other hand, if no matched local feature group exists, in step S1135, the information processing apparatus 210 determines that there is no article having the clustered local feature group, and performs error processing. Note that in step S1135, it may be performed to change the threshold or method of clustering in accordance with the number of errors.

In step S1137, the information processing apparatus 210 determines whether a feature point of the captured image remains. If a feature point remains, the information processing apparatus 210 returns to step S1127 to repeat clustering and collation of feature points. If no feature point remains, in step S1139, the information processing apparatus 210 generates an article type array table (see FIG. 5C) as the array of specified identified articles on the front of the display shelf.

(Article Presence/Absence Detection Processing)

Figure 11C:
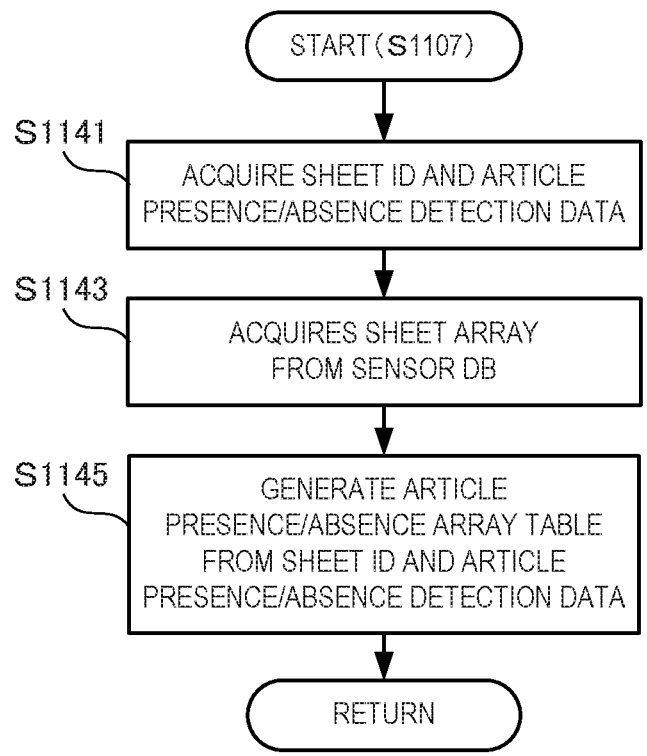
FIG. 11C is a flowchart showing the procedure of article presence/absence detection processing according to the second embodiment of the present invention.

FIG. 11C is a flowchart showing the procedure of article presence/absence detection processing (step S1107) according to this embodiment.

In step S1141, the information processing apparatus 210 acquires article presence/absence detection data and a tag sheet ID received from the RFID reader 940. In step S1143, the information processing apparatus 210 acquires tag sheet array information from the sensor database 406. In step S1145, the information processing apparatus 210 generates an article presence/absence array table (see FIG. 5D) from the tag sheet ID and the article presence/absence detection data.

(Article Arrangement and Display Count Determination Processing)

Figure 11D:
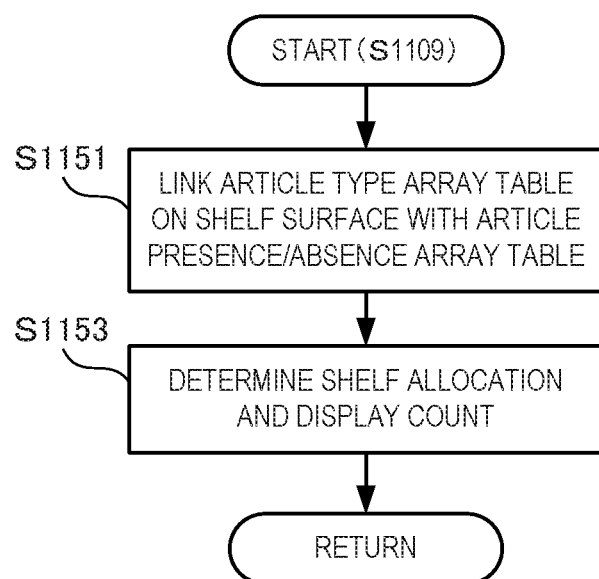
FIG. 11D is a flowchart showing the procedure of article arrangement and display count determination processing according to the second embodiment of the present invention.

FIG. 11D is a flowchart showing the procedure of article arrangement and display count determination processing (step S1109) according to this embodiment.

In step S1151, the information processing apparatus 210 links the article type array table (see FIG. 5C) and the article presence/absence array table (see FIG. 5D) based on the array of tag sheets. In step S1153, the information processing apparatus 210 determines the shelf allocation and the display count (see FIG. 5E).

According to this embodiment, an enormous number of articles of a plurality of types displayed in the depth direction on the display shelf can be counted on a type basis at a high speed using an inexpensive arrangement. It is therefore possible to notify article replenishment to the display shelf in real time.

Third Embodiment

An article management system including an information processing apparatus according to the third embodiment of the present invention will be described next. The information processing apparatus according to this embodiment is different from the second embodiment in that a unique sheet identification mark (to be abbreviated as a sheet mark hereinafter) attached to an article presence/absence sensor group is identified from a captured image. The rest of the components and operations is the same as in the second embodiment. Hence, the same reference numerals denote the same components and operations, and a detailed description thereof will be omitted.

According to this embodiment, even when the article presence/absence sensor group on the article display shelf is moved, its position can be specified. For this reason, even when the article presence/absence sensor group is arbitrarily arranged, article identification based on a captured image and article presence/absence information from an article presence/absence sensor can easily be linked.

<<Article Management System>>

The arrangement and operation of an article management system 1200 according to this embodiment will be described with reference to FIGS. 12 and 13.

(System Outline)

Figure 12:
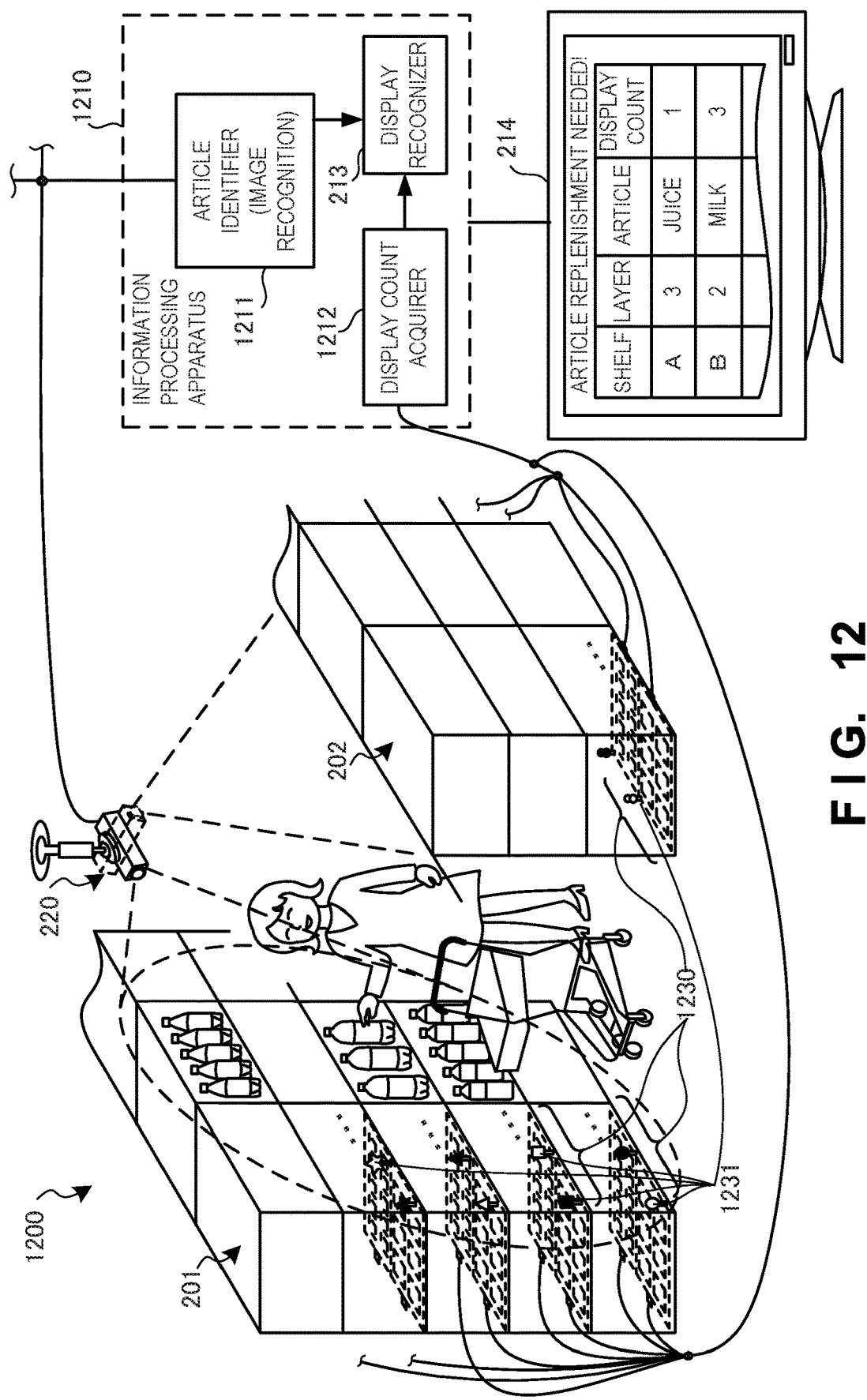
FIG. 12 is a view showing the outline of an article management system including an information processing apparatus according to the third embodiment of the present invention.

FIG. 12 is a view showing the outline of the article management system 1200 including an information processing apparatus 1210 according to this embodiment. Note that the same reference numerals as in FIG. 2A denote the same constituent elements in FIG. 12, and a description thereof will be omitted.

The article management system 1200 includes the information processing apparatus 1210, an image capturer 220 that is a camera, and article presence/absence sensors 1230. The image capturer 220 captures the images of the front lines of display shelves 201 and 202. Note that the images shot by the image capturer 220 include sheet marks 1231 added to the tag sheets of the article presence/absence sensors 1230 as well. That is, the article presence/absence sensor 1230 arranged on the bottom of each layer of each of the display shelves 201 and 202 determines the presence/absence of articles on it, and includes tag sheets each having the added sheet mark 1231.

The information processing apparatus 1210 includes an article identifier 1211, a display count acquirer 212, and a display recognizer 1213. The article identifier 1211 receives the images of the front lines of the display shelves 201 and 202 from the image capturer 220, identifies the types and array of displayed articles, and also identifies the sheet marks 1231. The display recognizer 1213 links the article arrays of the front lines of the display shelves 201 and 202 from the article identifier 1211 with display count information from the display count acquirer 212 based on the positions of the sheet marks 1231 identified by the article identifier 1211, and recognizes the number of displayed articles on the display shelves 201 and 202

(Operation Procedure)

Figure 13:
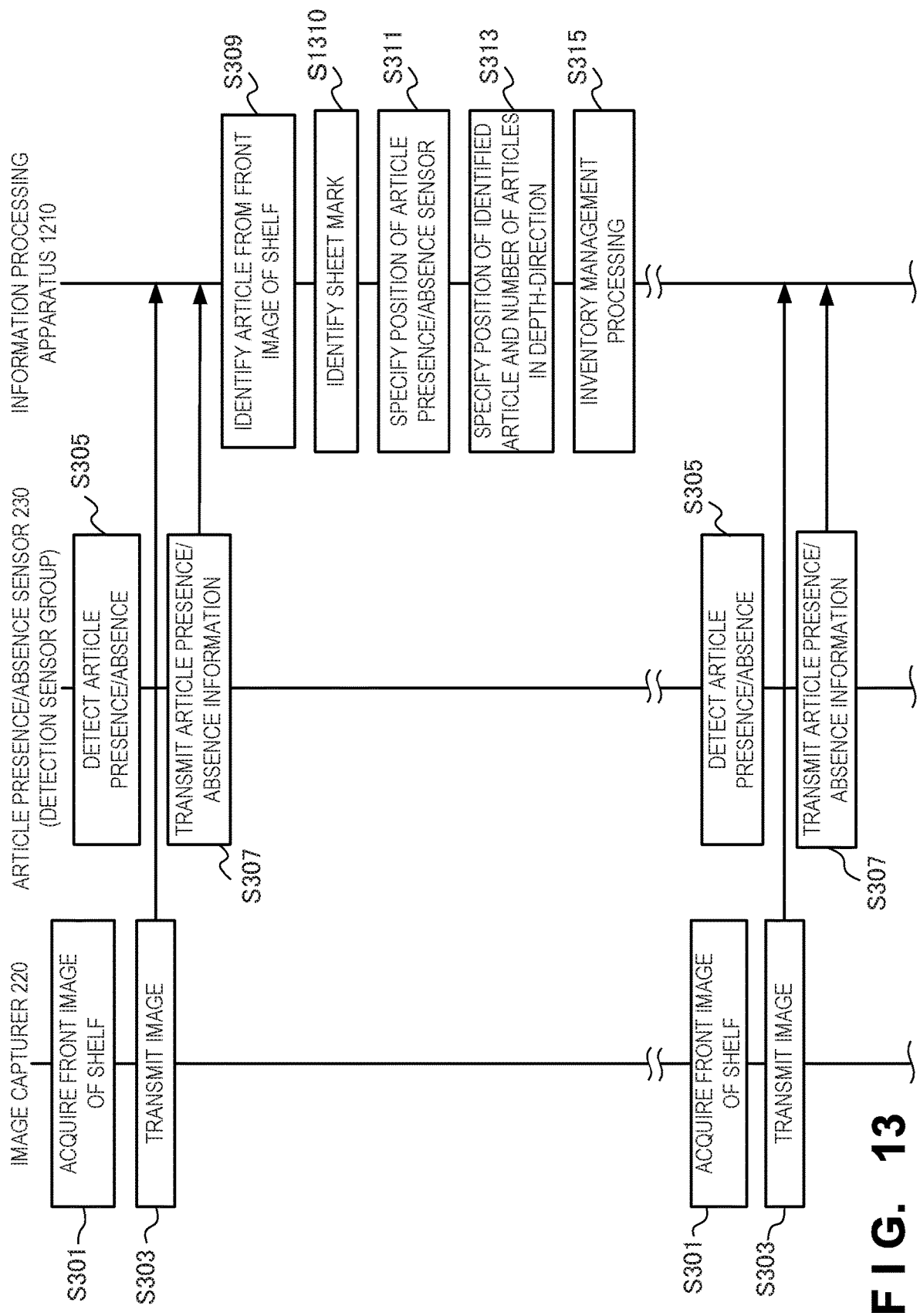
FIG. 13 is a sequence chart showing the operation procedure of the article management system including the information processing apparatus according to the third embodiment of the present invention.

FIG. 13 is a sequence chart showing the operation procedure of the article management system 1200 including the information processing apparatus 1210 according to this embodiment. Note that the same step numbers as in FIG. 3A of the second embodiment denote the same steps in FIG. 13, and a description thereof will be omitted.

In FIG. 13, sheet mark identification of step S1310 is added to FIG. 3A. In step S1310, the information processing apparatus 1210 identifies sheet marks from the front image of a display shelf and uses the sheet marks to specify article presence/absence sensor positions.

In the second embodiment, tag sheet arrangement information on the display shelf is stored in advance, thereby specifying an article presence/absence sensor position and linking it with article identification. Hence, if a tag sheet is moved, the arrangement information needs to be changed. In this embodiment, the position of a tag sheet is specified based on the sheet mark identified from the captured image. Hence, even when the tag sheet is moved, the position of the tag sheet, that is, the position of each article presence/absence sensor can be specified.

<<Functional Arrangement of Information Processing Apparatus>>

Figure 14:
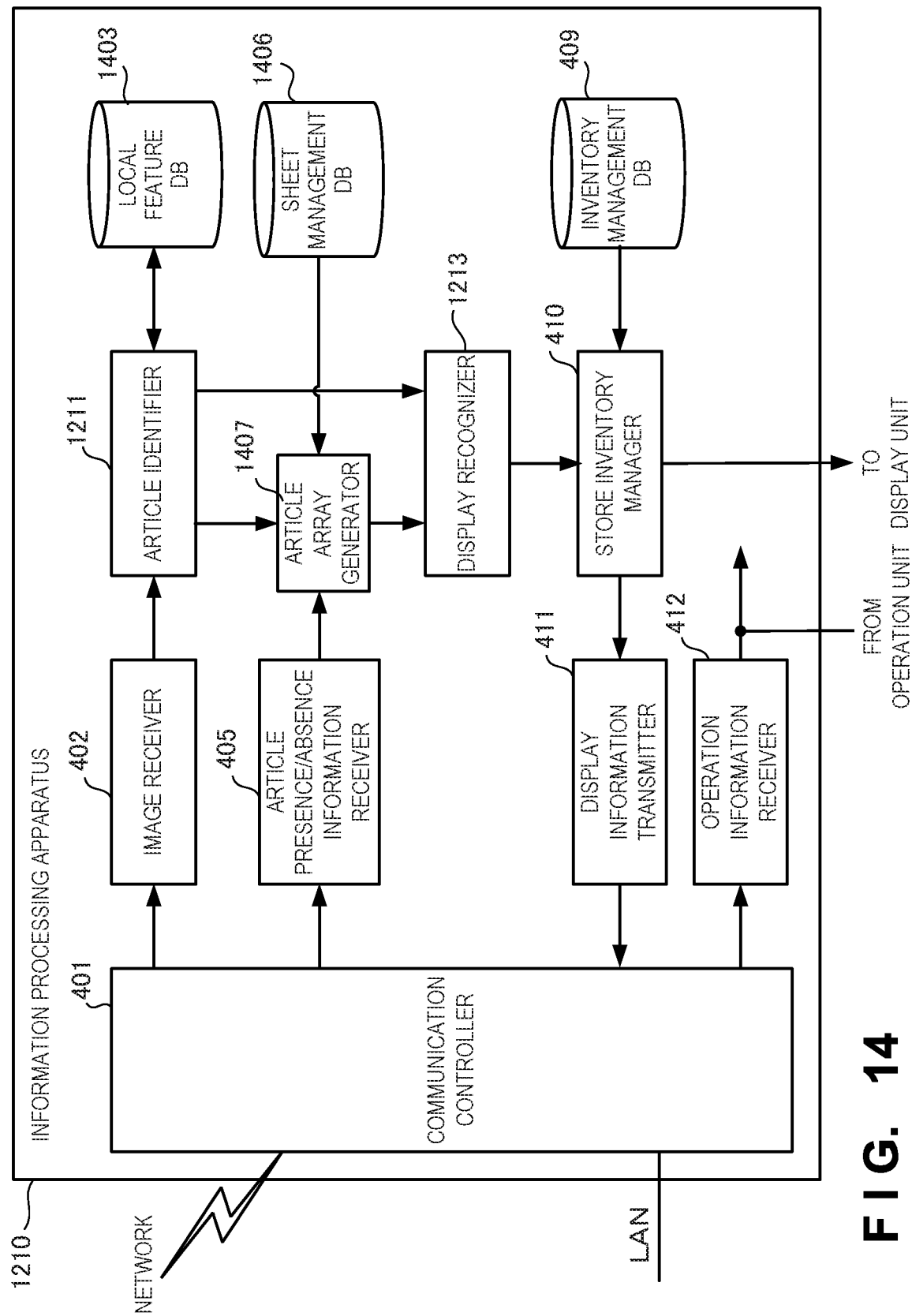
FIG. 14 is a block diagram showing the functional arrangement of the information processing apparatus according to the third embodiment of the present invention.

FIG. 14 is a block diagram showing the functional arrangement of the information processing apparatus 1210 according to this embodiment. Note that the same reference numerals as in FIG. 4 denote the same functional components in FIG. 14, and a description thereof will be omitted.

The article identifier 1211 shown in FIG. 14 not only identifies articles in an image but also identifies sheet marks in the image. Hence, a local feature database 1403 stores local features from the images of the sheet marks in addition to local features generated from article images. Note that each sheet mark preferably includes many feature points to facilitate identification of the sheet mark.

An article array generator 1407 generates an article presence/absence array table representing the article array on the display shelf from article presence/absence information by referring to sheet mark information from the article identifier 1211 and the arrangement information of article presence/absence sensors 1230 in the tag sheets stored in a sheet management database 1406.

(Local Feature Database)

FIG. 15A is a view showing the arrangement of the local feature database 1403 according to this embodiment. Note that the local feature database 1403 also includes data of a local feature database 403 shown in FIG. 5A which is generated from an article image.

The local feature database 1403 stores a local feature group 1512 generated from a sheet mark image in association with a sheet mark ID 1511.

(Sheet Management Database)

Figure 15B:
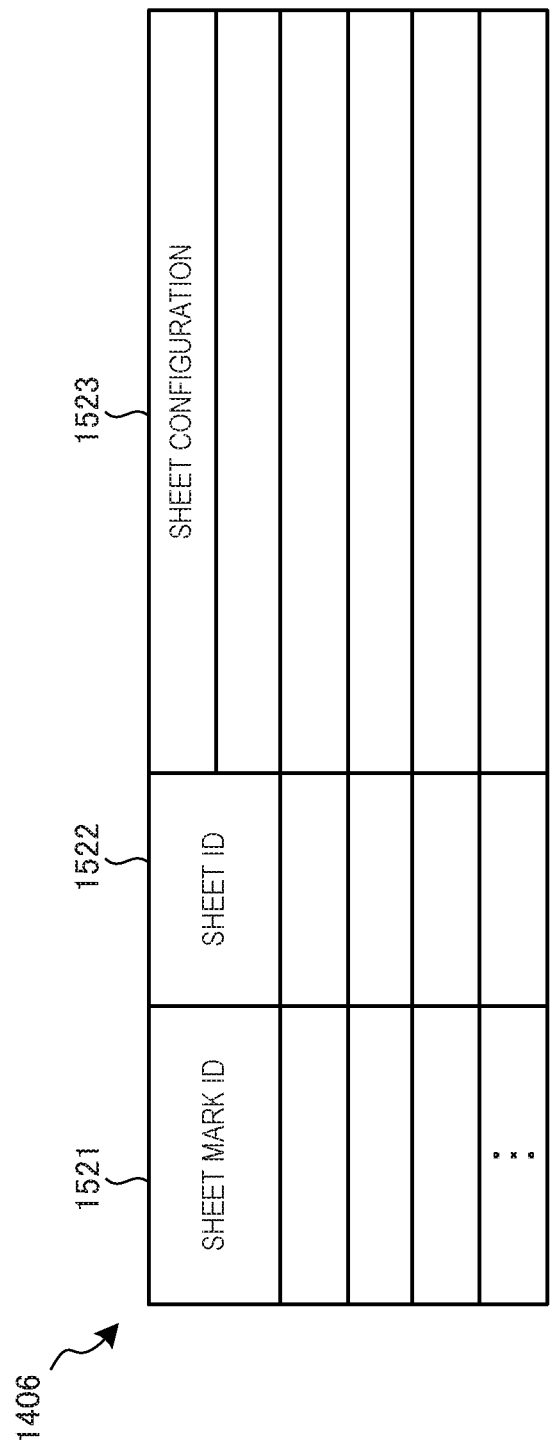
FIG. 15B is a view showing the arrangement of a sheet management database according to the third embodiment of the present invention.

FIG. 15B is a view showing the arrangement of the sheet management database 1406 according to this embodiment.

In association with a sheet mark ID 1521, the sheet management database 1406 stores a sheet ID 1522 of a tag sheet with the sheet mark, and a sheet configuration 1523. Note that the sheet configuration 1523 is data corresponding to the sheet configuration 527 shown in FIG. 5B.

(Article Type Array Table)

FIG. 15C is a view showing the arrangement of an article type array table 1530 according to this embodiment. The article type array table 1530 is a table generated by the article identifier 1211 based on articles and sheet marks identified from the captured image. Note that the same reference numerals as in FIG. 5C denote the same items in FIG. 15C, and a description thereof will be omitted.

In FIG. 15C, a sheet ID 1537 specified from a sheet mark identified by the article identifier 1211 is stored in addition to the items shown in FIG. 5C. The article type array table 1530 and an article presence/absence array table generated from article presence/absence information from the article presence/absence sensor are linked by the sheet ID 1537 specified from the sheet mark.

Note that an article presence/absence array table, a shelf allocation, and a display count table are the same as in FIGS. 5D and 5E, and an illustration and description thereof will be omitted.

<<Processing Procedure of Information Processing Apparatus>>

FIG. 16A is a flowchart showing the processing procedure of the information processing apparatus 1210 according to this embodiment. This flowchart is executed by a CPU 1010 shown in FIG. 10A using a RAM 1040 and implements the functional components shown in FIG. 14. Note that the same step numbers as in FIG. 11A denote the same steps in FIG. 16A, and a description thereof will be omitted.

FIG. 16A is different from FIG. 11A in that the information processing apparatus 1210 identifies a sheet mark from a captured image, determines the arrangement position of a tag sheet, and generates an article presence/absence sensor array in step S1607.

(Sheet Mark Identification Processing)

Figure 16B:
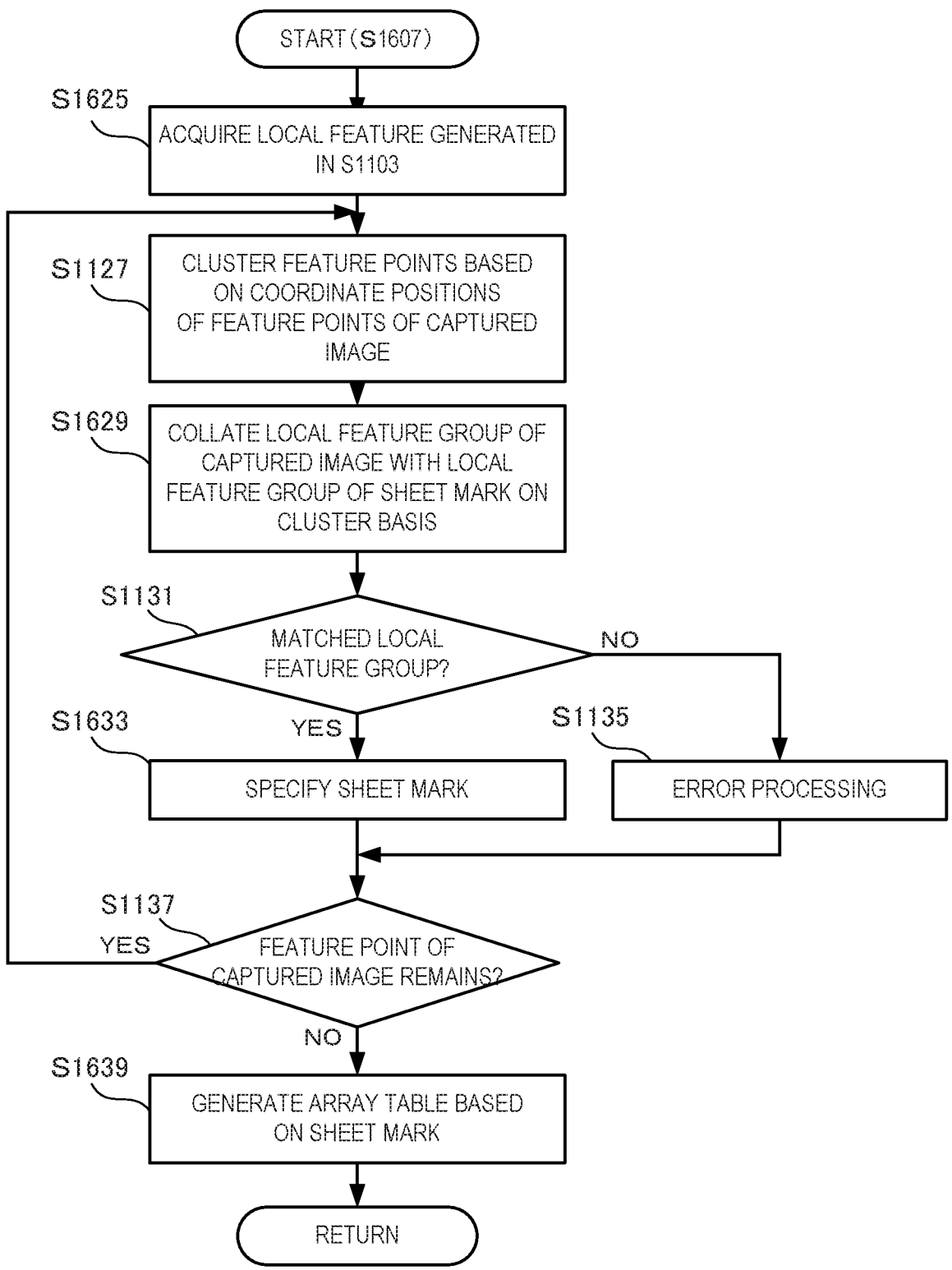
FIG. 16B is a flowchart showing the procedure of sheet mark identification processing according to the third embodiment of the present invention.

FIG. 16B is a flowchart showing the procedure of sheet mark identification processing (step S1607) according to this embodiment. Note that the same step numbers as in FIG. 11B denote the same steps in FIG. 16B, and a description thereof will be omitted.

In step S1625, the information processing apparatus 1210 acquires local features generated from the captured image in step S1103. Note that if local features of an accuracy different from local features of an article are used to collate a sheet mark, local features of the sheet mark may newly be generated instead of using the local features generated in step S1103.

In step S1629, the information processing apparatus 1210 collates the local feature group of the captured image with the local feature group of the sheet mark on a cluster basis. Note that processing unique to sheet mark identification may be performed in clustering of step S1127 and collation of step S1629 as well. If the local feature groups match, in step S1633, the information processing apparatus 1210 specifies the sheet mark. In step S1639, the information processing apparatus 1210 generates an array table based on the sheet mark and uses the array table to link the article type array table 1530 with the article presence/absence array table generated from the article presence/absence information from the article presence/absence sensor.

According to this embodiment, even when the article presence/absence sensor group on the article display shelf is moved, its position can be specified. For this reason, even when the article presence/absence sensor group is arbitrarily arranged, article identification based on a captured image and article presence/absence information from an article presence/absence sensor can easily be linked.

Fourth Embodiment

An article management system including an information processing apparatus according to the fourth embodiment of the present invention will be described next. The information processing apparatus according to this embodiment is different from the second embodiment in that a unique shelf identification mark (to be abbreviated as a shelf mark hereinafter) attached to an article display shelf is identified from a captured image. The rest of the components and operations is the same as in the second and third embodiments. Hence, the same reference numerals denote the same components and operations, and a detailed description thereof will be omitted.

According to this embodiment, since the position of an article display shelf can be determined based on a shelf mark, it is possible to easily link article identification based on a captured image with article presence/absence information from an article presence/absence sensor.

<<Article Management System>>

The arrangement and operation of an article management system 1700 according to this embodiment will be described with reference to FIGS. 17 and 18.

(System Outline)

Figure 17:
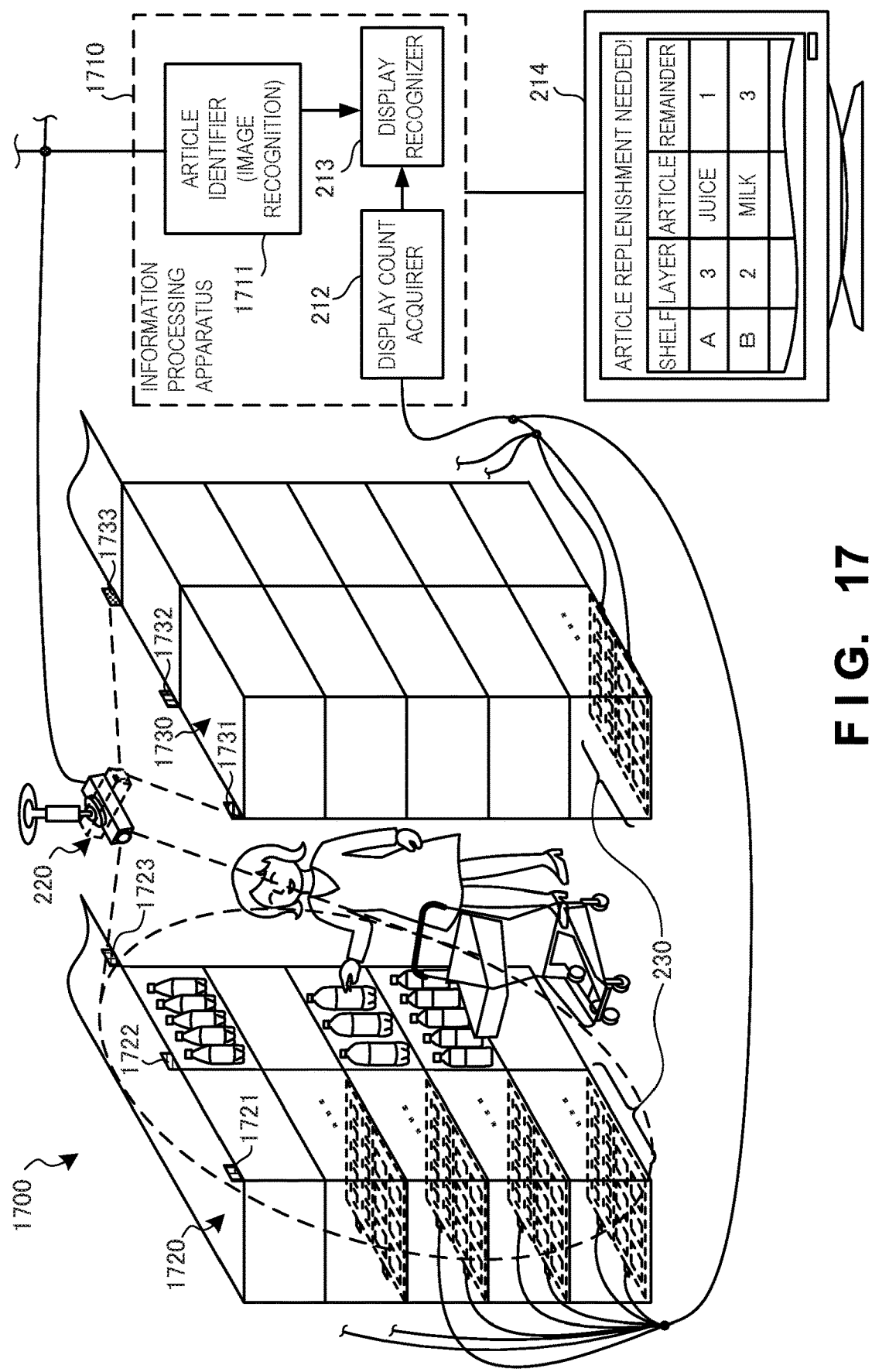
FIG. 17 is a view showing the outline of an article management system including an information processing apparatus according to the fourth embodiment of the present invention.

FIG. 17 is a view showing the outline of the article management system 1700 including an information processing apparatus 1710 according to this embodiment. Note that the same reference numerals as in FIG. 2A denote the same constituent elements in FIG. 17, and a description thereof will be omitted.

The article management system 1700 includes the information processing apparatus 1710, an image capturer 220 that is a camera, and article presence/absence sensors 230. The image capturer 220 captures the images of the front lines of display shelves 1720 and 1730. Note that the images shot by the image capturer 220 include shelf marks 1721 to 1723, . . . 1731 to 1733 added to the display shelves of the display shelves 1720 and 1730 as well. That is, the shelf marks 1721 to 1723, . . . 1731 to 1733 are added to the display shelves of the display shelves 1720 and 1730.

The information processing apparatus 1710 includes an article identifier 1711, a display count acquirer 212, and a display recognizer 1713. The article identifier 1711 receives the images of the front lines of the display shelves 1720 and 1730 from the image capturer 220, identifies the types and array of displayed articles, and also identifies the shelf marks 1721 to 1723, . . . 1731 to 1733. The display recognizer 1713 links the article arrays of the front lines of the display shelves 1720 and 1730 from the article identifier 1711 with display count information from the display count acquirer 212 based on the positions of the shelf marks 1721 to 1723, . . . 1731 to 1733 identified by the article identifier 1711, and recognizes the number of displayed articles on the display shelves 1720 and 1730.

Note that the number of shelf marks are not limited to the example shown in FIG. 17. The number of shelf marks is selected in correspondence with the field of view of the image capturer 220.

(Operation Procedure)

Figure 18:
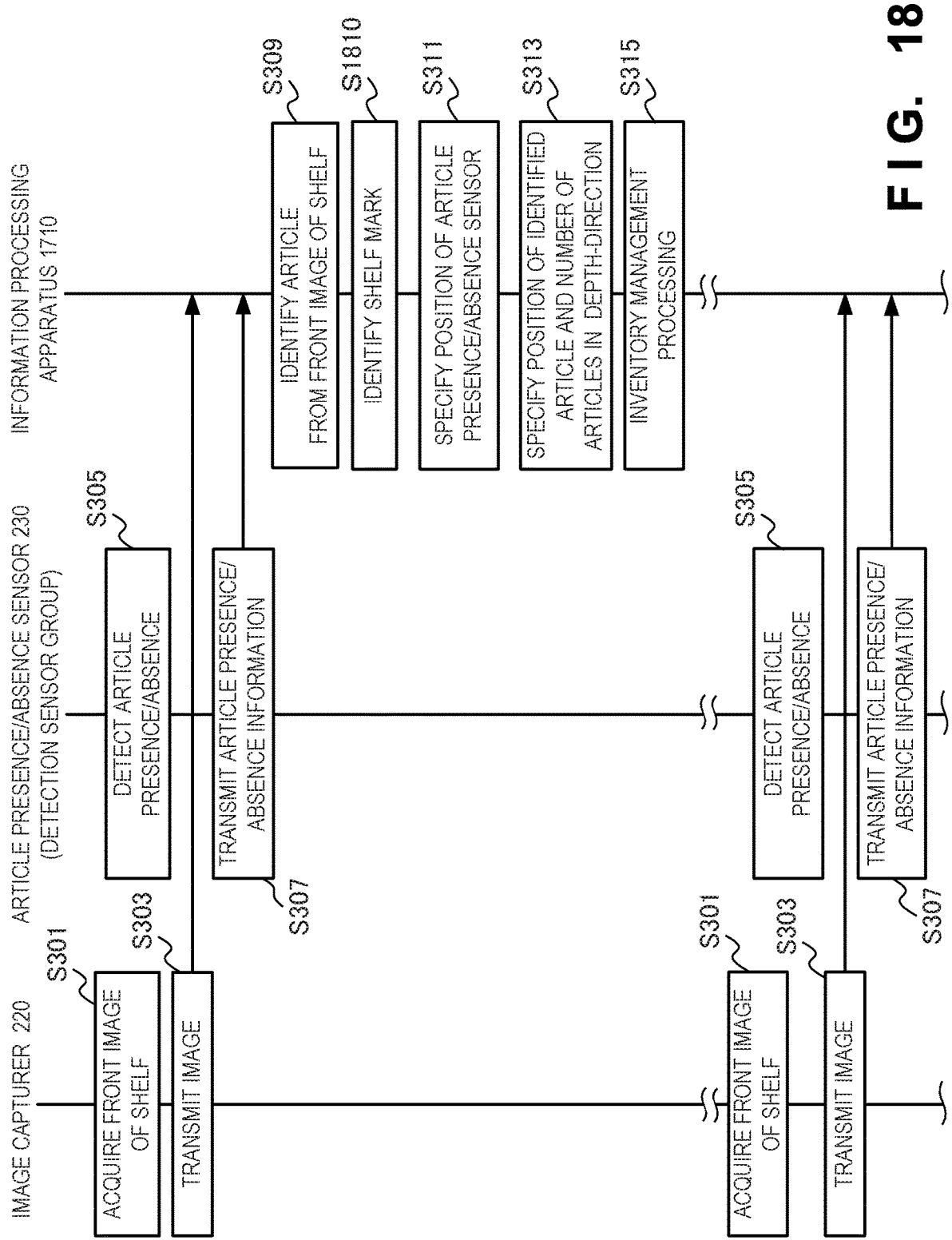
FIG. 18 is a sequence chart showing the operation procedure of the article management system including the information processing apparatus according to the fourth embodiment of the present invention.

FIG. 18 is a sequence chart showing the operation procedure of the article management system 1700 including the information processing apparatus 1710 according to this embodiment. Note that the same step numbers as in FIG. 3A of the second embodiment denote the same steps in FIG. 18, and a description thereof will be omitted.

In FIG. 18, shelf mark identification of step S1810 is added to FIG. 3AA. In step S1810, the information processing apparatus 1710 identifies shelf marks from the front image of a display shelf and links an image position from the image capturer 220 with an article presence/absence sensor position.

In the second and third embodiments, the position of an image shot by the image capturer 220 is fixed, and the same position of the image corresponds to the same position of the display shelf. In this embodiment, the position of an image shot by the image capturer 220 is linked with the same position of the display shelf by the shelf mark identified from the captured image. This makes it possible to link each article identification position with the position of each article presence/absence sensor even when the image capturer 220 pans.

<<Functional Arrangement of Information Processing Apparatus>>

Figure 19:
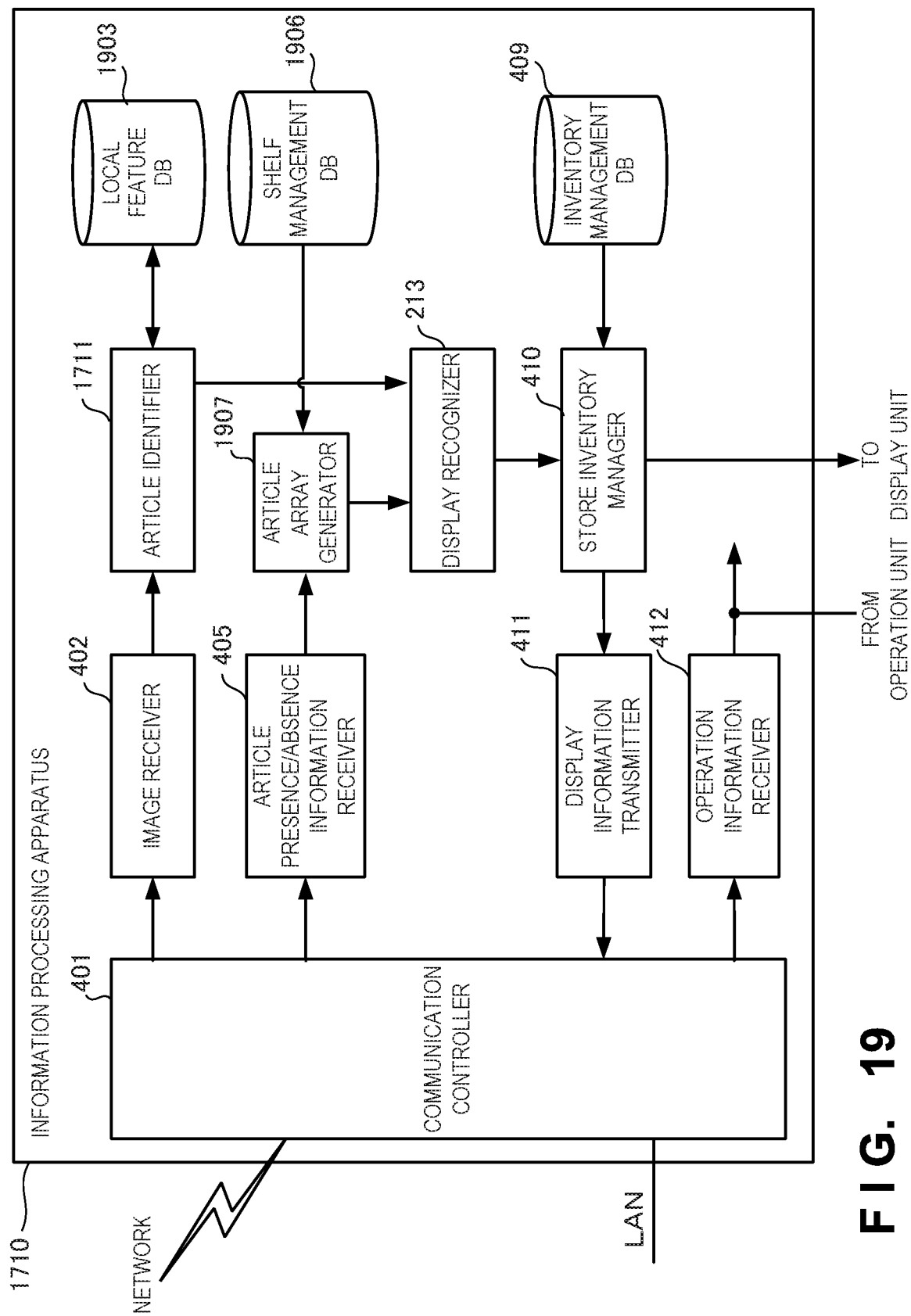
FIG. 19 is a block diagram showing the functional arrangement of the information processing apparatus according to the fourth embodiment of the present invention.

FIG. 19 is a block diagram showing the functional arrangement of the information processing apparatus 1710 according to this embodiment. Note that the same reference numerals as in FIG. 4 denote the same functional components in FIG. 19, and a description thereof will be omitted.

The article identifier 1711 shown in FIG. 19 not only identifies articles in an image but also identifies shelf marks in the image. Hence, a local feature database 1903 stores local features from the images of the shelf marks in addition to local features generated from article images. Note that each shelf mark preferably includes many feature points to facilitate identification of the shelf mark.

An article array generator 1907 generates an article presence/absence array table representing the article array on the display shelf from article presence/absence information by referring to shelf mark information from the article identifier 1711 and the arrangement information of the article presence/absence sensors 230 in the display shelf stored in a shelf management database 1906.

(Local Feature Database)

FIG. 20A is a view showing the arrangement of the local feature database 1903 according to this embodiment. Note that the local feature database 1903 also includes data of a local feature database 403 shown in FIG. 5A which is generated from an article image.

The local feature database 1903 stores a local feature group 2012 generated from a shelf mark image in association with a shelf mark ID 2011.

(Shelf Management Database)

Figure 20B:
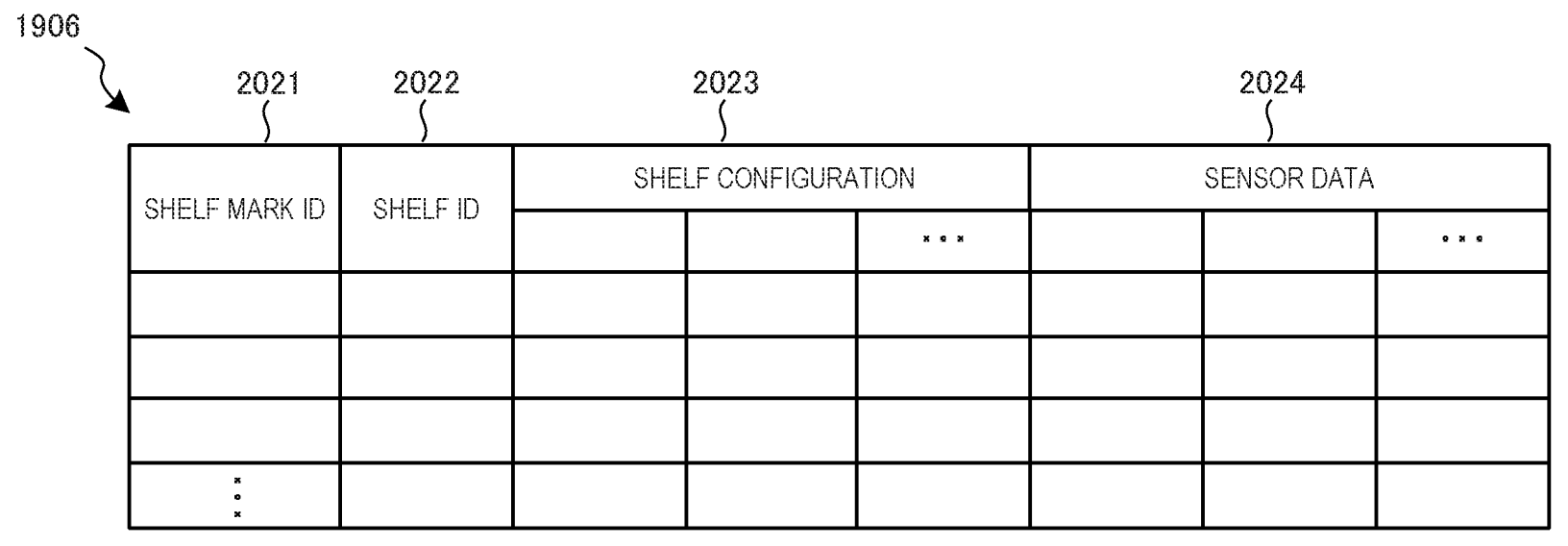

FIG. 20B is a view showing the arrangement of the shelf management database 1906 according to this embodiment.

In association with a shelf mark ID 2021, the shelf management database 1906 stores a shelf ID 2022 of a shelf with the shelf mark, a shelf configuration 2023 representing the number of layers and the number of columns of the shelf, and shelf allocation data 2024. Note that the shelf configuration 2023 and the shelf allocation data 2024 are data corresponding to a sensor database 406a shown in FIG. 5B.

(Article Type Array Table)

FIG. 20C is a view showing the arrangement of an article type array table 2030 according to this embodiment. The article type array table 2030 is a table generated by the article identifier 1711 based on articles and shelf marks identified from the captured image. Note that the same reference numerals as in FIG. 5C denote the same items in FIG. 20C, and a description thereof will be omitted.

In FIG. 20C, a column 2037 of the shelf specified by referring to the shelf mark identified by the article identifier 1711 and the shelf management database 1906 and a sheet ID 2038 are stored in addition to the items shown in FIG. 5C. The article type array table 2030 and an article presence/absence array table generated from article presence/absence information from the article presence/absence sensor are linked by the column 2037 of the shelf identified from the shelf mark and the sheet ID 2038.

Note that an article presence/absence array table, a shelf allocation, and a display count table are the same as in FIGS. 5D and 5E, and an illustration and description thereof will be omitted.

<<Processing Procedure of Information Processing Apparatus>>

Figure 21A:
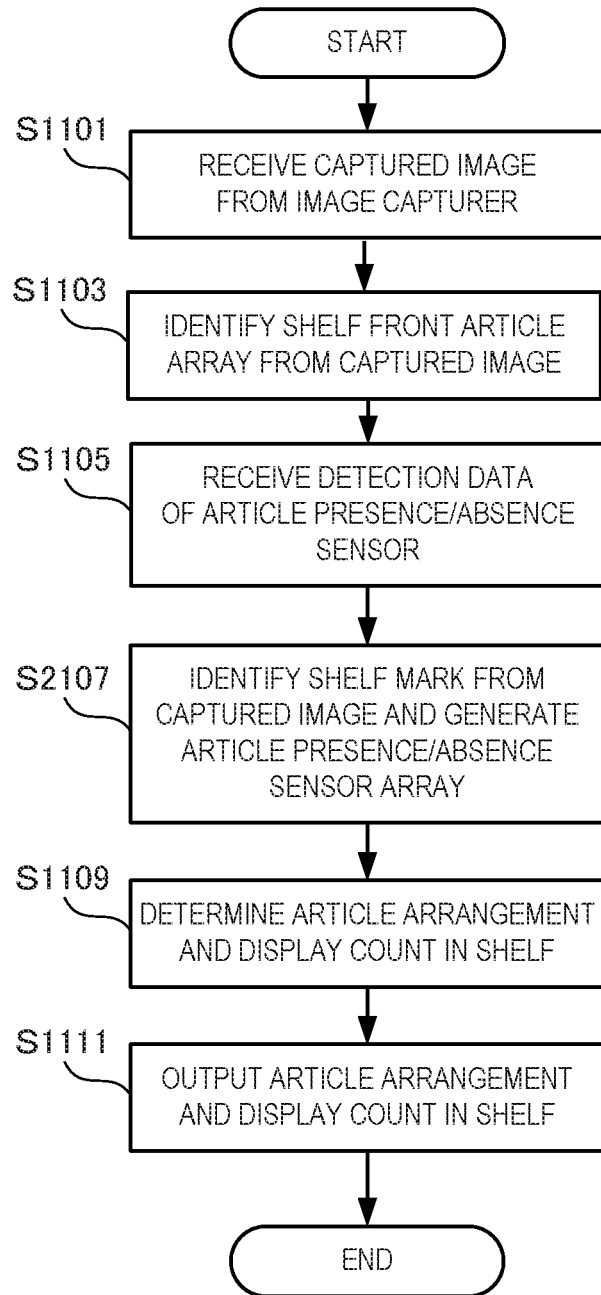
FIG. 21A is a flowchart showing the processing procedure of the information processing apparatus according to the fourth embodiment of the present invention.

FIG. 21A is a flowchart showing the processing procedure of the information processing apparatus 1710 according to this embodiment. This flowchart is executed by a CPU 1010 shown in FIG. 10A using a RAM 1040 and implements the functional components shown in FIG. 17. Note that the same step numbers as in FIG. 11A denote the same steps in FIG. 21A, and a description thereof will be omitted.

FIG. 21A is different from FIG. 11A in that the information processing apparatus 1710 identifies a shelf mark from a captured image, links the position of the captured image with the arrangement position of a tag sheet, and generates an article presence/absence sensor array in step S2107.

(Shelf Mark Identification Processing)

Figure 21B:
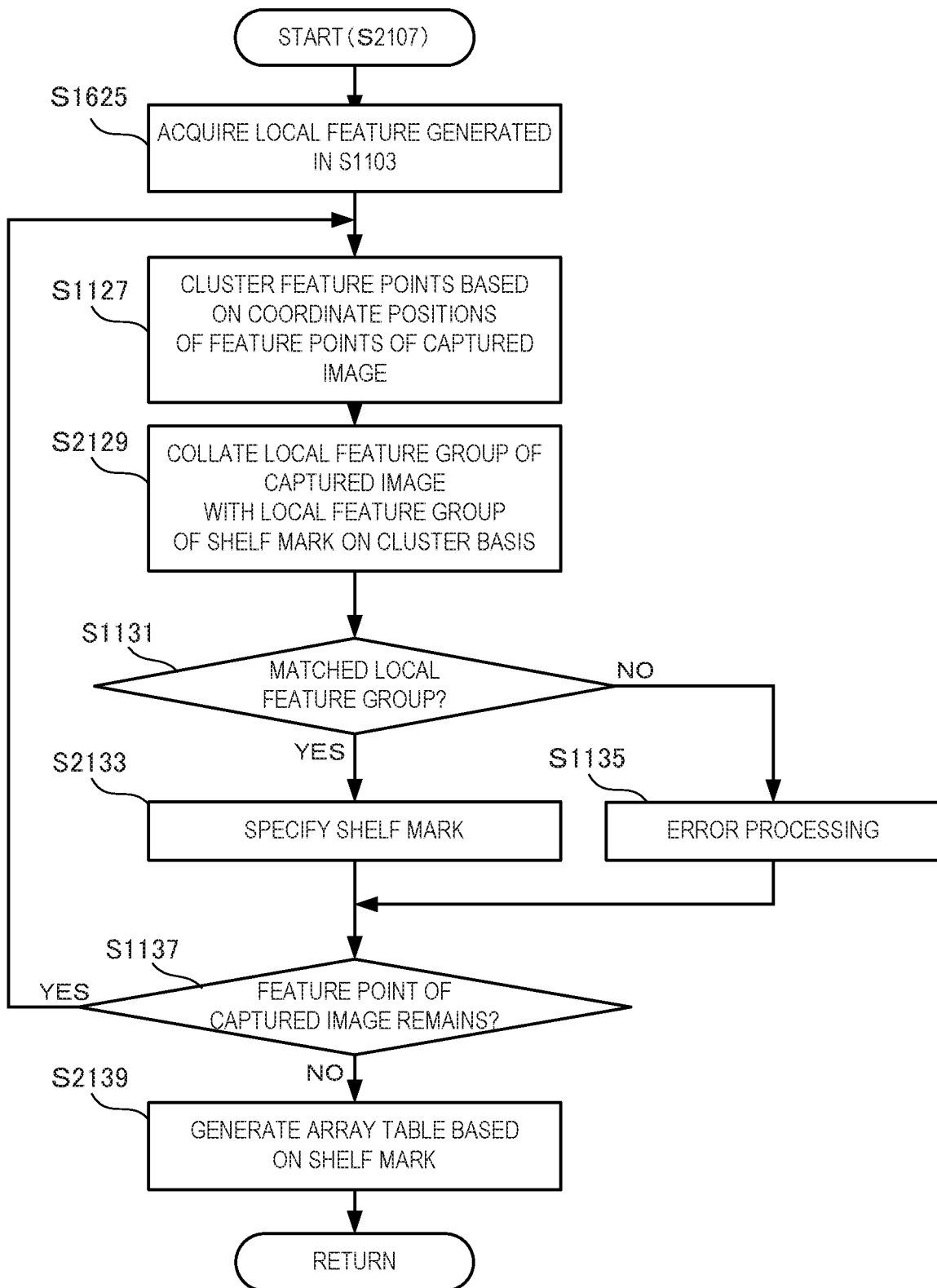
FIG. 21B is a flowchart showing the procedure of shelf mark identification processing according to the fourth embodiment of the present invention.

FIG. 21B is a flowchart showing the procedure of shelf mark identification processing (step S2107) according to this embodiment. Note that the same step numbers as in FIG. 11B or 16B denote the same steps in FIG. 21B, and a description thereof will be omitted.

In step S1625, the information processing apparatus 1710 acquires local features generated from the captured image in step S1103. Note that if local features of an accuracy different from that of an article or a sheet mark are used to collate a shelf mark, local features may newly be generated instead of using the local features generated in step S1103.

In step S2129, the information processing apparatus 1710 collates the local feature group of the captured image with the local feature group of the shelf mark on a cluster basis. Note that processing unique to shelf mark identification may be performed in clustering of step S1127 and collation of step S2129 as well. If the local feature groups match, in step S2133, the information processing apparatus 1710 specifies the shelf mark. In step S2139, the information processing apparatus 1710 generates an array table based on the shelf mark and uses the array table to link the article type array table 2030 with the article presence/absence array table generated from the article presence/absence information from the article presence/absence sensor.

According to this embodiment, since the position of an article display shelf can be determined based on a shelf mark, it is possible to easily link article identification based on a captured image with article presence/absence information from an article presence/absence sensor.

Fifth Embodiment

An article management system including an information processing apparatus according to the fifth embodiment of the present invention will be described next. The information processing apparatus according to this embodiment is different from the second embodiment in that an article array unique to an article display shelf is identified from a captured image. The rest of the components and operations is the same as in the second to fourth embodiments. Hence, the same reference numerals denote the same components and operations, and a detailed description thereof will be omitted.

According to this embodiment, since the position of an article display shelf can be determined based on a unique article array, it is possible to easily link article identification based on a captured image with article presence/absence information from an article, presence/absence sensor without adding a sheet mark or shelf mark to the display shelf.

<<Article Management System>>

The arrangement and operation of an article management system 2200 according to this embodiment will be described with reference to FIGS. 22 and 23.

(System Outline)

Figure 22:
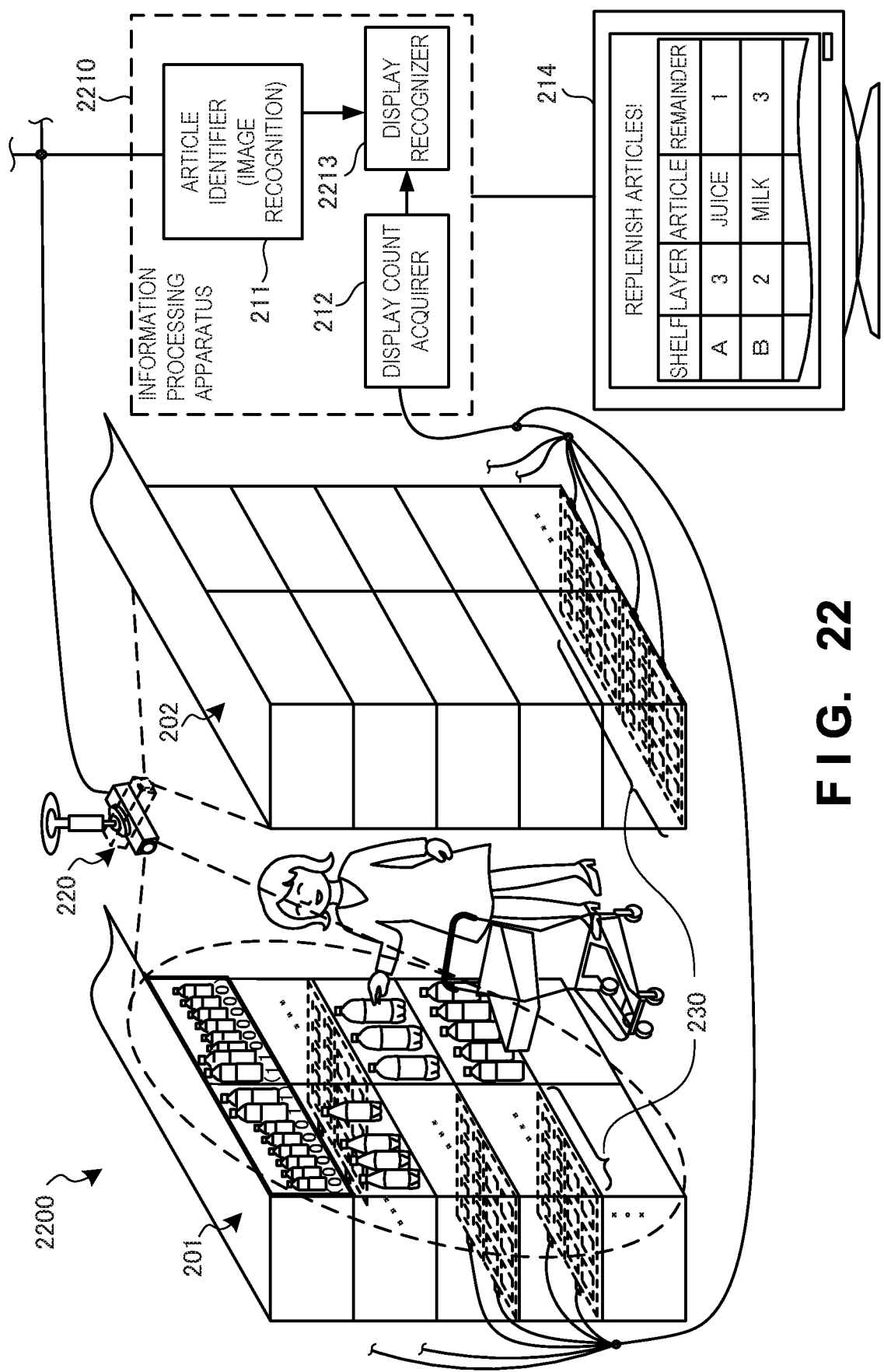
FIG. 22 is a view showing the outline of an article management system including an information processing apparatus according to the fifth embodiment of the present invention.

FIG. 22 is a view showing the outline of the article management system 2200 including an information processing apparatus 2210 according to this embodiment. Note that the same reference numerals as in FIG. 2A denote the same constituent elements in FIG. 22, and a description thereof will be omitted.

The article management system 2200 includes the information processing apparatus 2210, an image capturer 220 that is a camera, and article presence/absence sensors 230. The image capturer 220 captures the images of the front lines of display shelves 201 and 202. Note that the article array at a specific position, that is, on the top layer of each of the display shelves of the display shelves 201 and 202 in FIG. 22 has an array unique to the display shelf. Note that FIG. 22 shows an example in which the array of tall bottles (represented by a bit "1") and short bottles (represented by a bit "0") on the top layer of the display shelf 201 is assumed to be unique to the display shelf for the sake of simplicity. However, a display shelf can be specified by employing a unique array based on the identification result of each article and assuming a very small number of article columns to be unique to each display shelf. A shelf and its capturing position can thus be specified without any shelf mark as in the fourth embodiment.

The information processing apparatus 2210 includes an article identifier 211, a display count acquirer 212, and a display recognizer 2213. The article identifier 211 receives the images of the front lines of the display shelves 201 and 202 from the image capturer 220, and identifies the types of displayed articles. The display recognizer 2213 links the article arrays of the front lines of the display shelves 201 and 202 from the article identifier 211 with article presence/absence information from the display count acquirer 212 based on the positions of the shelves identified from the article array unique to the display shelves, and recognizes the number of displayed articles on the display shelves 201 and 202.

Note that the interval of the unique article array is not limited to the example shown in FIG. 22. The interval is selected in correspondence with the field of view of the image capturer 220.

(Operation Procedure)

Figure 23:
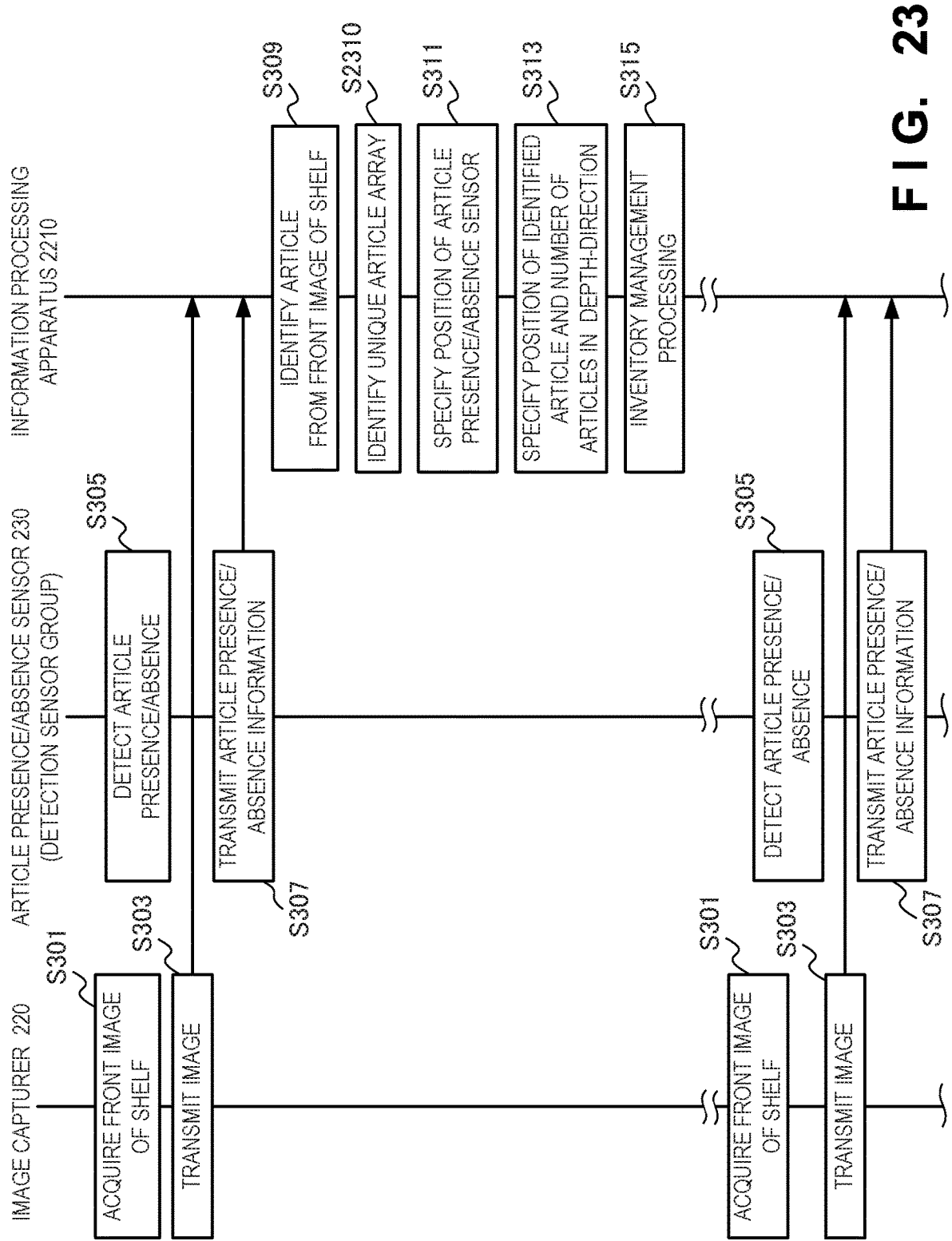
FIG. 23 is a sequence chart showing the operation procedure of the article management system including the information processing apparatus according to the fifth embodiment of the present invention.

FIG. 23 is a sequence chart showing the operation procedure of the article management system 2200 including the information processing apparatus 2210 according to this embodiment. Note that the same step numbers as in FIG. 3A of the second embodiment denote the same steps in FIG. 23, and a description thereof will be omitted.

In FIG. 23, identification of an article array unique to a display shelf in step S2310 is added to FIG. 3A. In step S2310, the information processing apparatus 2210 identifies the article array unique to a display shelf from the front image of the display shelf and links an image position from the image capturer 220 with an article presence/absence sensor position.

In the fourth embodiment, a shelf mark is added to cope with linking each article identification position with the position of each article presence/absence sensor. In this embodiment, the position of an image shot by the image capturer 220 is linked with the same position of the display shelf by the article array unique to the display shelf identified from the captured image. This makes it possible to link each article identification position with the position of each article presence/absence sensor even when the image capturer 220 pans.

<<Functional Arrangement of Information Processing Apparatus>>

Figure 24:
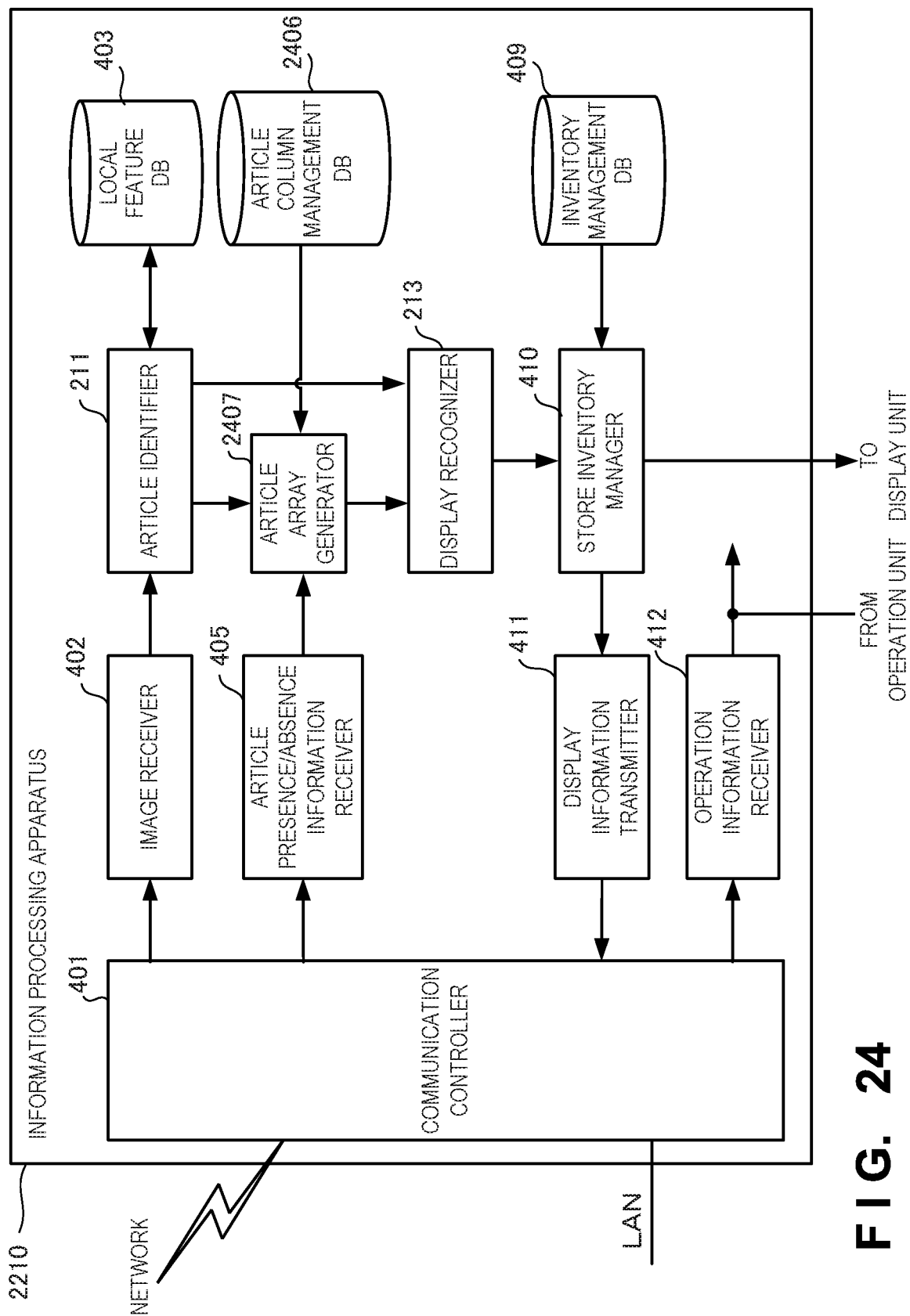
FIG. 24 is a block diagram showing the functional arrangement of the information processing apparatus according to the fifth embodiment of the present invention.

FIG. 24 is a block diagram showing the functional arrangement of the information processing apparatus 2210 according to this embodiment. Note that the same reference numerals as in FIG. 4 denote the same functional components in FIG. 24, and a description thereof will be omitted.

An article array generator 2407 shown in FIG. 24 generates an article presence/absence array table representing the article array on the display shelf from article presence/absence information by referring to article recognition information from the article identifier 211 and unique article column information in the display shelf stored in an article column management database 2406 serving as an article array storage. Note that the unique article column in the display shelf is preferably capable of reliably identifying the unique article array to raise the identification accuracy. For example, an array of articles having a characteristic color or shape is preferable.

(Article Column Management Database)

Figure 25:
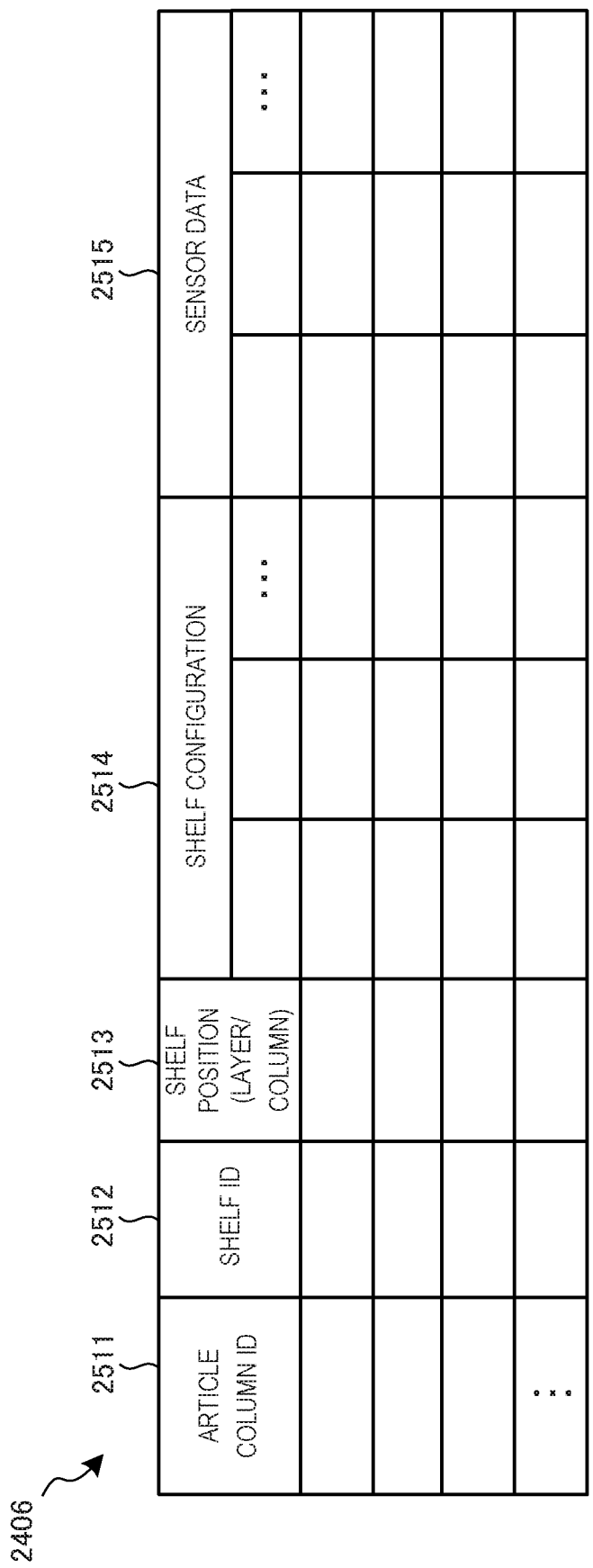
FIG. 25 is a view showing the arrangement of an article column management database according to the fifth embodiment of the present invention.

FIG. 25 is a view showing the arrangement of the article column management database 2406 according to this embodiment.

The article column management database 2406 stores a shelf ID 2512, a shelf position 2513 including a layer and a column, a shelf configuration 2514 representing the number of layers and the number of columns, and shelf allocation data 2515 in association with an article column ID 2511. Note that the shelf configuration 2514 and the shelf allocation data 2515 are data corresponding to a sensor database 406a shown in FIG. 5B.

<<Processing Procedure of Information Processing Apparatus>>

FIG. 26A is a flowchart showing the processing procedure of the information processing apparatus 2210 according to this embodiment. This flowchart is executed by a CPU 1010 shown in FIG. 10A using a RAM 1040 and implements the functional components shown in FIG. 24. Note that the same step numbers as in FIG. 11A denote the same steps in FIG. 26A, and a description thereof will be omitted.

FIG. 26A is different from FIG. 11A in that the information processing apparatus 2210 identifies a shelf from an article column unique to the display shelf, links the position of the captured image with the arrangement position of a tag sheet, and generates an article presence/absence sensor array in step S2606.

(Article Column Identification Processing)

Figure 26B:
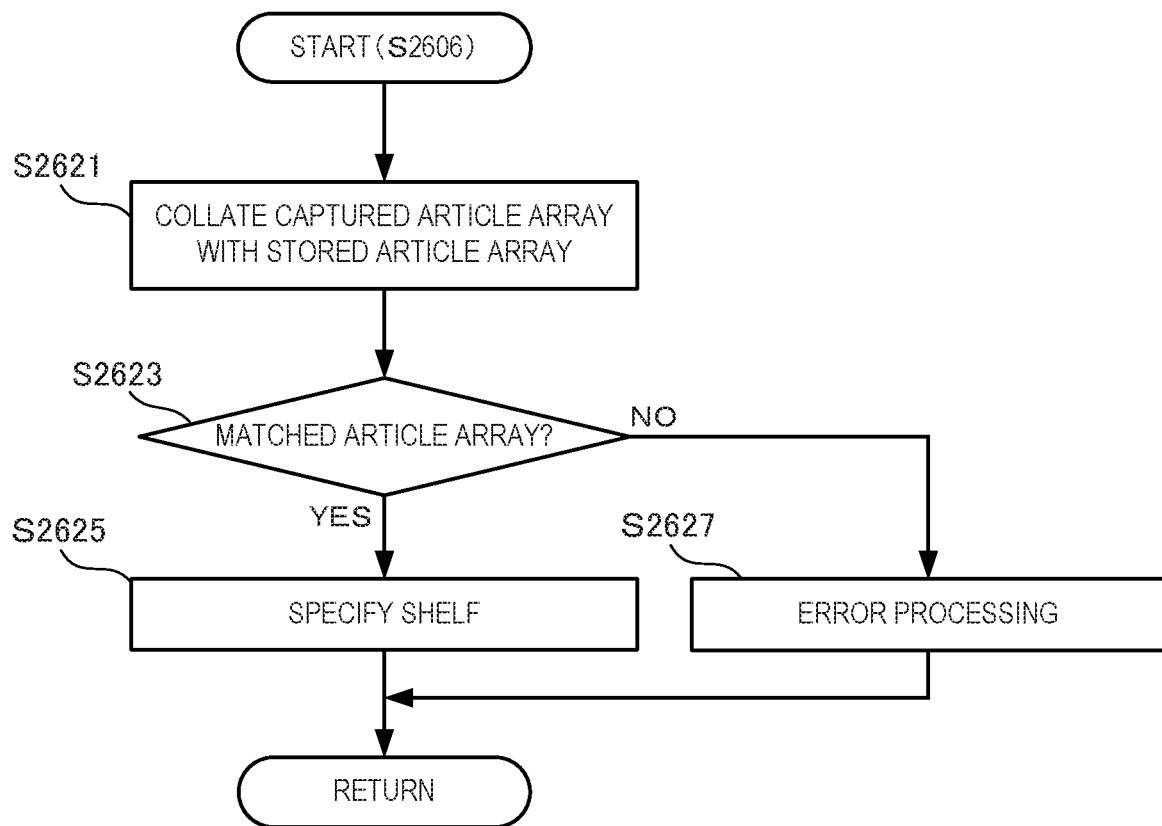
FIG. 26B is a flowchart showing the procedure of article column identification processing according to the fifth embodiment of the present invention.

FIG. 26B is a flowchart showing the procedure of article column identification processing (step S2606) according to this embodiment.

In step S2621, the information processing apparatus 2210 collates the shot article array with the article array stored in the article column management database 2406. In step S2623, the information processing apparatus 2210 determines whether a matched article array exists. If a matched article array exists, the information processing apparatus 2210 specifies a display shelf having the matched article array in step S2625. On the other hand, if no matched article array exists, in step S2627, the information processing apparatus 2210 determines that the display shelf is not found, and performs error processing. Note that in step S2627, it may be performed to change the article identification accuracy or the capturing position/range in accordance with the number of errors.

According to this embodiment, since the position of an article display shelf can be determined based on a unique article array, it is possible to easily link article identification based on a captured image with article presence/absence information from an article presence/absence sensor without adding a sheet mark or shelf mark to the display shelf.

Sixth Embodiment

An article management system including an information processing apparatus according to the sixth embodiment of the present invention will be described next. The information processing apparatus according to this embodiment is different from the second to fifth embodiments in that a change in the article arrangement or an unauthorized arrangement caused by an arrangement error is determined based on article array information obtained from a captured image and article presence/absence information obtained from an article presence/absence sensor. The rest of the components and operations is the same as in the second to fifth embodiments. Hence, the same reference numerals denote the same components and operations, and a detailed description thereof will be omitted.

According to this embodiment, since a change in the article arrangement or an arrangement error can be notified in addition to article replenishment, it is possible to give a sophisticated assistance to article management in a display shelf.

<<Article Management System>>

Figure 27A:
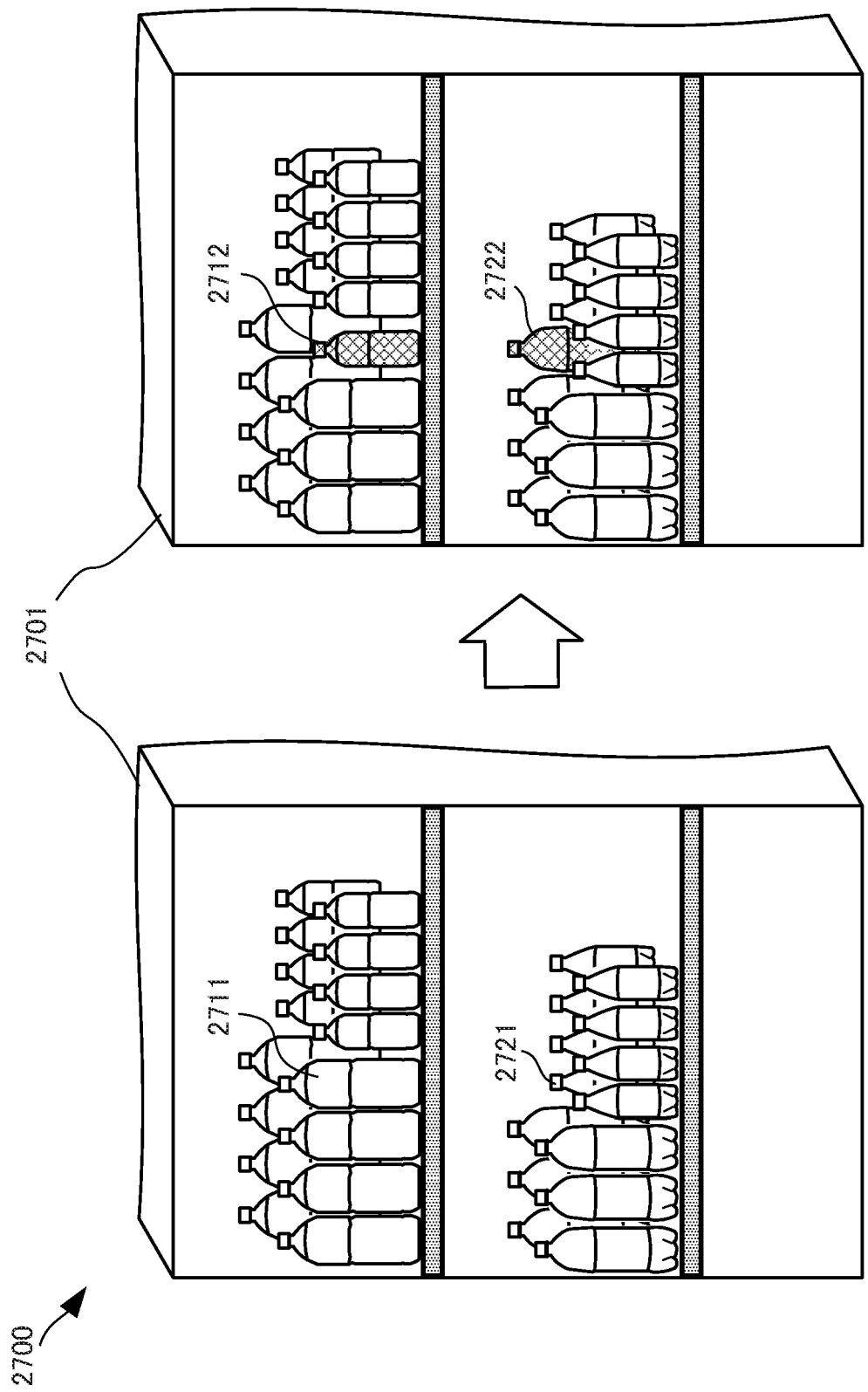
FIG. 27A is a view showing the outline of an article management system including an information processing apparatus according to the sixth embodiment of the present invention.

FIG. 27A is a view showing an outline of an article management system 2700 including an information processing apparatus according to this embodiment.

The article management system 2700 according to this embodiment detects various errors in article arrangement position such as a case where a small bottle 2712 exists at the position of a large bottle 2711 or a case where a small bottle 2722 exists at the position of a large bottle 2721, as shown in FIG. 27A. Alternatively, the article management system 2700 discriminates a change in an article array from an arrangement error.

Figure 27B:
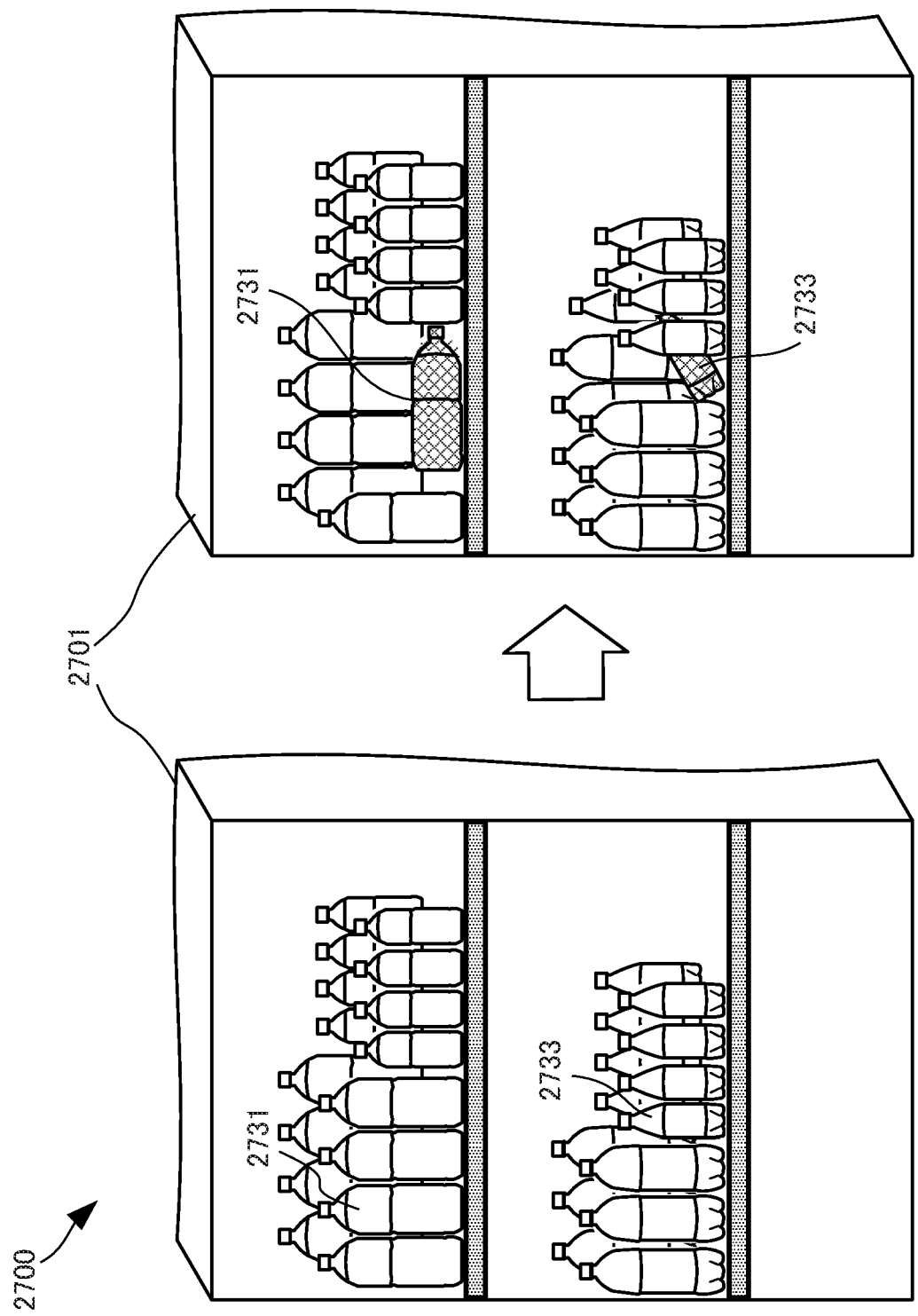
FIG. 27B is a view showing the outline of the article management system including the information processing apparatus according to the sixth embodiment of the present invention.

FIG. 27B is a view showing another outline of the article management system 2700 including the information processing apparatus according to this embodiment.

In the article management system 2700 according to this embodiment, an article presence/absence sensor detects article presence in a case where a large bottle 2731 has fallen or in a case where a small bottle 2733 has fallen, as shown in FIG. 27B. However, when the front image is identified, it is found that an article has fallen to cover a plurality of article presence determination ranges.

Note that FIGS. 27A and 27B show examples in which the articles obviously have a wrong arrangement. In this case, the arrangement error can easily be known from article presence/absence data and article identification data. In some cases, however, the arrangement error cannot easily be known by simple comparison (see FIG. 29).

<<Functional Arrangement of Information Processing Apparatus>>

Figure 28:
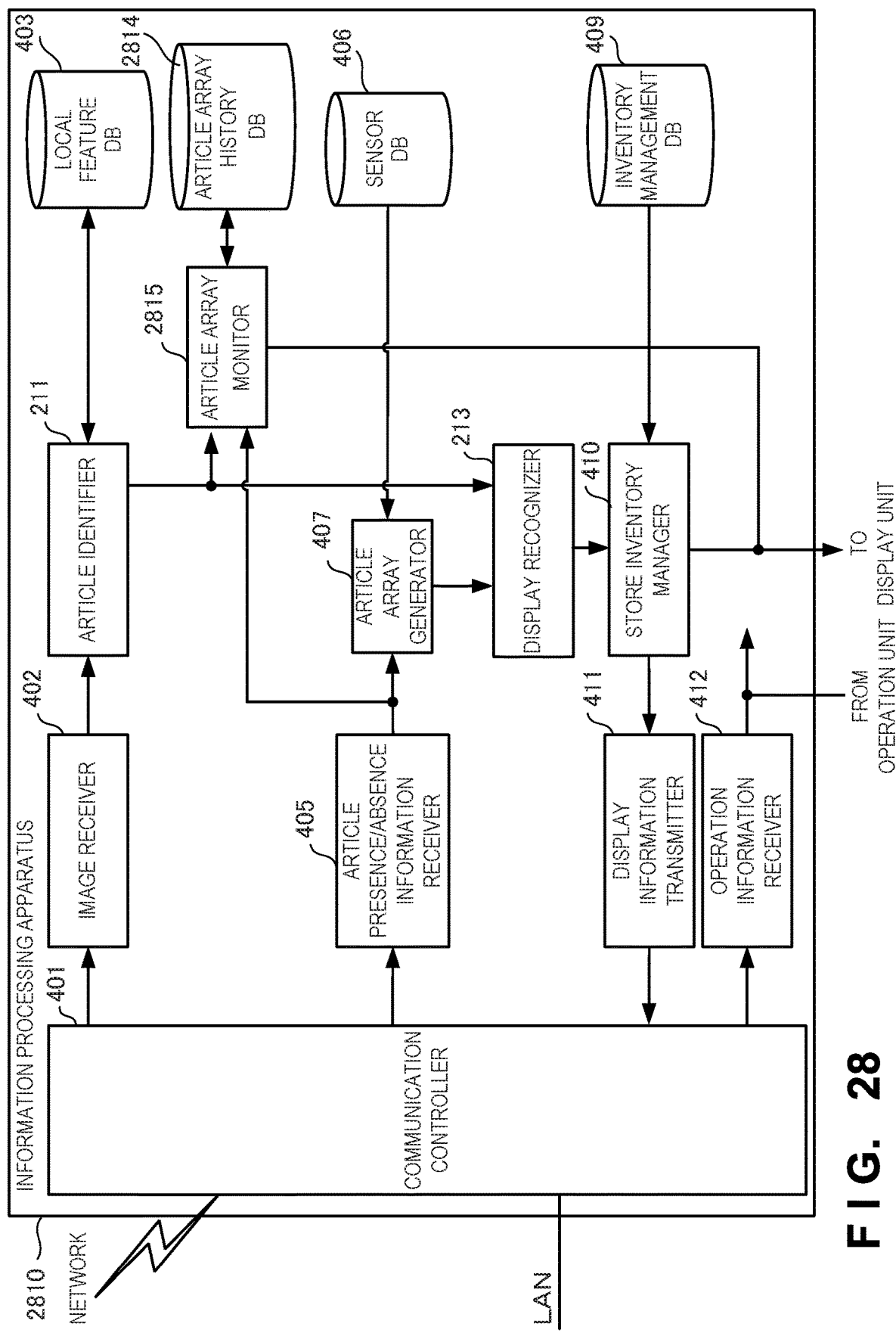
FIG. 28 is a block diagram showing the functional arrangement of the information processing apparatus according to e sixth embodiment of the present invention.

FIG. 28 is a block diagram showing the functional arrangement of an information processing apparatus 2810 according to this embodiment. Note that the same reference numerals as in FIG. 4 denote the same functional components in FIG. 28, and a description thereof will be omitted.

An article array history database 2814 shown in FIG. 28 accumulates the history of an article array identified by an article identifier 211 and an article array detected by an article presence/absence sensor. An article array monitor 2815 compares the article array identified by the article identifier 211 with the article array detected by the article presence/absence sensor, and if the article arrays do not match, acquires past article array information from the article array history database 2814 and determines whether the article array has been changed, or a temporary article array error has occurred. If an article array error has occurred, the display unit displays this to make a warning.

(Article Display Determination Processing)

Figure 29:
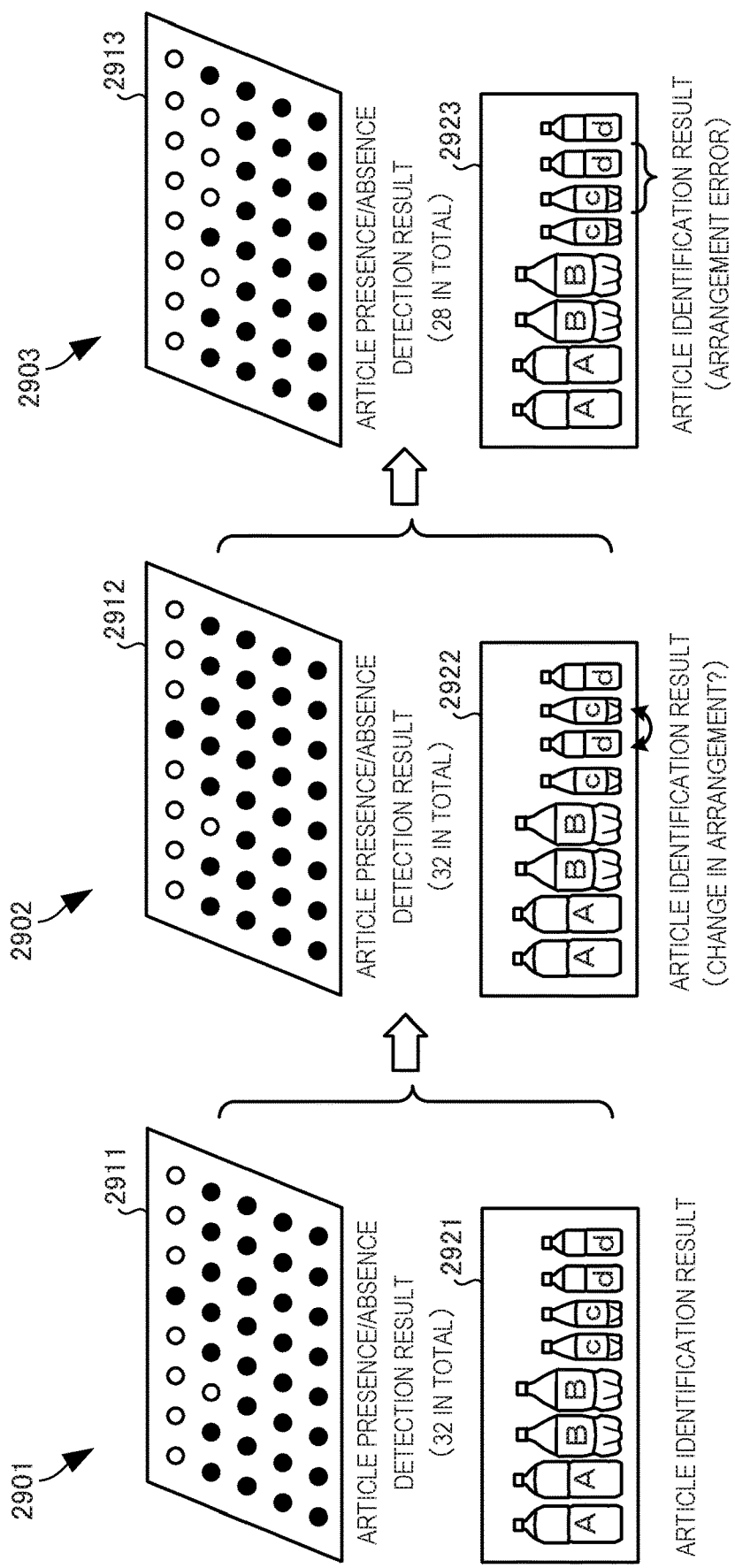
FIG. 29 is a view for explaining article display determination processing according to the sixth embodiment of the present invention.

FIG. 29 is a view for explaining article display determination processing according to this embodiment. FIG. 29 shows an example to determine whether an article array has been changed, or a temporary article array error has occurred. However, the determination algorithm is not limited to this.

In an article array 2901, the article presence/absence sensor of the display shelf detects that a total of 32 articles are displayed on eight columns (numbers of articles on the columns: 4, 4, 3, 4, 5, 4, 4, 4). The articles on the columns are (large bottle A, large bottle A, large bottle B, large bottle B, small bottle c, small bottle c, small bottle d, small bottle d) according to article identification from the front image.

In an article array 2902 determined next, the article presence/absence sensor of the display shelf detects that a total of 32 articles are still displayed on eight columns (numbers of articles on the columns: 4, 4, 3, 4, 5, 4, 4, 4). However, the articles on the columns are (large bottle A, large bottle A, large bottle B, large bottle B, small bottle c, small bottle d, small bottle c, small bottle d) according to article identification from the front image. The articles of the sixth and seventh columns from left have changed to small bottles d and c, respectively. At this stage, it can also be determined that the arrangement of the articles of the sixth and seventh columns has been changed.

In an article array 2903 determined next, the article presence/absence sensor of the display shelf detects that a total of 28 articles are displayed on eight columns (numbers of articles on the columns: 4, 4, 3, 4, 3, 3, 3, 4). At this time, the articles on the columns are (large bottle A, large bottle A, large bottle B, large bottle B, small bottle c, small bottle c, small bottle d, small bottle d) according to article identification from the front image. The articles of the sixth and seventh columns from left have returned to small bottles c and d, respectively. In this case, by referring to the article arrays 2901 and 2902, it can be determined that the bottles of the sixth and seventh columns from left on the front line of the article array 2902 were arrangement errors.

Note that the example of FIG. 29 is merely an example, and a change in the arrangement or an arrangement error can be determined by tracking the history of article array based on the history of data from the article presence/absence sensor and the article array identified from the front image.

<<Processing Procedure of Information Processing Apparatus>>

Figure 30A:
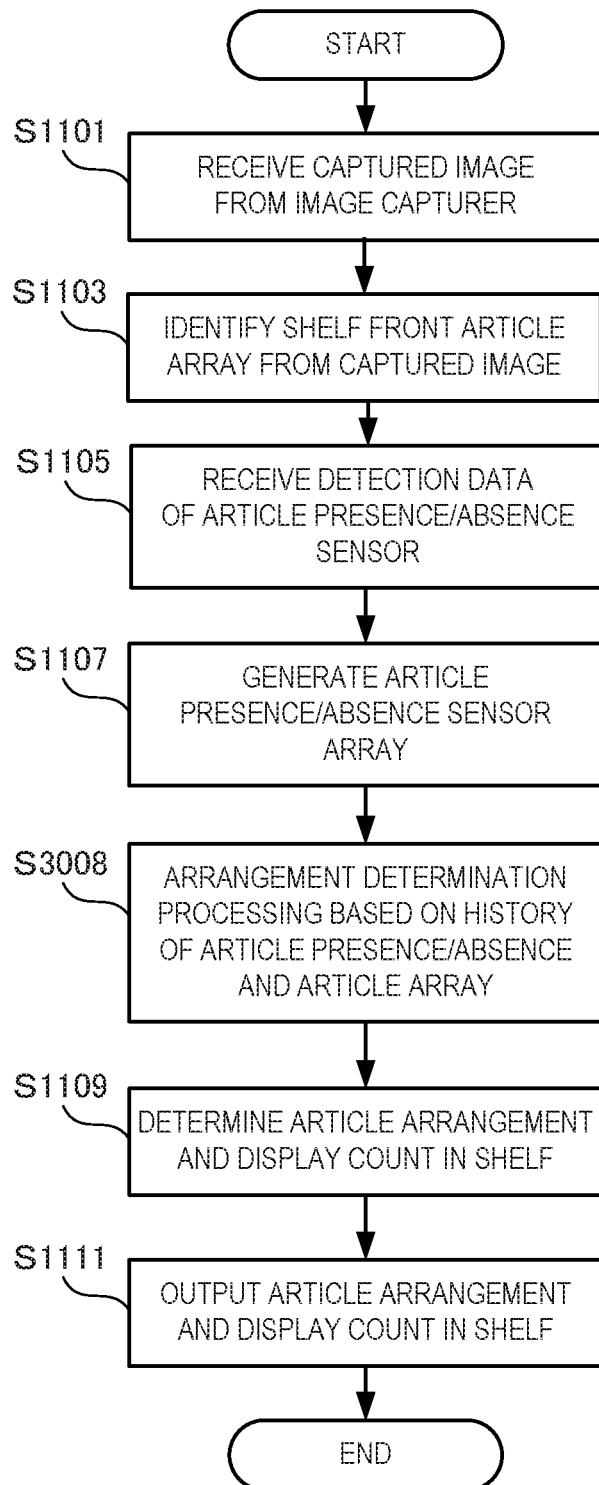
FIG. 30A is a flowchart showing the processing procedure of the information processing apparatus according to the sixth embodiment of the present invention.

FIG. 30A is a flowchart showing the processing procedure of the information processing apparatus according to this embodiment. This flowchart is executed by a CPU 1010 shown in FIG. 10A using a RAM 1040 and implements the functional components shown in FIG. 28. Note that the same step numbers as in FIG. 11A denote the same steps in FIG. 30A, and a description thereof will be omitted.

FIG. 30A is different from FIG. 11A in that the information processing apparatus 2810 performs arrangement determination processing based on article presence/absence data from the article presence/absence sensor and the article array identified from the front image in step S3008.

(Arrangement Determination Processing)

Figure 30B:
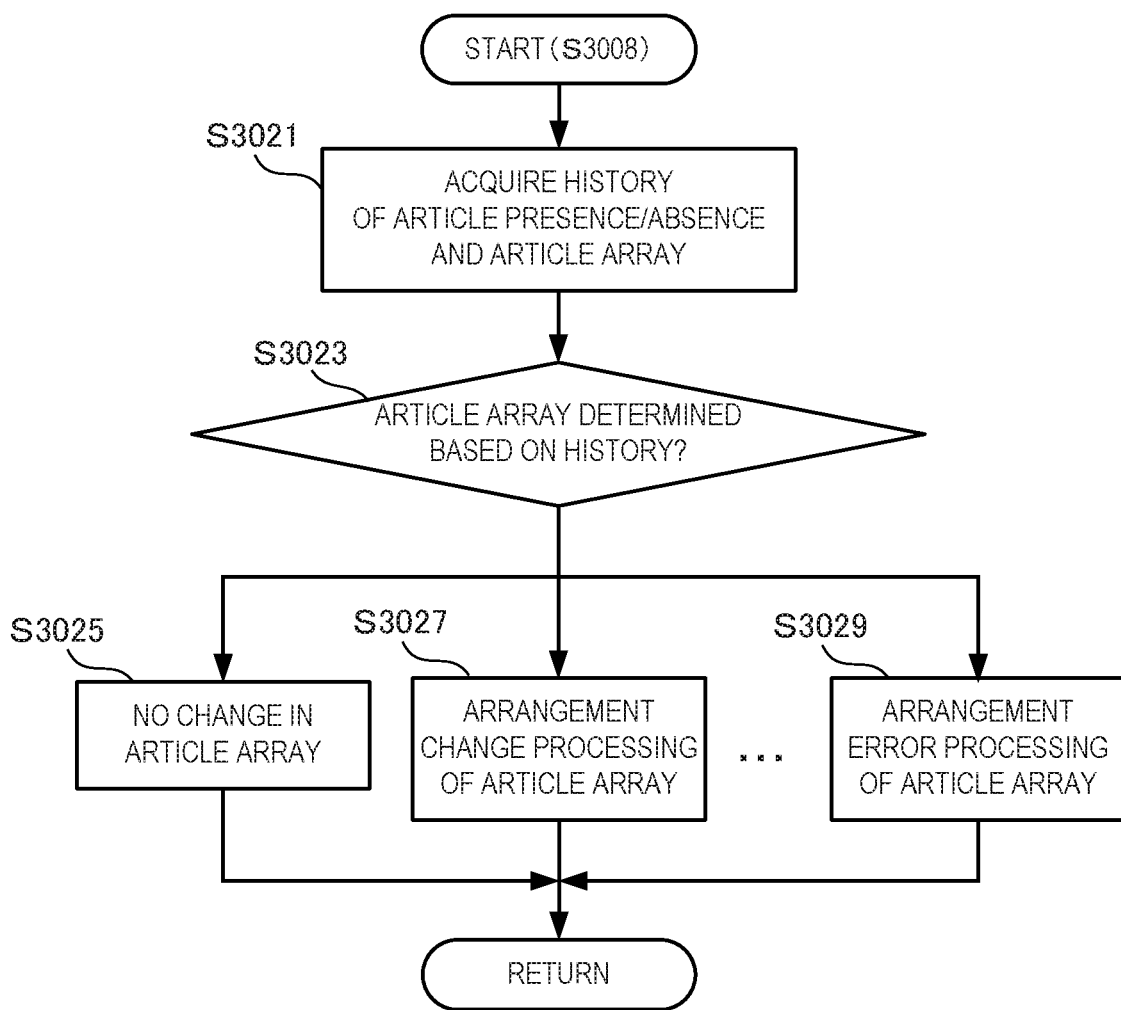
FIG. 30B is a flowchart showing the procedure of article display determination processing according to the sixth embodiment of the present invention.

FIG. 30B is a flowchart showing the procedure of arrangement determination processing (step S3008) according to this embodiment.

In step S3021, the information processing apparatus 2810 acquires the history of article presence/absence data and article array data from the article array history database 2814. In step S3023, the information processing apparatus 2810 determines the current article array based on the acquired history.

FIG. 30B shows three determination results. If neither the article presence/absence data nor the article array data changes, the information processing apparatus 2810 determines in step S3025 that no change in the article array exists. If both the article presence/absence data and the article array data change, and the changes do not conflict with each other, the information processing apparatus 2810 determines in step S3027 that a change in the article arrangement has occurred. If there is a discrepancy between the change in the article presence/absence data and that in the article array data, as in FIG. 29, the information processing apparatus 2810 determines in step S3029 that an article arrangement error has occurred.

Note that the change in the article arrangement and the arrangement error are not limited to those of the example. Other examples can be also found by comparing article identification information from a front image and article presence/absence information from the article presence/absence sensor according to this embodiment or tracking the history.

According to this embodiment, since a change in the article arrangement or an arrangement error can be notified in addition to article replenishment, it is possible to give a sophisticated assistance to article management in a display shelf.

Seventh Embodiment

An article management system including an information processing apparatus according to the seventh embodiment of the present invention will be described next. The information processing apparatus according to this embodiment is different from the second to sixth embodiments in that identification accuracy and detection accuracy are mutually improved based on article array information obtained from a captured image and article presence/absence information obtained from an article presence/absence sensor. The rest of the components and operations is the same as in the second to fifth embodiments. Hence, the same reference numerals denote the same components and operations, and a detailed description thereof will be omitted.

According to this embodiment, identification accuracy and detection accuracy can be improved mutually, and the article arrangement on a display shelf can reliably be grasped.

<<Article Management System>>

Figure 31:
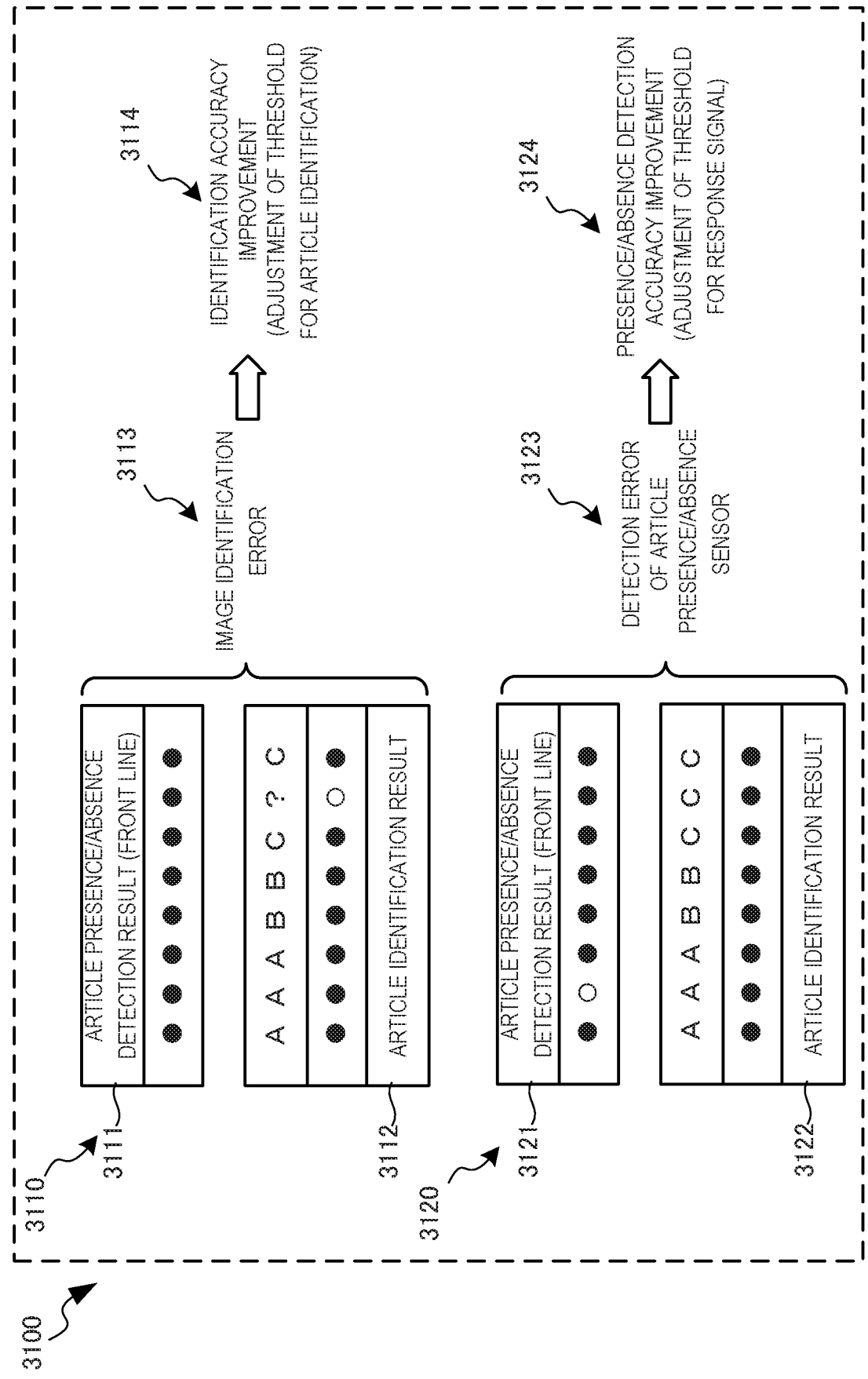
FIG. 31 is a view showing the outline of an article management system including an information processing apparatus according to the seventh embodiment of the present invention.

FIG. 31 is a view showing an outline of an article management system 3100 including an information processing apparatus according to this embodiment. FIG. 31 shows an adjustment example 3110 to improve the accuracy of article identification from an image and an adjustment example 3120 to improve the presence/absence determination accuracy of an article presence/absence sensor.

In the adjustment example 3110, a detection result 3111 of a display shelf front line by the article presence/absence sensor indicates that articles are present on all columns. On the other hand, in an article identification result 3112 obtained from the front image, the article of the seventh column from left cannot be identified. In this case, it is determined that an image identification error 3113 has occurred, and adjustment 3114 is performed to improve the article identification accuracy from the image. The adjustment 3114 includes adjusting the parameters, thresholds, and the like of feature point detection, local feature generation, feature point clustering, and local feature collation in the process of article identification.

In the adjustment example 3120, in an article identification result 3122 obtained from the front image, articles on all columns are identified. On the other hand, a detection result 3121 of a display shelf front line by the article presence/absence sensor indicates that no article is present on the second column. In this case, it is determined that a detection error 3123 of the article presence/absence sensor has occurred, and adjustment 3124 is performed to improve the article presence/absence detection accuracy. The adjustment 3124 includes adjusting a threshold used to determine the strength of a response signal in an RFID reader, adjusting the transmission strength of command transmission from the RFID reader, and the like. Note that since the article identification result sometimes includes not only the identification result of the display shelf front line but also the identification result of articles behind, the detection error of the article presence/absence sensor may be determined based on the detection results of all lines including not only the front line but also second and subsequent lines of the display shelf.

<<Functional Arrangement of Information Processing Apparatus>>

Figure 32:
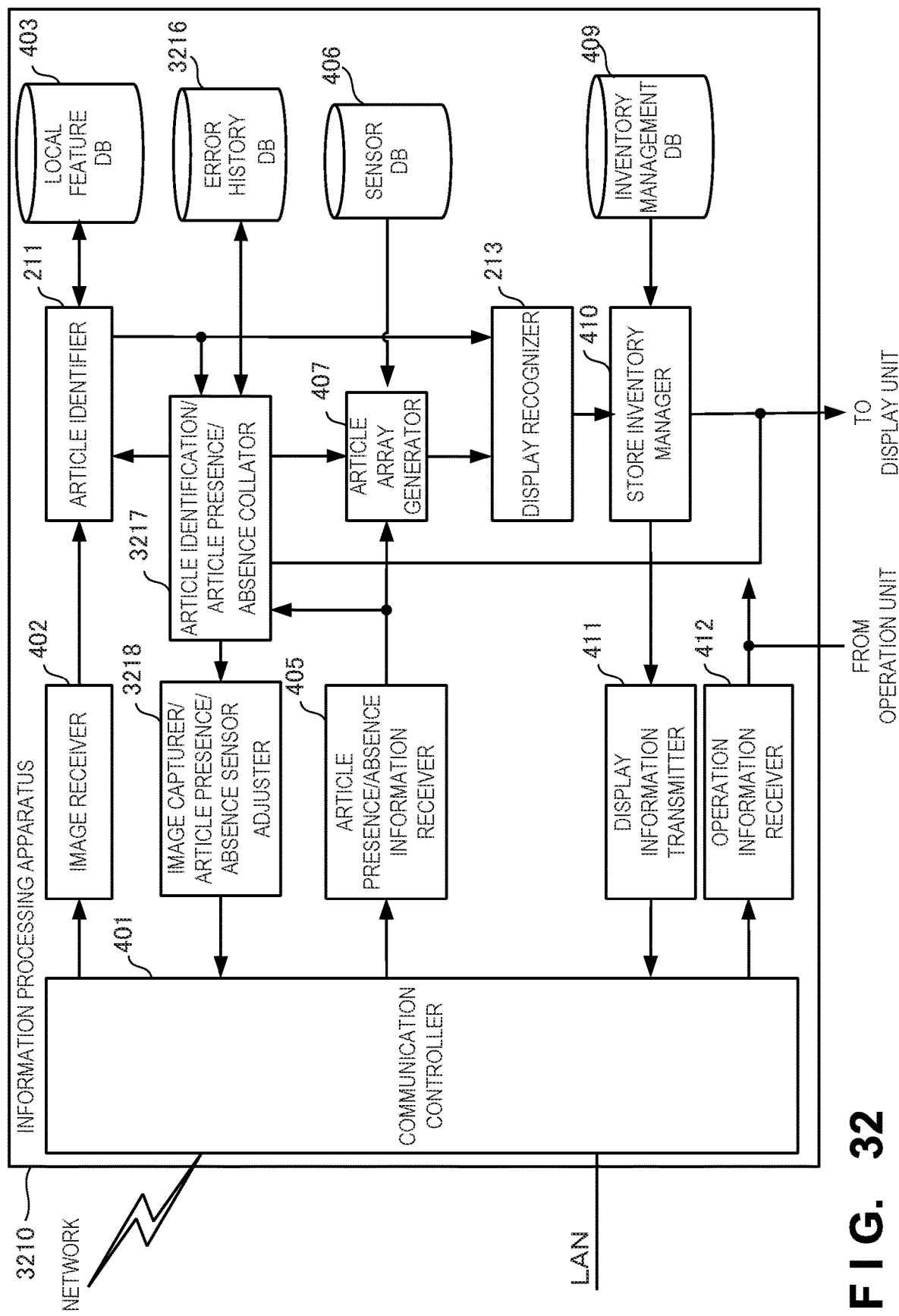
FIG. 32 is a block diagram showing the functional arrangement of the information processing apparatus according to the seventh embodiment of the present invention.

FIG. 32 is a block diagram showing the functional arrangement of an information processing apparatus 3210 according to this embodiment. Note that the same reference numerals as in FIG. 4 denote the same functional components in FIG. 32, and a description thereof will be omitted.

An error history database 3216 shown in FIG. 32 accumulates the history of an error in collation between an article array identified by an article identifier 211 and an article array detected by the article presence/absence sensor. An article identification/article presence/absence collator 3217 collates the article array identified by the article identifier 211 with the article array detected by the article presence/absence sensor, and if they do not match, determines an error. The article identification/article presence/absence collator 3217 then accumulates the error history in the error history database 3216, and performs parameter adjustment in the article identifier 211 or parameter adjustment in an article array generator 407. The article identification/article presence/absence collator 3217 also notifies an image capturer/article presence/absence sensor adjuster 3218 of the error occurrence as well as information representing which one of the image capturer and the article presence/absence sensor needs to be adjusted. The image capturer/article presence/absence sensor adjuster 3218 transmits data to adjust the image capturer and/or the article presence/absence sensor.

<<Processing Procedure of Information Processing Apparatus>>

Figure 33A:
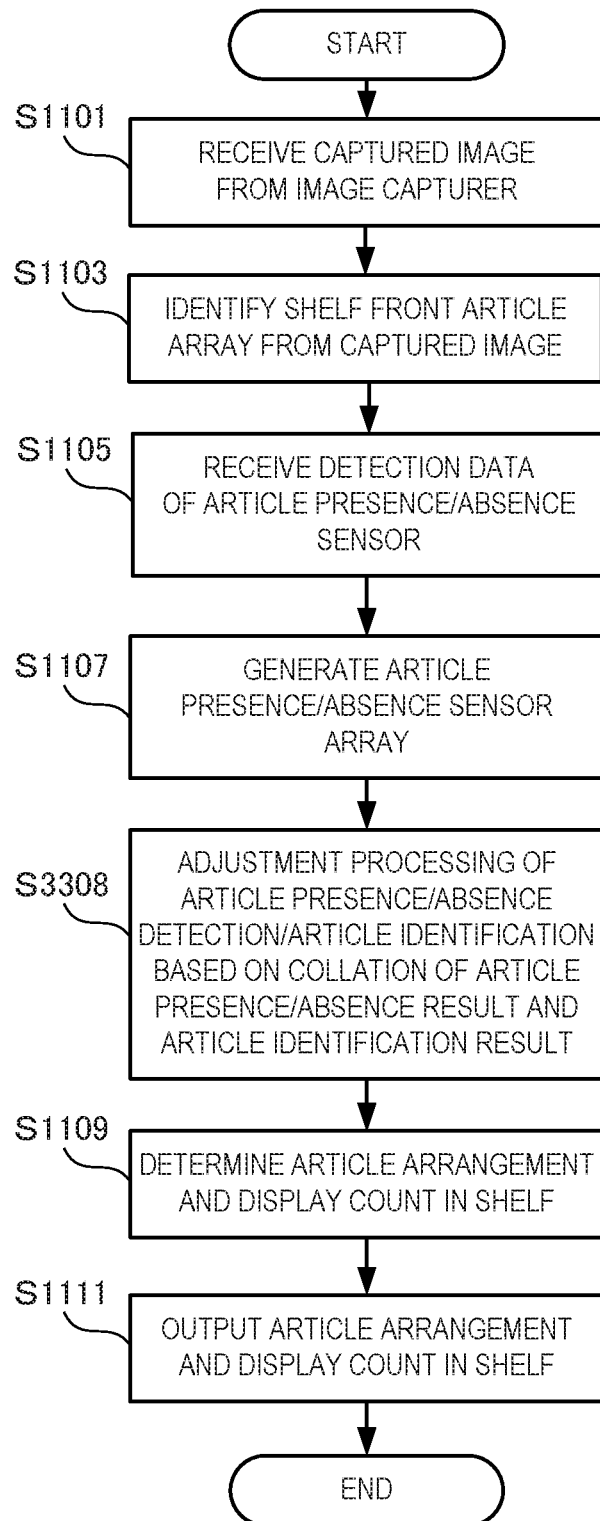
FIG. 33A is a flowchart showing the processing procedure of the information processing apparatus according to the seventh embodiment of the present invention.

FIG. 33A is a flowchart showing the processing procedure of the information processing apparatus 3210 according to this embodiment. This flowchart is executed by a CPU 1010 shown in FIG. 10A using a RAM 1040 and implements the functional components shown in FIG. 32. Note that the same step numbers as in FIG. 11A denote the same steps in FIG. 33A, and a description thereof will be omitted.

FIG. 33A is different from FIG. 11A in that the information processing apparatus 3210 performs adjustment processing of article presence/absence detection and/or article identification based on article presence/absence data from the article presence/absence sensor and the article array identified from the front image in step S3308.

(Article Presence/Absence Detection and Article Identification Adjustment Processing)

Figure 33B:
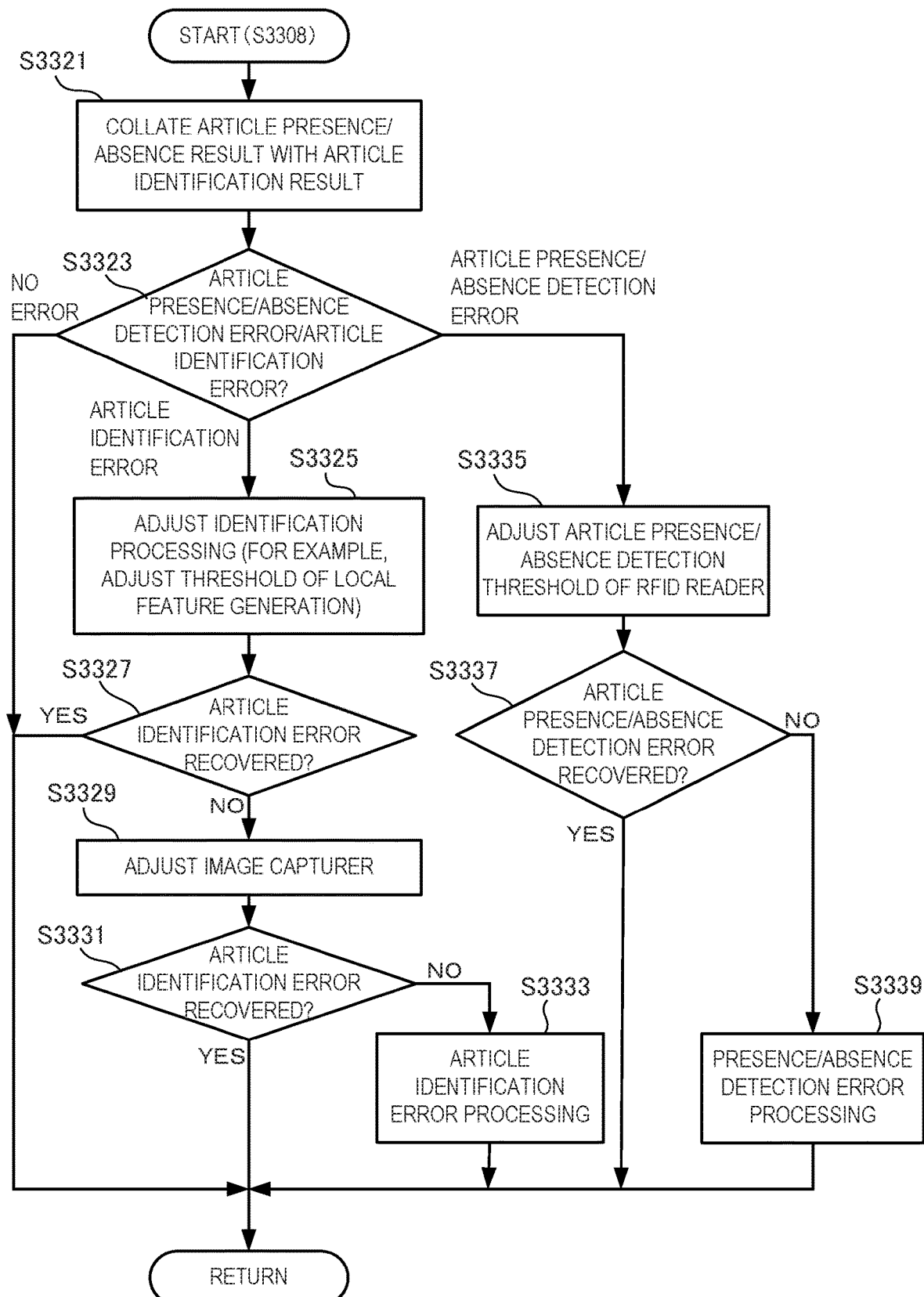
FIG. 33B is a flowchart showing the procedure of article presence/absence detection and article identification adjustment processing according to the seventh embodiment of the present invention.

FIG. 33B is a flowchart showing the procedure of article presence/absence detection and article identification adjustment processing (S3308) according to the seventh embodiment of the present invention.

In step S3321, the information processing apparatus 3210 collates an article presence/absence result with an article identification result. In step S3323, the information processing apparatus 3210 branches based on the collation result. Upon determining based on the collation result that no error exists, the processing ends.

If an error has occurred in article identification from the image, in step S3325, the information processing apparatus 3210 performs adjustment associated with identification processing such as adjustment of the threshold of local feature generation. In step S3327, the information processing apparatus 3210 determines whether the error has been recovered. If the error has been recovered, the processing ends. Note that although the identification processing adjustment of step S3325 and the determination of step S3327 are repeated, this is not illustrated in FIG. 33B to avoid complexity.

If the error is not recovered, the information processing apparatus 3210 adjusts the image capturer in step S3329. In step S3331, the information processing apparatus 3210 determines whether the error has been recovered. If the error has been recovered, the processing ends. Note that although the image capturer adjustment of step S3329 and the determination of step S3331 are repeated, this is not illustrated in FIG. 33B to avoid complexity. If the error is not recovered, the article identification system is notified of the presence of the error.

Upon determining in step S3323 that an article presence/absence detection error has occurred, in step S3335, the information processing apparatus 3210 performs adjustment of the threshold of article presence/absence detection of the RFID reader and the like. In step S3337, the information processing apparatus 3210 determines whether the error has been recovered. If the error has been recovered, the processing ends. Note that although the article presence/absence sensor adjustment of step S3335 and the determination of step S3337 are repeated, this is not illustrated in FIG. 33B to avoid complexity. If the error is not recovered, the article presence/absence detection system is notified of the presence of the error.

Note that the error detection method or adjustment method for both the article identification system and the article presence/absence detection system are not limited to those of this embodiment. Any other error detection method or adjustment method unique to the embodiment in which article display management is done by linking the article identification system with the article presence/absence detection system is possible.

According to this embodiment, identification accuracy and detection accuracy can be improved mutually, and the article arrangement on a display shelf can reliably be grasped.

Eighth Embodiment

An article management system including an information processing apparatus according to the eighth embodiment of the present invention will be described next. The information processing apparatus according to this embodiment is different from the second to seventh embodiments in that a capturing position is specified by collating a front line article presence/absence pattern obtained from an article presence/absence sensor with an article presence/absence pattern obtained by article identification from a captured image. The rest of the components and operations is the same as in the second to seventh embodiments. Hence, the same reference numerals denote the same components and operations, and a detailed description thereof will be omitted.

According to this embodiment, since the capturing position of an article display shelf can be determined without any special operation of specifying the display shelf as in the third or fourth embodiment, it is possible to easily link article identification based on a captured image with article presence/absence information from an article presence/absence sensor.

<<Article Management System>>

The arrangement and operation of an article management system 3400 according to this embodiment will be described with reference to FIGS. 34 and 35.

(System Outline)

Figure 34:
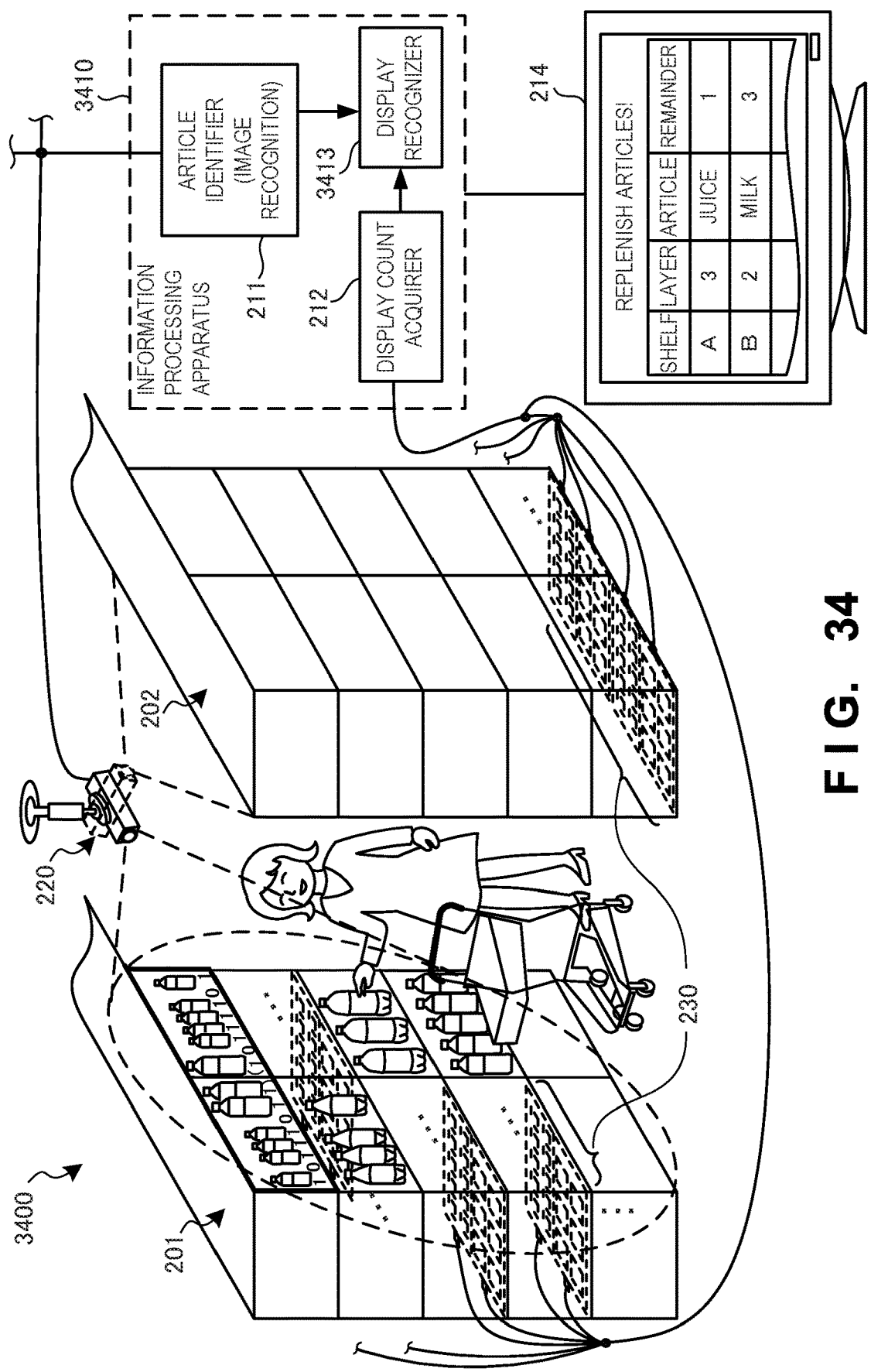
FIG. 34 is a view showing the outline of an article management system including an information processing apparatus according to the eighth embodiment of the present invention.

FIG. 34 is a view showing the outline of an article management system 3400 including an information processing apparatus 3410 according to this embodiment. Note that the same reference numerals as in FIG. 2A denote the same constituent elements in FIG. 34, and a description thereof will be omitted.

The article management system 3400 includes the information processing apparatus 3410, an image capturer 220 that is a camera, and article presence/absence sensors 230. The image capturer 220 captures the images of the front lines of display shelves 201 and 202. Note that FIG. 34 shows an example of an array of bottle presence (represented by a bit "1") and bottle absence (represented by a bit "0") on the top layer of the display shelf 201 for the sake of simplicity. The shelf and its capturing position can thus be specified without storing a shelf mark as in the fourth embodiment or an article array unique to a shelf as in the fifth embodiment.

The information processing apparatus 3410 includes an article identifier 211, a display count acquirer 212, and a display recognizer 3413. The display recognizer 3413 collates the article presence/absence patterns of the front lines of the display shelves 201 and 202 from the article identifier 211 with the front line article presence/absence pattern by article presence/absence information from the display count acquirer 212. This collation is performed not only for the same position including article presence/absence but by changing the image acquisition position in the horizontal and vertical directions. If a matching article presence/absence pattern is found, the position shot in the display shelf can be known. Hence, since the article presence/absence pattern obtained by article identification from the image can be linked with the article presence/absence pattern from the article presence/absence sensor, the numbers of articles displayed in the display shelves 201 and 202 are recognized.

(Operation Procedure)

Figure 35:
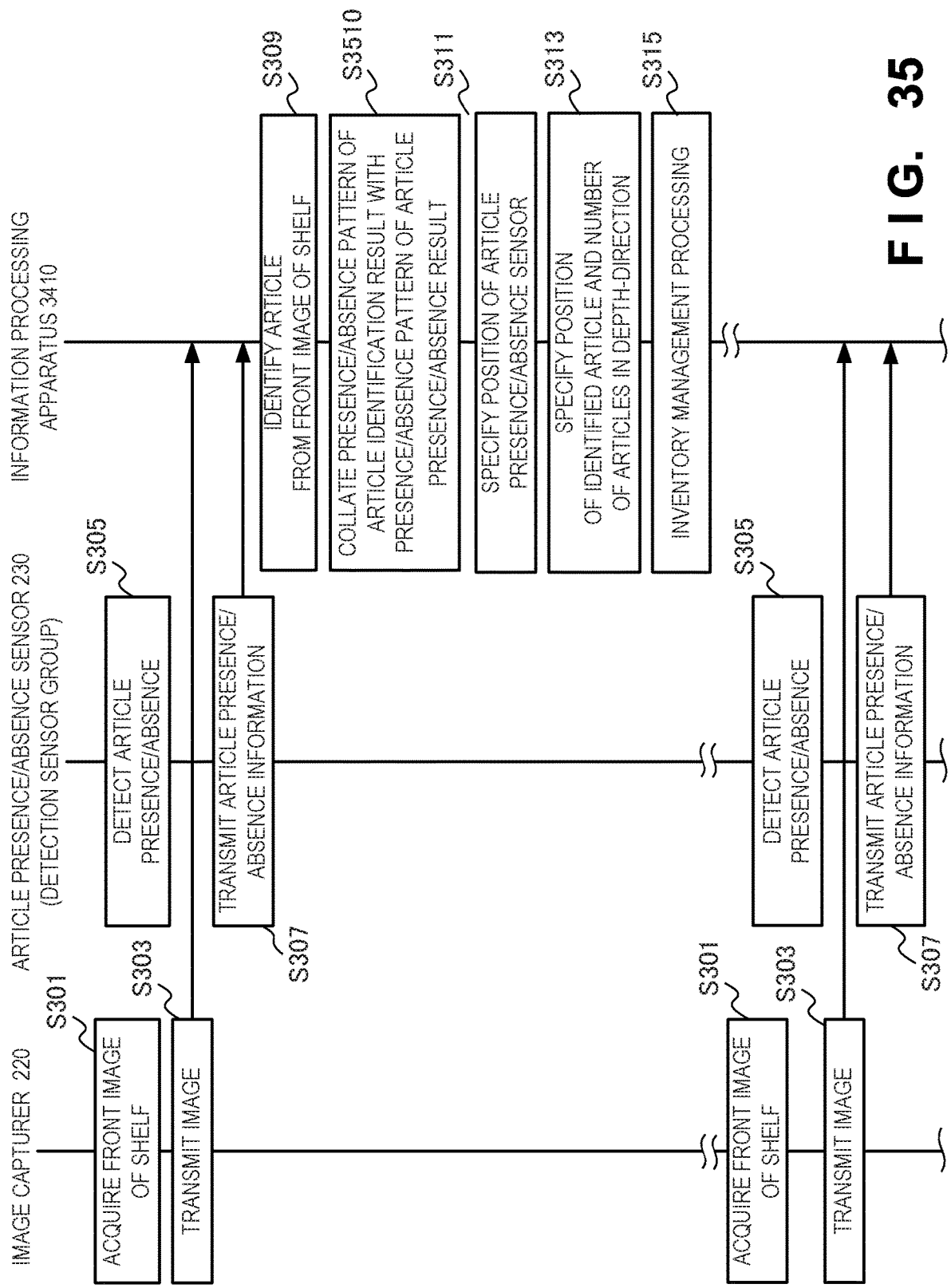
FIG. 35 is a sequence chart showing the operation procedure of the article management system including the information processing apparatus according to the eighth embodiment of the present invention.

FIG. 35 is a sequence chart showing the operation procedure of the article management system 3400 including the information processing apparatus 3410 according to this embodiment. Note that the same step numbers as in FIG. 3A of the second embodiment denote the same steps in FIG. 35, and a description thereof will be omitted.

In FIG. 35, collation of the article presence/absence patterns of an article identification result and an article presence/absence result in step S3510 is added to FIG. 3A. In step S3510, the information processing apparatus 3410 collates an article presence/absence pattern obtained by identification from a front image of a display shelf with the article presence/absence pattern of the display shelf front image obtained from the article presence/absence sensor, and links the image position from the image capturer 220 with the article presence/absence sensor position.

In the fourth embodiment, a shelf mark is added to cope with linking each article identification position with the position of each article presence/absence sensor. In the fifth embodiment, the position of an image shot by the image capturer 220 is linked with the same position of the display shelf by an article array unique to the display shelf identified from the captured image, thereby linking each article identification position with the position of each article presence/absence sensor. In this embodiment, the shelf and its capturing position can be specified, and each article identification position can be linked with the position of each article presence/absence sensor without preparing a shelf mark or an article array unique to the display shelf.

<<Functional Arrangement of Information Processing Apparatus>>

Figure 36:
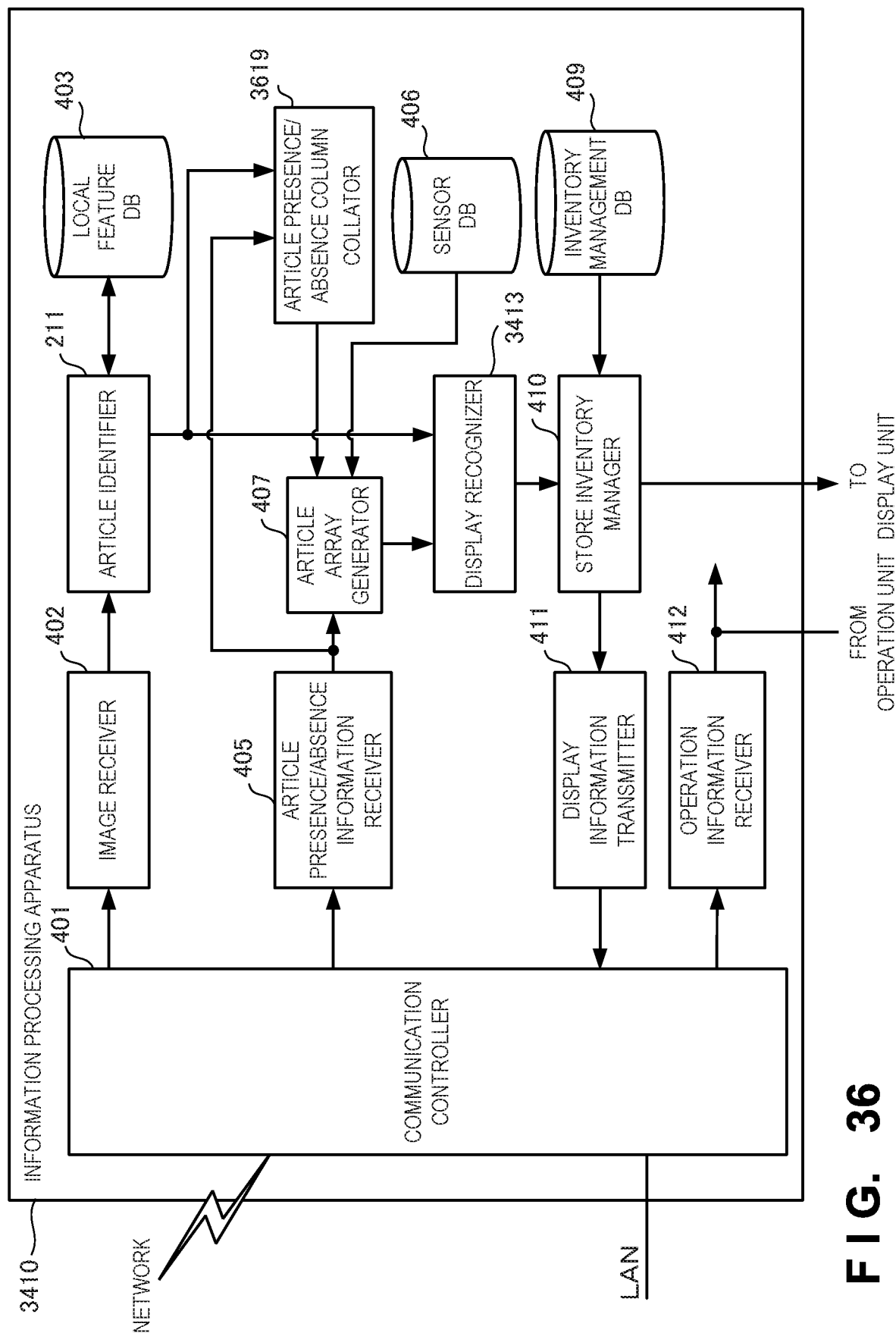
FIG. 36 is a block diagram showing the functional arrangement of the information processing apparatus according to the eighth embodiment of the present invention.

FIG. 36 is a block diagram showing the functional arrangement of the information processing apparatus 3410 according to this embodiment. Note that the same reference numerals as in FIG. 4 denote the same functional components in FIG. 36, and a description thereof will be omitted.

An article presence/absence column collator 3619 shown in FIG. 36 collates an article presence/absence pattern generated by article recognition information from the article identifier 211 with an article presence/absence pattern generated from article presence/absence information received by an article presence/absence information receiver 405, thereby specifying a shelf of a matching article presence/absence pattern and its capturing position.

(Article Column Presence/Absence Column Collation)

Figure 37:
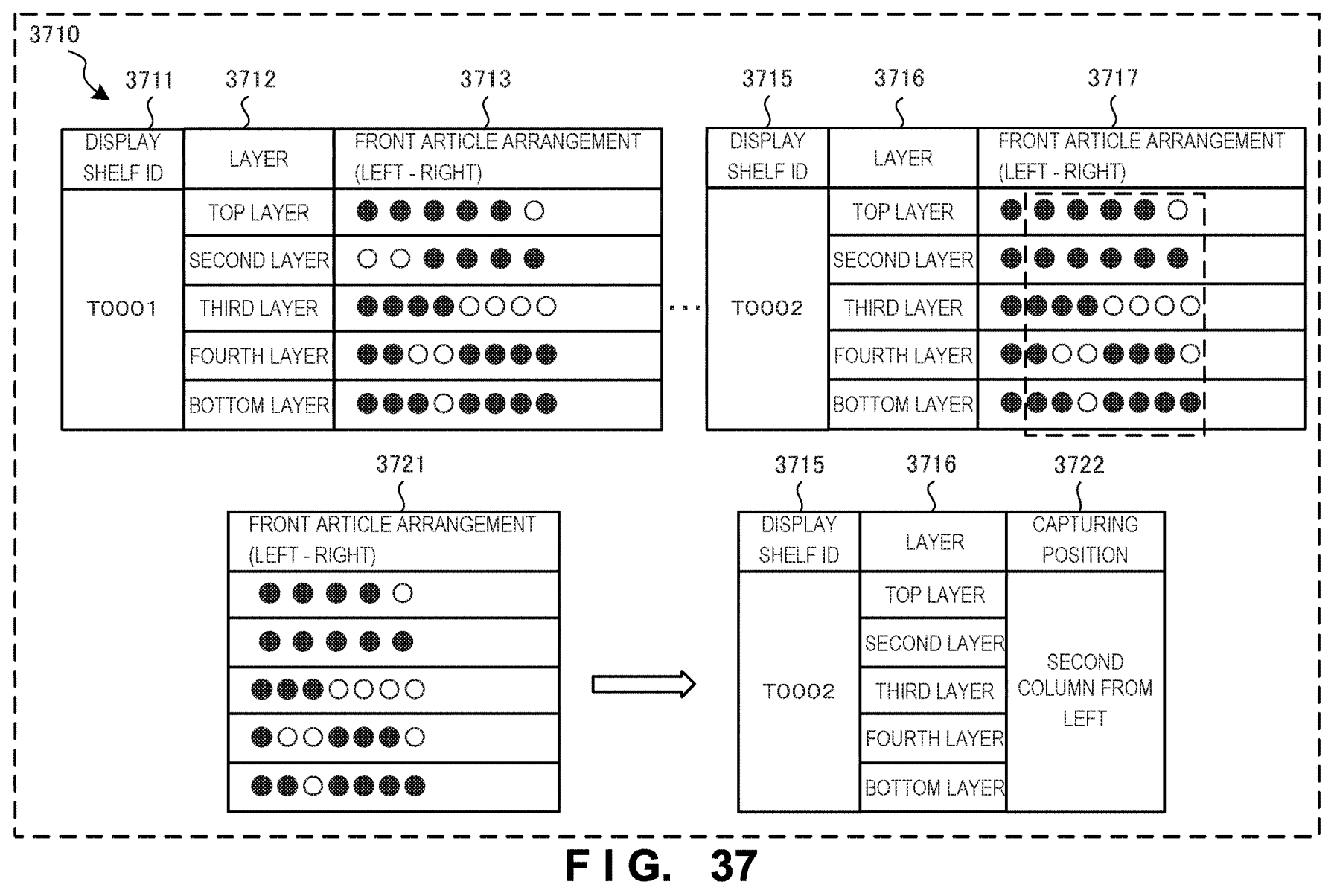

FIG. 37 is a view for explaining article column presence/absence column collation according to this embodiment.

The upper line of FIG. 37 shows an article array pattern 3710 of the front lines of two display shelves, which is generated from detection data of the article presence/absence sensor. Here, "●" indicates article presence on the front line, and "○" indicates article absence on the front line. The first article array pattern includes a display shelf ID 3711, a layer 3712, and an article array pattern 3713. The second article array pattern includes a display shelf ID 3715, a layer 3716, and an article array pattern 3717.

The lower line of FIG. 37 shows an article presence/absence pattern 3721 generated from articles identified from the image. Here, the article array pattern 3713 and the article array pattern 3717 are operated using the article presence/absence pattern 3721. In this example, a pattern that matches the article presence/absence pattern 3721 appears from the second column from left of the article array pattern 3717 (in the broken lien frame). As a result, it is found that the article presence/absence pattern 3721 generated from the articles identified from the image is obtained by capturing the right display shelf from the second column from left 3722, and the identified article array and the article presence/absence array can be linked. Note that although a pattern including a plurality of layers has been exampled with reference to FIG. 36, an article presence/absence pattern including one layer is also possible.

<<Processing Procedure of Information Processing Apparatus>>

Figure 38A:
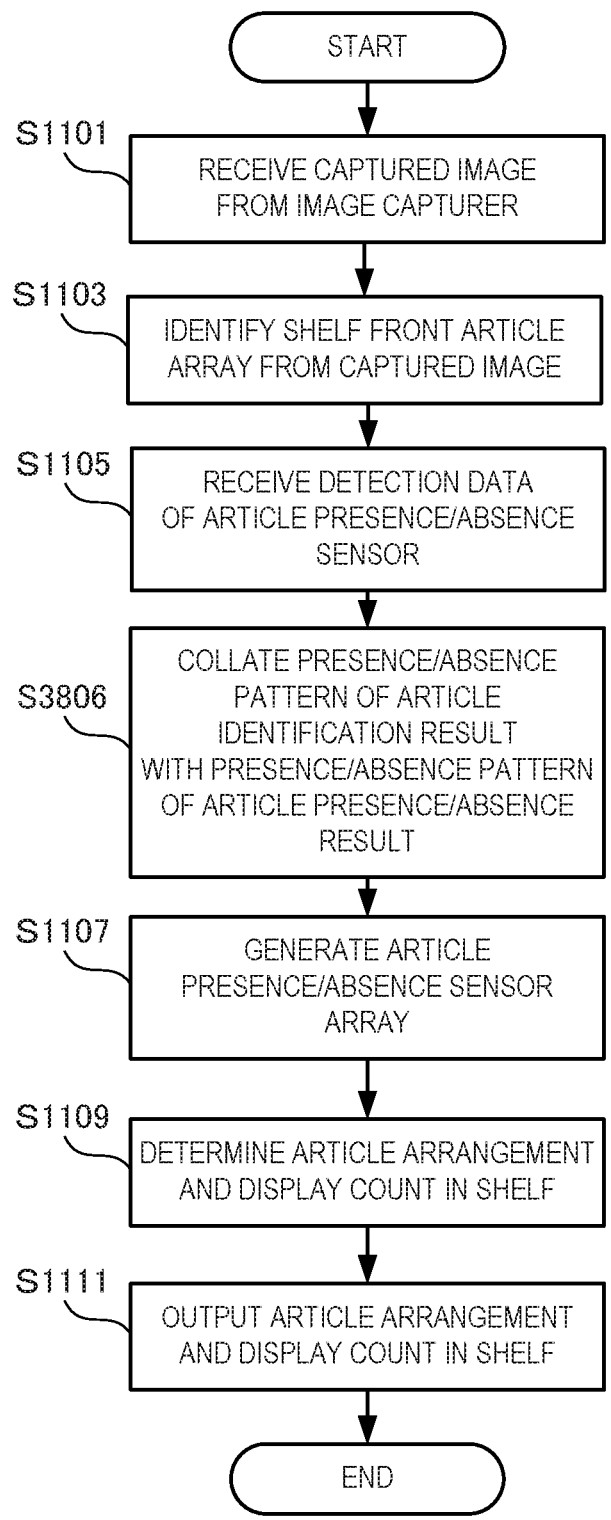
FIG. 38A is a flowchart showing the processing procedure of the information processing apparatus according to the eighth embodiment of the present invention.

FIG. 38A is a flowchart showing the processing procedure of the information processing apparatus 3410 according to this embodiment. This flowchart is executed by a CPU 1010 shown in FIG. 10A using a RAM 1040 and implements the functional components shown in FIG. 36. Note that the same step numbers as in FIG. 11A denote the same steps in FIG. 38A, and a description thereof will be omitted.

FIG. 38A is different from FIG. 11A in that the information processing apparatus 3410 collates the presence/absence pattern of an article identification result with the presence/absence pattern of an article presence/absence result, and specifies a shelf and a captured position of the shelf in step S3806.

(Article Column Identification Processing)

Figure 38B:
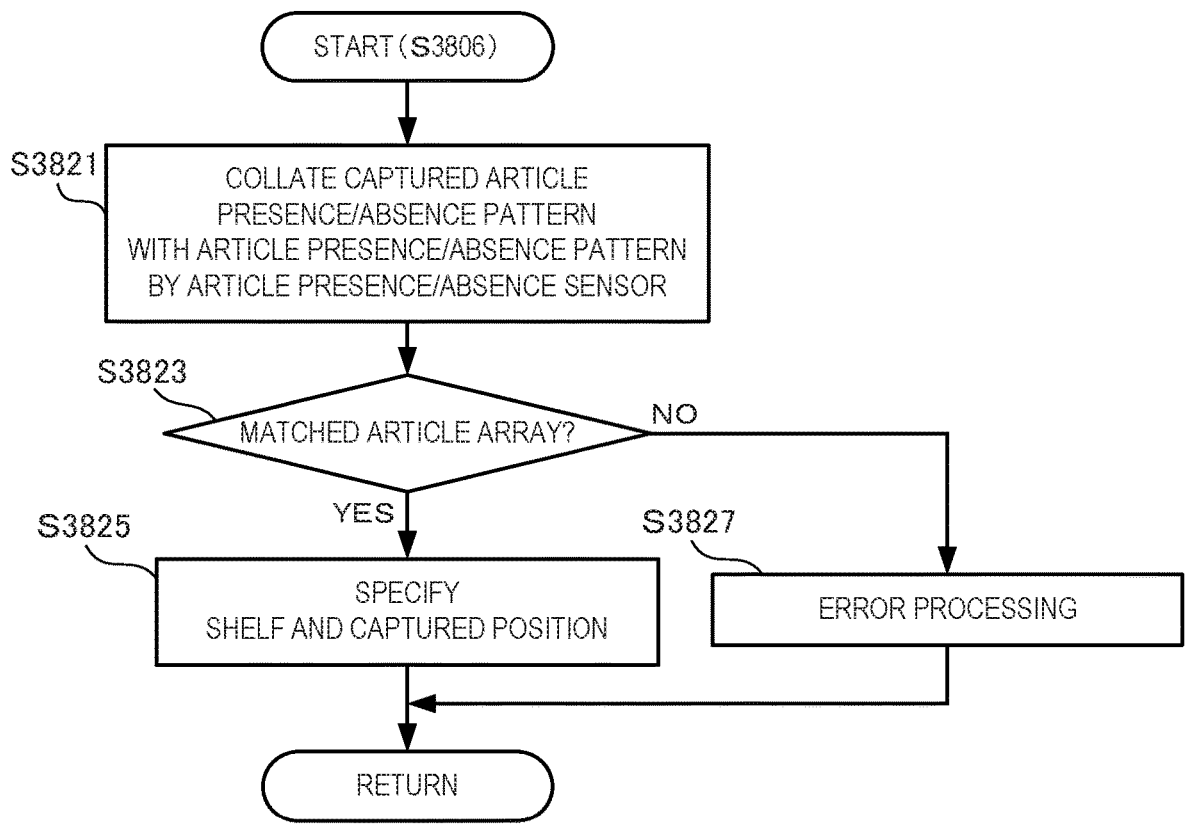
FIG. 38B is a flowchart showing the procedure of presence/absence column collation processing according to the eighth embodiment of the present invention.

FIG. 38B is a flowchart showing the procedure of article column identification processing (step S3806) according to this embodiment.

In step S3821, the information processing apparatus 3410 collates the article presence/absence pattern from the captured front image with the article presence/absence pattern from the article presence/absence sensor while scanning the patterns. In step S3823, the information processing apparatus 3410 determines whether a matched article array pattern exists. If a matched article array pattern exists, the information processing apparatus 3410 specifies a display shelf and a captured position of the shelf having the matched article array pattern in step S3825. On the other hand, if no matching article array pattern exists, in step S3827, the information processing apparatus 3410 determines that the display shelf or capturing position is not found, and performs error processing. Note that in step S3827, it may be performed to change the article identification accuracy or the capturing position/range in accordance with the number of errors.

According to this embodiment, since the capturing position of an article display shelf can be determined without any special operation of specifying the display shelf as in the third or fourth embodiment, it is possible to easily link article identification based on a captured image with article presence/absence information from an article presence/absence sensor.

Other Embodiments

While the present invention has been described with reference to exemplary embodiments, it is to be understood that the invention is not limited to the disclosed exemplary embodiments. The arrangement and details of the present invention can variously be modified without departing from the spirit and scope thereof, as will be understood by those skilled in the art. The present invention also incorporates a system or apparatus that combines different features included in the embodiments in any form.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. In particular, the present invention incorporates at least a non-transitory computer readable medium.

This application claims the benefit of Japanese Patent Application No. 2013-042442, filed on Mar. 4, 2013, which is hereby incorporated by reference in its entirety.

The invention claimed is:

1. An information processing apparatus for managing products, the apparatus comprising:
at least one memory configured to store instructions; and
at least one processor configured to execute the instructions to:
acquire count information of one or more products by using sensors provided on a display shelf;
identify product information including types of the products, names of the products, and an array of the products based on an image including the display shelf;
link the count information and the identified product information;
recognize a count of each type of the products;
compare the identified array of the products and the recognized count of each type of the products with a history of the product array, to generate a comparison result;
discriminate a change in the product array from an arrangement error based on the comparison result;
determine if one of the products needs to be replenished based on the count information; and
generate a notification, in a case where the product needs to be replenished.

2. The information processing apparatus according to claim 1, wherein the at least one processor is further configured to:
transmit the notification to a terminal of a store clerk from a display information transmitter.

3. The information processing apparatus according to claim 1, wherein the at least one processor is further configured to:
determine the product to be replenished by a mark indicating whether or not replenishment is necessary, wherein the mark is included in a table managing the count information.

4. The information processing apparatus according to claim 3, wherein the at least one processor is further configured to:
send the notification to a store clerk, in a case where the mark indicates that the replenishment is necessary.

5. The information processing apparatus according to claim 1, wherein the at least one processor is further configured to:
display a management target display and a product table.

6. The information processing apparatus according to claim 5, wherein the management target display includes a shelf allocation of the product and the count of the product displayed on the display shelf.

7. The information processing apparatus according to claim 5, wherein the product table includes product names and a number of product faces.

8. A control method of managing products, the method comprising:
acquiring count information of one or more products by using sensors provided on a display shelf;
identifying product information including types of the products, names of the products, and an array of the products based on an image including the display shelf;

linking the count information and the identified product information;

recognizing a count of each type of the products;

comparing the identified array of the products and the recognized count of each type of the products with a history of the product array, to generate a comparison result;

discriminating a change in the product array from an arrangement error based on the comparison results;

determining if one of the products needs to be replenished based on the count information; and generating a notification, in a case where the product needs to be replenished.

9. A non-transitory computer readable storage medium storing a program for causing a computer to execute a method of managing products, the method comprising:

acquiring count information of one or more products using sensors provided on a display shelf;

identifying product information including types of the products, names of the products, and an array of the products based on an image including the display shelf;

linking the count information and the identified product information;

recognizing a count of each type of the products;

comparing the identified array of the products and the recognized count of each type of the products with a history of the product array, to generate a comparison result;

discriminating a change in the product array from an arrangement error based on the comparison results;

determining if the product needs to be replenished based on the display count; and generating a notification, in a case where the product needs to be replenished.

10. An information processing apparatus for managing products, the apparatus comprising:

at least one memory configured to store instructions; and at least one processor configured to execute the instructions to:

acquire count information of a product by using a sensor provided on a display shelf;

identify the product based on an image including the display shelf;

link the count information and the identified product;

determine if the product needs to be replenished based on the count information; and generate a notification, in a case where the product needs to be replenished, wherein the sensor comprises:

a spacer, a RFID tag adjacent to the spacer, and a reader antenna adjacent to the spacer, wherein a thickness of the spacer affects an electromagnetic coupling between the RFID tag and the reader antenna, wherein the reader antenna generates an electromagnetic field and receives a response signal from the RFID tag, and wherein a strength of the electromagnetic field is changed by presence of the product.

* * * * *